US008710408B2

(12) United States Patent
Khatchadourian et al.

(10) Patent No.: US 8,710,408 B2
(45) Date of Patent: Apr. 29, 2014

(54) AUTOMATED PIZZA PREPARATION AND VENDING SYSTEM

(75) Inventors: Puzant Khatchadourian, New York, NY (US); Daniel Papakhian, Cliffside Park, NJ (US); Mikhail Kneller, Bronx, NY (US); George Yeung, Summit, NJ (US)

(73) Assignee: K & G Enterprises, LLC, New York, NY (US)

( * ) Notice: Subject to any disclaimer, the term of this patent is extended or adjusted under 35 U.S.C. 154(b) by 0 days.

(21) Appl. No.: 13/467,568

(22) Filed: May 9, 2012

(65) Prior Publication Data

US 2012/0308702 A1 Dec. 6, 2012

Related U.S. Application Data

(63) Continuation of application No. 13/353,123, filed on Jan. 18, 2012.

(60) Provisional application No. 61/433,928, filed on Jan. 18, 2011.

(51) Int. Cl.
*F27B 9/14* (2006.01)
*F27B 9/16* (2006.01)
*F27B 9/30* (2006.01)
*F27D 3/12* (2006.01)
*B65G 35/00* (2006.01)

(52) U.S. Cl.
USPC .......... 219/400; 219/388; 219/392; 99/443 C; 432/122; 432/138; 432/142; 414/676

(58) Field of Classification Search
None
See application file for complete search history.

(56) References Cited

U.S. PATENT DOCUMENTS

| | | | | |
|---|---|---|---|---|
| 3,734,271 A | * | 5/1973 | Dolgolenko et al. | 198/811 |
| 3,884,213 A | * | 5/1975 | Smith | 126/21 A |
| 4,154,861 A | * | 5/1979 | Smith | 426/466 |
| 4,354,796 A | * | 10/1982 | Bergman | 414/676 |
| 4,718,535 A | * | 1/1988 | Wolff | 198/418.6 |
| 4,737,092 A | | 4/1988 | Bullick | |
| 5,211,106 A | * | 5/1993 | Lucke | 99/441 |
| 5,921,170 A | | 7/1999 | Khatchadourian et al. | |
| 5,996,476 A | * | 12/1999 | Schultz | 99/349 |
| 6,398,539 B1 | | 6/2002 | Lawrence | |
| 7,241,977 B2 | | 7/2007 | Friedl et al. | |
| 7,655,884 B2 | * | 2/2010 | Engelhardt | 219/388 |
| 8,011,293 B2 | * | 9/2011 | McFadden et al. | 99/476 |
| 8,297,270 B2 | * | 10/2012 | McFadden | 126/21 A |
| 2007/0108177 A1 | * | 5/2007 | Engelhardt | 219/388 |
| 2012/0185086 A1 | * | 7/2012 | Khatchadourian et al. | 700/233 |

FOREIGN PATENT DOCUMENTS

WO    WO 2008/103907 A1    8/2008

OTHER PUBLICATIONS

International Search Report and Written Opinion Issued in PCT/US2012/021734. May 2, 2012.

* cited by examiner

*Primary Examiner* — Joseph M Pelham
(74) *Attorney, Agent, or Firm* — Stroock & Stroock & Lavan LLP

(57) ABSTRACT

Automated apparatus for preparing pizza, and method of operating same. A customer selects a type of pizza, such as toppings or crust style. The apparatus slices and defrosts dough, applies cheese, slices and applies toppings, and cooks the pizza to order. The cooked pizza is packaged for delivery to the customer and may include a separate cutting apparatus. Proper temperature of hot and cold sections is maintained while ingredients are stored and as the pizza is cooked. The process is monitored and controlled by one or more processors.

14 Claims, 41 Drawing Sheets

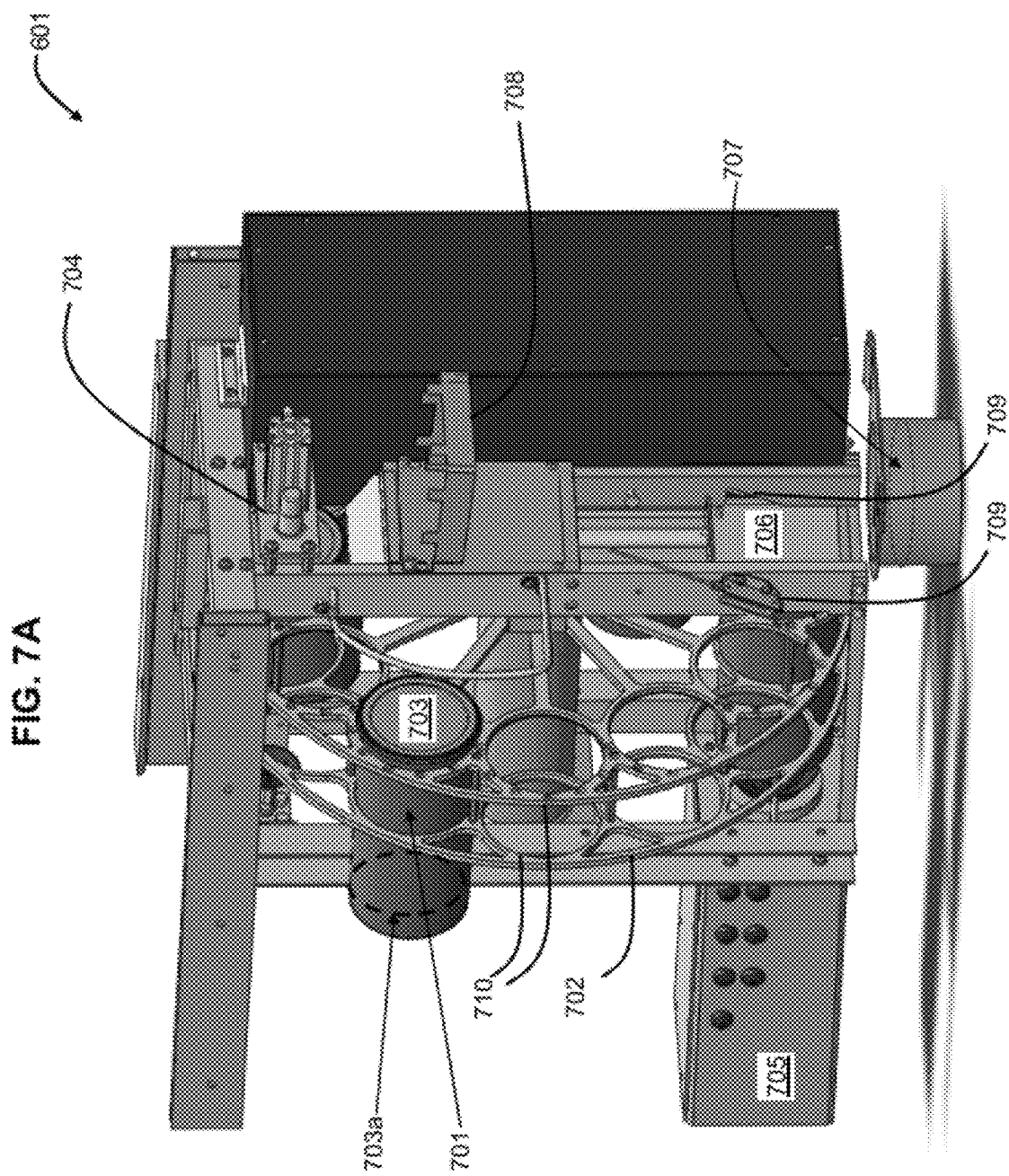

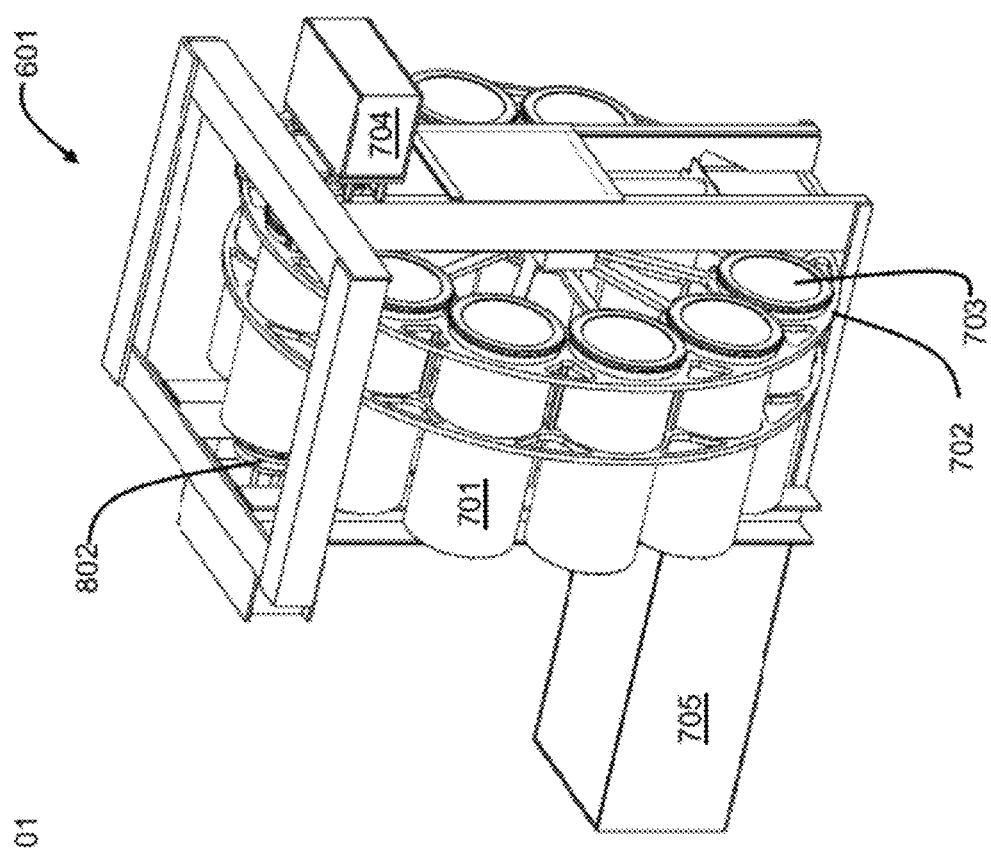
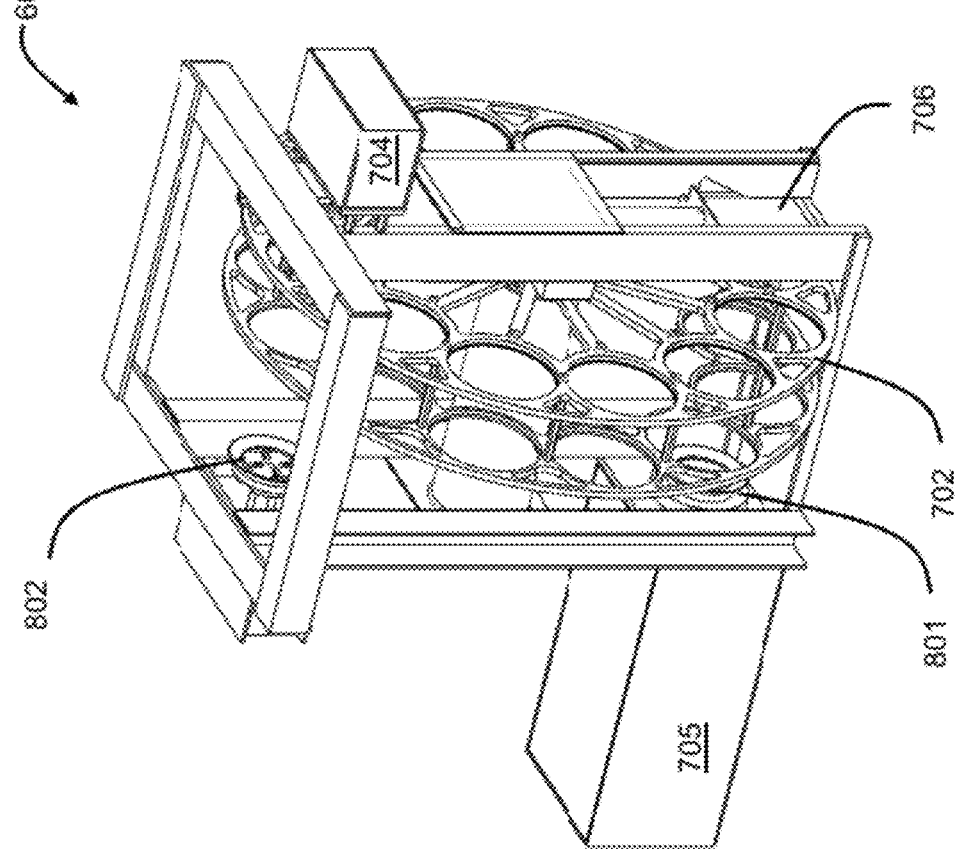

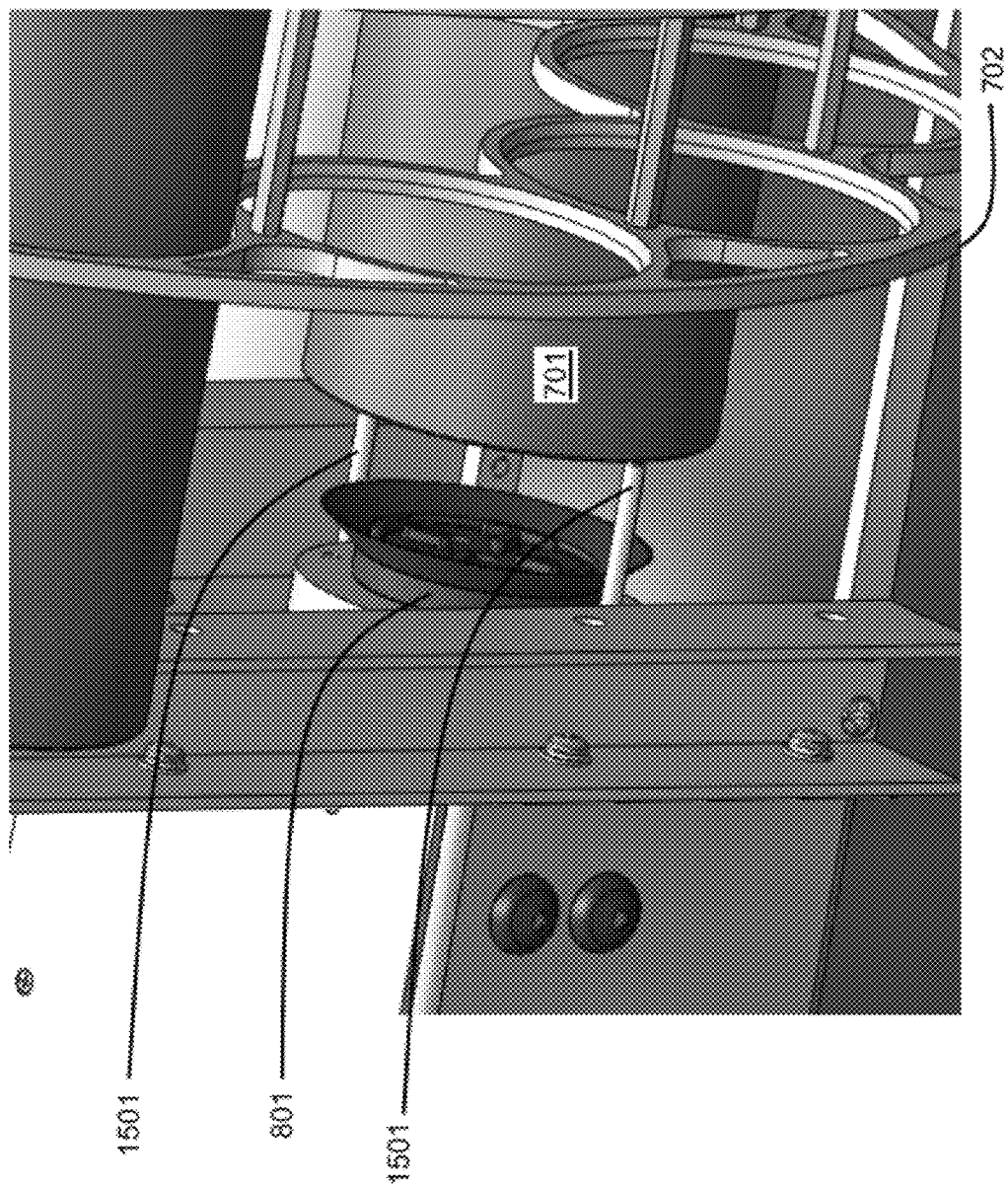

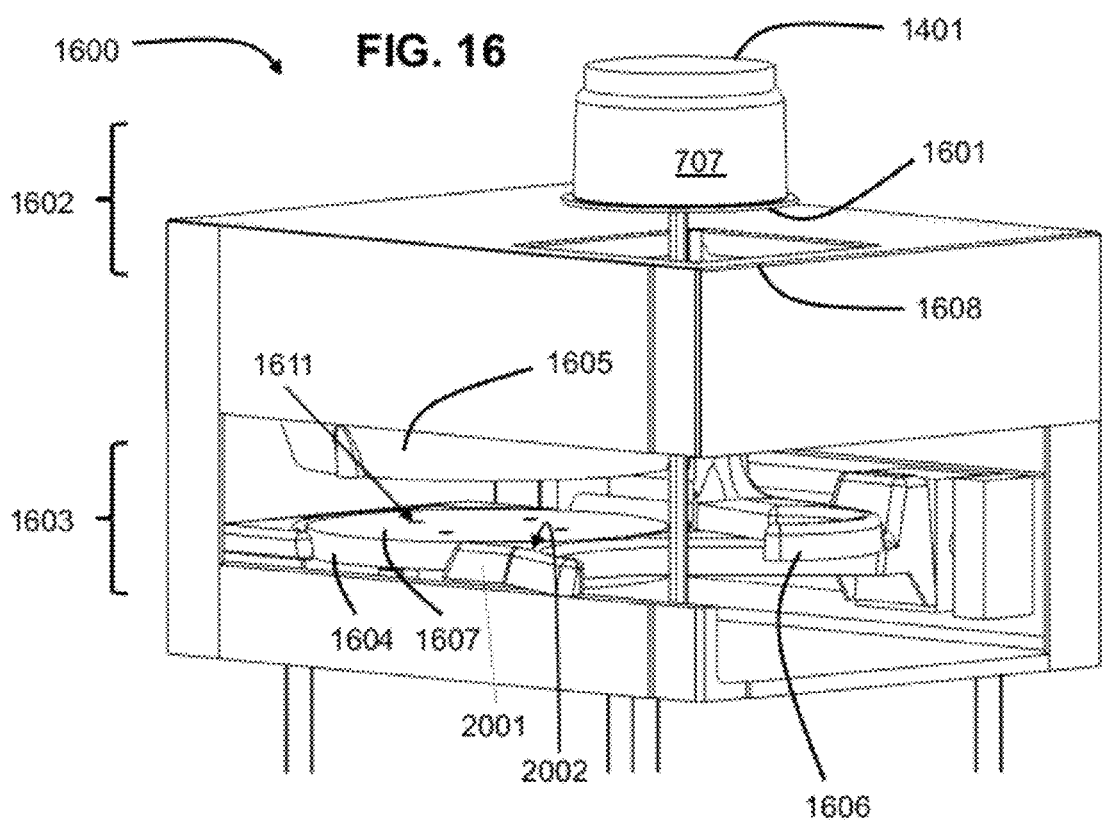
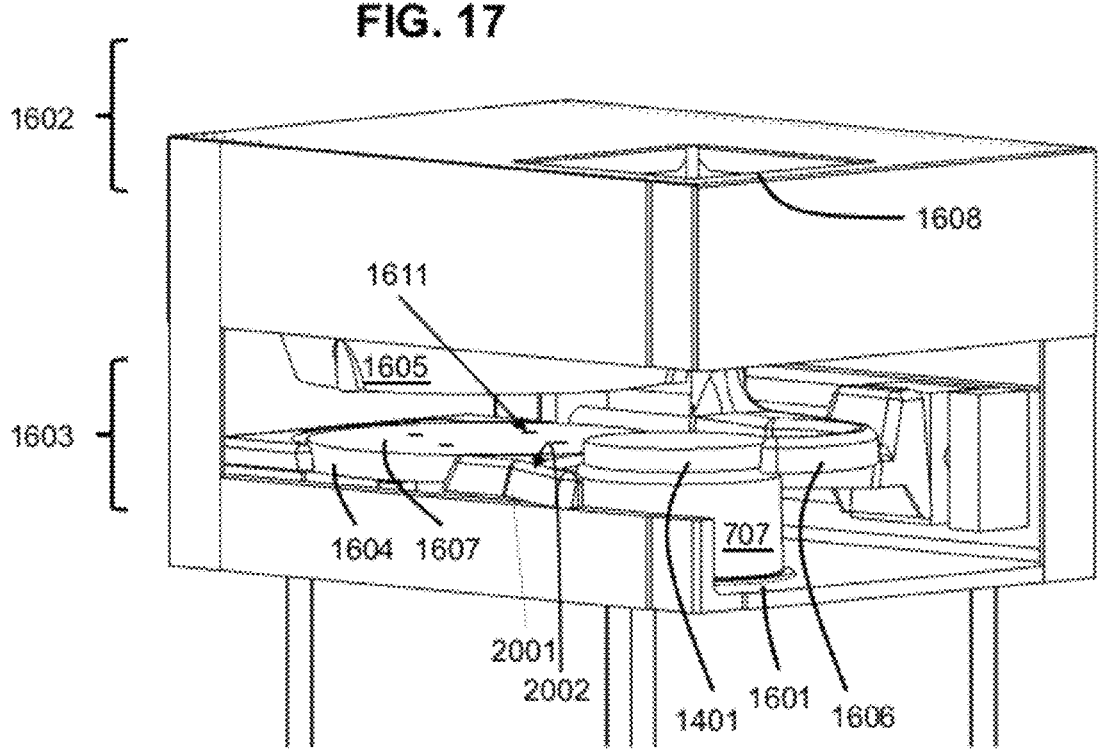

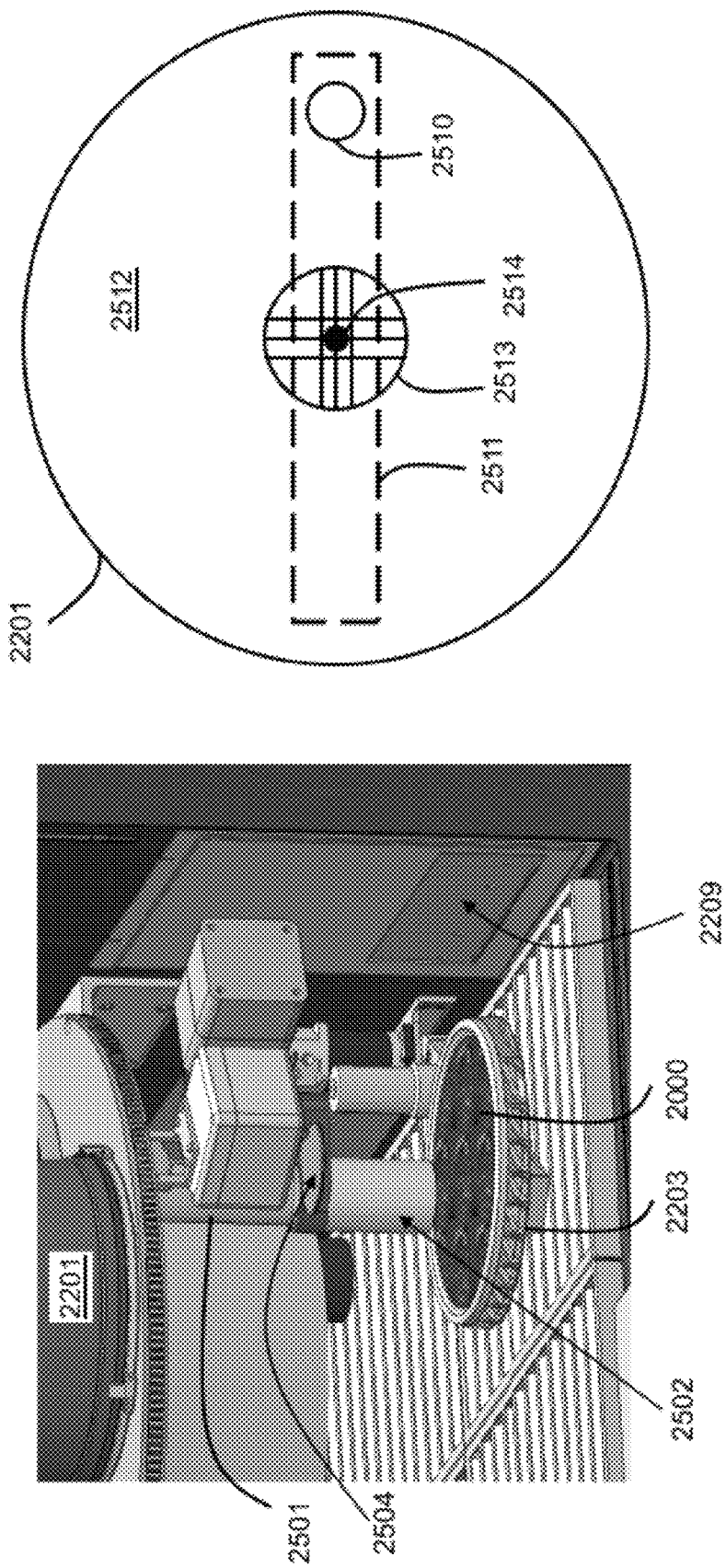

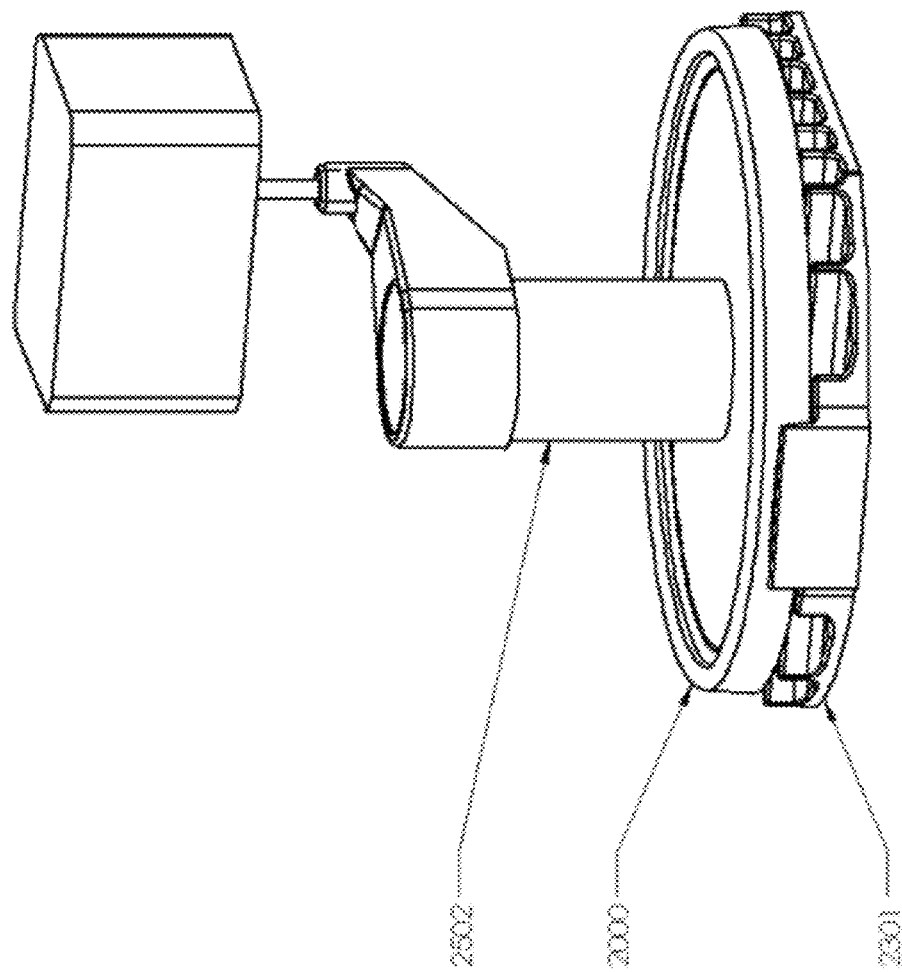

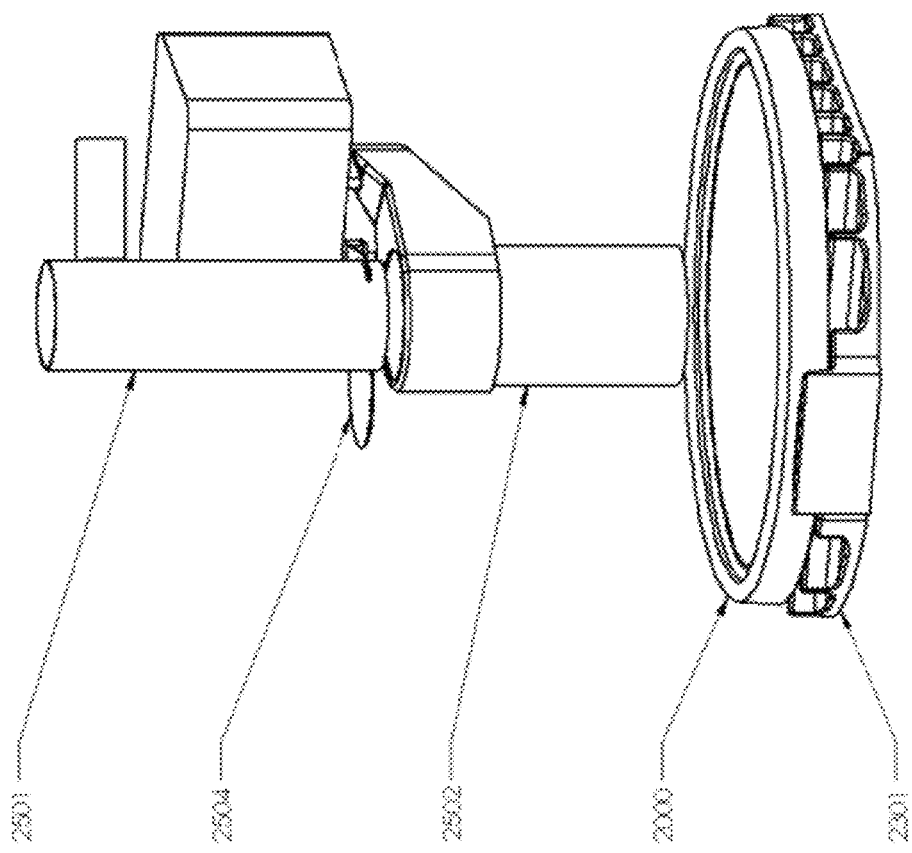

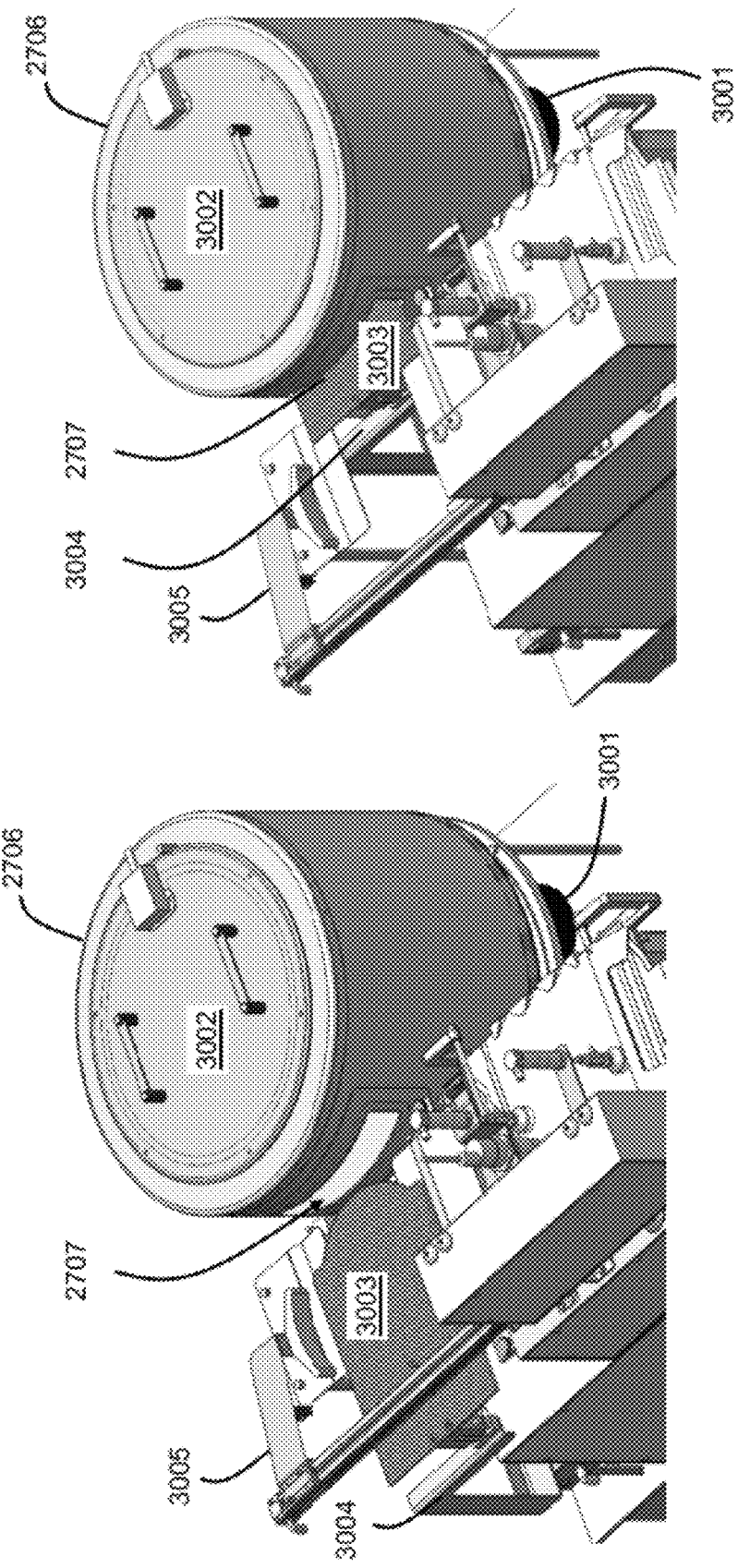

AUTOMATED PIZZA PREPARATION AND VENDING SYSTEM

CROSS-REFERENCE TO RELATED APPLICATION

This application is a continuation of U.S. patent application Ser. No. 13/353,123, filed Jan. 18, 2012, entitled "Improved Automated Pizza Preparation Apparatus," which claims the benefit of U.S. Provisional Patent Application Ser. No. 61/433,928, filed Jan. 18, 2011, entitled "Improved Automated Pizza Preparation and Vending System." The entire disclosures of these applications are incorporated herein by reference.

BACKGROUND

1. Field of the Invention

The present invention generally relates to the field of food preparation devices and vending systems. More specifically, preferred embodiments of the present invention relate to an automated system for preparing and vending individual pizzas for consumption.

2. Discussion of the Prior Art

Pizza is a very popular food in many countries throughout the world. Although pizza is a relatively simple food, having generally just three ingredients in its most basic form—dough, tomato sauce and cheese, there are many variations in the taste and quality of the finished, cooked pizza. There are also a number of ways of preparing and cooking pizza. The most common and typical method of preparation and cooking is what is referred to as "fresh" pizza. This method generally involves the flattening of the dough, placement of the sauce and cheese on the dough, and subsequent cooking in an oven. Once removed from the oven, the "fresh" pizza is consumed while it is still hot or warm.

The popularity of pizza has led to many different methods of preparation and cooking in order to provide pizza to consumers in many different forms, such that it is available for consumption in virtually any place. The typical method of preparation and cooking, as outlined above, is generally performed in a pizza parlor, restaurant or an individual's home, where the ingredients, as well as an oven, are available. The pizza is then consumed at the pizza parlor, restaurant or home, whichever is more convenient. However, this typical method of preparation and cooking requires one to have the necessary ingredients available, and to also have an oven available for use. These requirements restrict the availability of "fresh" pizza.

Several approaches have been developed to address these requirements of pizza preparation, i.e., the requirement for the necessary ingredients, and the requirement for the oven. One such approach involves the use of frozen pizzas. This approach eliminates the requirement for having the necessary ingredients on hand. Instead, the prepared, frozen pizza, which can be purchased at a store ahead of time and stored in one's freezer, can then be cooked in one's oven at any convenient and desirable time. However, the use of frozen pizzas still requires one to have access to an oven. Also, the resulting pizza is sometimes not of the same quality as "fresh" pizza, i.e., where the ingredients are assembled together and then cooked right away.

Another approach that has been developed in order to make pizza more readily available in more places is the use of vending systems or vending machines. These machines typically use pre-stored, frozen pizza which are then cooked in an oven within the vending machine and then dispensed to a customer. This approach eliminates the need for having the necessary ingredients and for having an oven available. However, such vending machines typically use frozen pizza as the starting point. As a consequence, the resulting pizza produced by such a machine is not really considered "fresh" pizza, nor does have the taste of "fresh" pizza.

Yet another approach to preparing pizza by way of vending machines is the use of fresh ingredients in order to better provide what is considered a "fresh" pizza. Such machines are disclosed in, for example, U.S. Pat. Nos. 5,921,170 and 6,086,934, both to Khatchadourian et al., the contents of which are incorporated herein by reference.

SUMMARY OF THE INVENTION

Various embodiments of the present invention are directed to an apparatus for preparing and cooking pizza using fresh ingredients, the apparatus being in the form of a vending-type of machine. By way of a keypad, touchpad, touch screen display or other user interface provided on the machine, a user specifies the type of pizza desired. The machine then proceeds to combine the ingredients needed to create the requested pizza, cooks the pizza, as appropriate, places it in a box, and dispenses the boxed pizza to the user or customer.

Generally, the pizza preparation machine (also referred to as the pizza making apparatus or machine) is provided with fresh ingredients in various types of appropriate containers. For example, the dough may be provided in the form of sealed canisters or tubes, which are opened in an automated fashion. Slices of dough may be cut from the dough canisters for each pizza which is to be made. Sauce may be provided in the form of sealed tubes, bags, or containers, whereby a controlled amount of the sauce may be dispensed by way of a controlled dispensing system, such as a pump or similar mechanism. Finally, the cheese may be provided in a bag or other container, whereby a measured amount of cheese may be dispensed and provided on each pizza as it is prepared.

The pizza preparation machine may also include a refrigerated section for maintaining at an appropriate temperature ingredients that need to be refrigerated in order to preserve the freshness of such ingredients, as well as to ensure a proper sanitary and food handling environment.

The pizza preparation machine may also include an oven section where the pizza is cooked. Additionally, the pizza preparation machine may also include a box formation section where a box may be formed for the pizza to be placed inside the box. For example, the pizza preparation machine may be provided with a stack of box blanks, i.e., unfolded boxes, such that the box formation section retrieves an individual box blank and folds it as appropriate in order to create a three-dimensional box. The pizza that has been cooked by the oven can then be inserted inside the formed box. The formed box may then be closed, and then dispensed to the user or customer by way of an opening in the pizza preparation machine.

The pizza preparation machine may also include appropriate controlled movement mechanisms employing controlled motors or other types of actuators for moving various elements within the machine in order to create the pizza and then transfer the pizza through the various sections within the machine. For example, such controlled movement mechanisms, driven by one or more corresponding actuators, may include a controlled knife for cutting a specific piece of dough, horizontal and vertical transfer mechanisms for moving the cut dough to the various sections of the machine, as well as controlled movement mechanisms for dispensing the ingredients or toppings in a specified amount and in a specified location. Additionally, sensors may be positioned at predetermined locations within the machine to indicate the presence or absence of particular events in order to facilitate the pizza-making process. For example, sensors may be used to indicate the movement of the dough to a sufficient position to thereby indicate a predetermined thickness of dough which is to be cut by the knife. Such sensors and controlled movement mechanisms may be operated in conjunction with one or more programmed processors or other electronic controller device or devices.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 7A is a front left elevated perspective view of an uninstalled dough handling module according to one embodiment of the present invention;

FIG. 8 is a front, left, elevated wireframe perspective view of a dough handling module without dough canisters according to one embodiment of the present invention;

FIG. 9 is a front, left, elevated wireframe perspective view of a dough handling module with dough canisters according to one embodiment of the present invention;

FIG. 15 is a perspective view of an extruder and canister lock cylinders according to one embodiment of the present invention;

FIG. 16 is a front, right, elevated wireframe perspective view of a hot-press module with a puck elevator at an upper level according to one embodiment of the present invention;

FIG. 17 is a front, right, elevated wireframe perspective view of a hot-press module with a puck elevator at a lower level according to one embodiment of the present invention;

FIG. 25A is a detailed view of a cheese handling portion of an ingredients dispensing module according to one embodiment of the present invention;

FIG. 25B is a bottom view of the exterior of a cheese tub container according to one embodiment of the present invention;

FIG. 25E is a perspective view of a cheese dispenser in an extended position relative to a toppings plate according to one embodiment of the present invention;

FIG. 25G is a perspective view of a cheese dispenser coupled to a measuring tube via a trap door in a second position according to one embodiment of the present invention;

FIG. 30 is a top, left, elevated perspective view of a boxing module and an oven according to one embodiment of the present invention;

FIG. 31 is a top, left, elevated perspective view of a cooked pizza being removed from an oven according to one embodiment of the present invention;

DETAILED DESCRIPTION

Throughout this description the term "actuator" will be used to indicate a device that imparts a desired mechanical motion to another component. It will be appreciated that any suitable actuator may be used; for example, preferred embodiments use electric motors for many of the actuators discussed herein. However, other types of actuators can also be used, including pneumatic or hydraulic devices, solenoids or the like, depending upon the particular requirements of the specific task the actuator is to perform.

Figure 1:
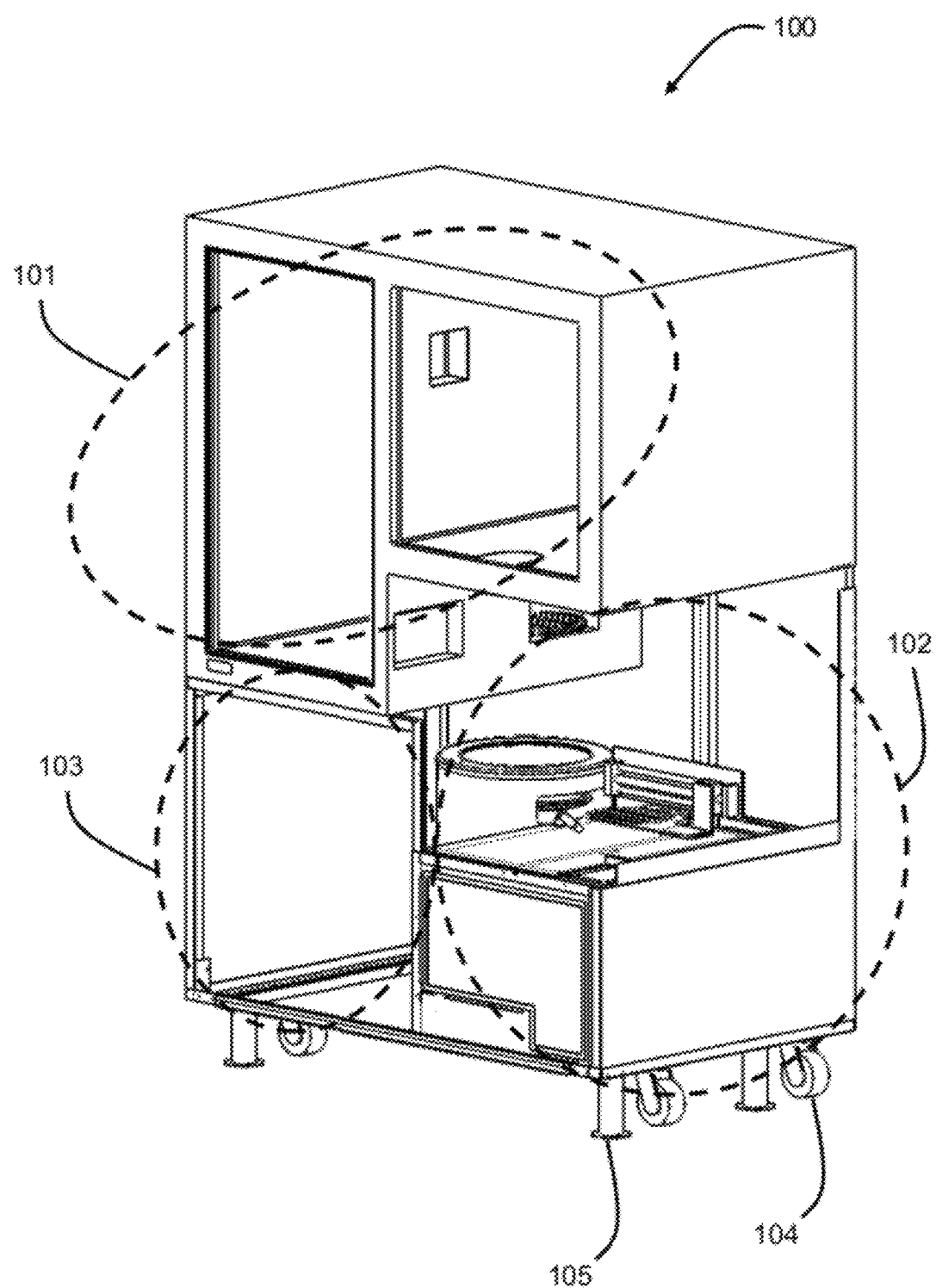
FIG. 1 is a front perspective view of a housing of a pizza making apparatus according to one embodiment of the present invention.

Referring to FIG. 1, an example of a housing 100 of an automated pizza maker is illustrated. For the sake of clarity, housing 100 is illustrated substantially without interior machinery. Housing 100 can include a refrigeration module 101, a cooking module 102 and a boxing module area 103. Refrigeration module 101, as described below, includes apparatus used to store and process edible components prior to and during preparation of an individual pizza. Cooking module 102, as described below, includes apparatus used to cook an individual pizza. Boxing module 103, as described below, includes apparatus used to package a cooked pizza for delivery to a customer. Housing 100 may also include one or more wheels 104 and/or stands 105. Wheels 104 may be used for transporting housing 100, and stands 105 may be used to fix housing 100 at a desired location. Other designs of housing 100 that place modules in a different physical relationship with each other may be used, with corresponding alterations to the transfer of the pizza and/or its components from one module to another.

Refrigeration module 101, cooking module 102 and boxing module 103, as well as any sub-modules therein, may include sensors to monitor various conditions described below, or to provide verification that various commanded movements and motions described below have in fact taken place as commanded or expected. Waiting times for a step to complete may depend upon the sensed conditions, and alarms may be raised if various commands have not completed as commanded or expected. The selection and placement of these sensors is known by persons of skill in the art, unless described otherwise. These modules and sub-modules may be under the monitor and control of a respective module processor, which in turn may be in communication with neighboring module processors when an action should be coordinated with a neighboring module. Such an architecture allows for simpler interconnect wiring throughout the automated pizza maker. The module processors may be in further contact with an overall system processor. Collectively these electronics form the control circuitry of an embodiment device to control all aspects of the device.

Figure 2:
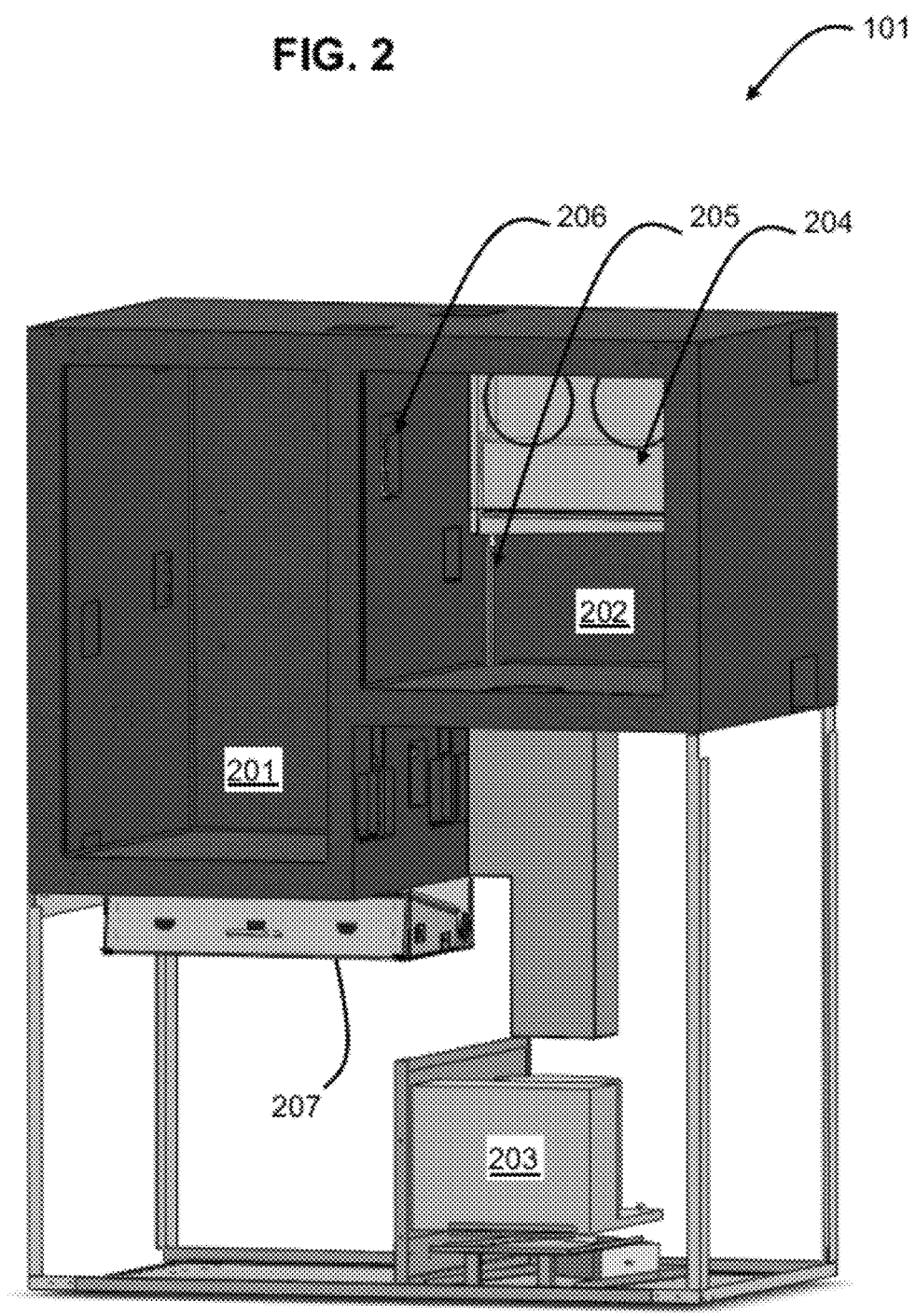
FIG. 2 is a front perspective view of a refrigeration module in the housing of a pizza making apparatus according to one embodiment of the present invention.

Referring now to FIG. 2, refrigeration module 101 includes a refrigerator compartment 201 and a freezer compartment 202. Refrigeration module 101 is cooled by refrigeration equipment that may include compressor/condenser 203, evaporator 204, coolant tubes 205 that connect compressor/condenser 203 and evaporator 204, refrigerator fan 206, and filter housing 207.

Figure 3:
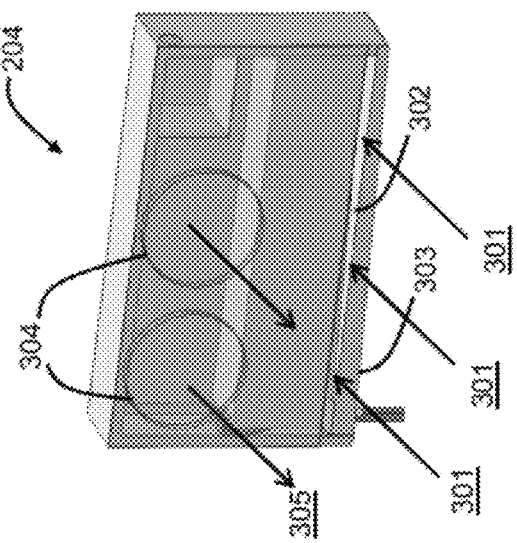
FIG. 3 is perspective view of an evaporator according to one embodiment of the present invention.

Exemplary operation of evaporator 204 is illustrated in FIG. 3. A stream of input air 301 is drawn from the interior of refrigeration module 101 through air inlet 302. Input air 301 passes over evaporator pan 302. Above evaporator pan 302 is a heat pump coil (not illustrated in FIG. 3). The heat pump coil cools input air 301, to produce a stream of output air 305, which may be filtered, and which is expelled back into the interior of refrigeration module 101 through air outlet 304.

Figure 4:
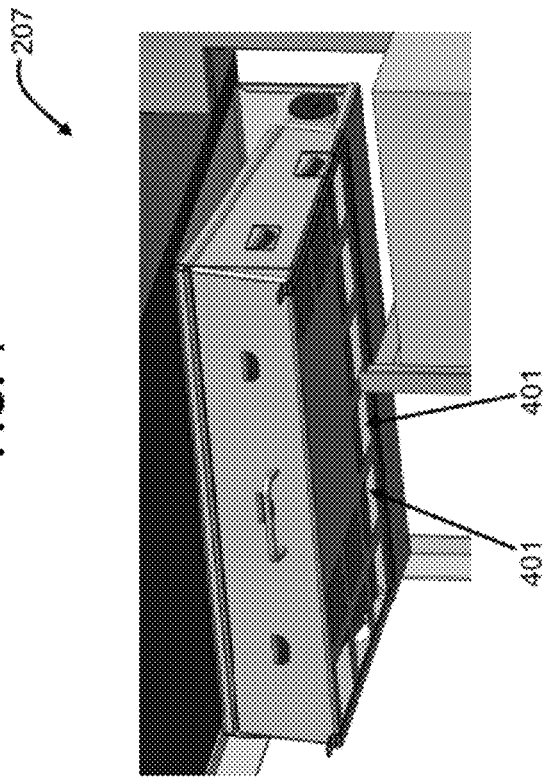
FIG. 4 is a lower front right perspective view of an exhaust filter housing according to one embodiment of the present invention.

FIG. 4 is a lower front right perspective view of filter housing 207, which is coupled to refrigerator compartment 201 and is located above the cooking module 102. Within filter housing 207 are one or more air-moving devices such as a fan, an impeller, bellows or the like, which draws a stream of input air 401 through one or more inlets 401 into filter housing 207, which is then filtered in a conventional fashion and subsequently exhausted from device 100. The filter housing 207 is used to treat and expel the hot and potentially smoke laden air out of the device 100. The action of expelling air out of the device 100 draws in "fresh" air into the device 100 through vents on the bottom of the large front outer door to cool the internal air of device 100.

A plurality of thermocouples or other suitable temperature-measuring devices (not shown in FIG. 3 or 4) may be provided within refrigeration module 101 to monitor the temperature at various places for proper operation. By way of example, programmable control circuitry within device 100 may activate other components within device 100 in accordance with pre-programmed criteria in response to input temperature signals generated by the temperature-measuring devices. For instance, temperature of air inside the filter housing 207 may be measured by a first thermocouple located inside the exhaust filter housing 207 and after the air filters. Input air 301 entering evaporator 204 may be measured by a second thermocouple, and output air 305 exiting the evaporator 204 may be measured by a third thermocouple. Temperature of air inside refrigerator compartment 201 may be measured by a fourth thermocouple. For ease of reference, the temperature measured by the first through fourth thermocouples may be referred to as $T1$-$T4$, respectively. Various calculations may be made, based upon temperature measurements produced by the thermocouples. For instance, an average freezer air temperature may be calculated as $(T2+T3)/2$, and an evaporator differential can be calculated as $|T2-T3|$. One or more of the thermocouples can also be monitored for comparison to one or more corresponding temperature thresholds (e.g., "low," "high," "very high," etc.). The device 100 control circuit may then activate other components, such as fans or the like, based upon the processing of these temperature measurements and related pre-determined threshold conditions.

In a preferred embodiment, a temperature sensor may be positioned near the dough, and distanced away from the evaporator outlet. Such a sensor may be used without the need for averaging to control the freezer compartment temperature. A dough wheel module, described in detail below, may have additional fans mounted on it to circulate and mix the air throughout the cabinet to minimize temperature gradients and improve dough consistency.

In other embodiments a temperature sensor may be attached to the evaporator refrigerant feed line tubing and used to measure the temperature of the hot gas leaving the evaporator in hot gas mode to judge when to end a defrost cycle. In defrost mode, the refrigerant flows in the opposite direction, bringing hot gas into the evaporator for rapid defrosting. The presence of ice or frost on the evaporator fins and tubes tends to keep the temperature of the hot gas leaving the evaporator from rising too high, and thus a rise in gas temperature beyond a predetermined threshold may indicate that ice or frost on the evaporator has melted.

In other embodiments, a temperature sensor may be used to control a fan that draws air from the freezer side to the fridge side into a toppings compartment, which is discussed at length below.

In yet other embodiments, a temperature sensor may be used to measure the temperature of exhaust air from the device 100 to determine effectiveness of an exhaust blower to cool the ambient air inside the device 100 (not to be confused with the air inside the refrigerated cabinets). Another temperature sensor may be used to monitor the evaporator refrigerant exit line, in which case the difference between the exit line and the feed line (discussed above) may be used to indicate the presence of ice on the evaporator to initiate a defrost cycle. As frost develops on the evaporator coil it insulates the refrigerant from the air flow, causing a drop in this temperature difference over time. When the average difference falls below a predetermined threshold over a predetermined amount of time, it may be interpreted as frost accumulation on the fins and a defrost cycle may be initiated.

Freezer compartment 202 may be a frost-free or non-frost-free design. The temperature measurements and their history can be used by a refrigeration module processor to predict a buildup of frost to a level at which defrosting may be advisable. Excessive frost impairs a cooling efficiency of the refrigeration module 101. Since defrosting involves changing temperatures inside refrigeration module 101 and may interfere with the rapid preparation of pizza, it may be desirable to defer defrosting, if possible, to a time when the demand for pizza is expected to be low, such as during overnight hours. Defrosting may also be commenced by manually by a technician, serviceman or the like. During such defrosting operations other maintenance or adjustments may be performed, such as changing the pizza recipe based on the local weather conditions and seasons. The external ambient air temperature measurements can be used as an indirect weather condition indicator for determining the frequency of the scheduled defrosts. Defrosting may be performed in a conventional manner as known in the art or as described above.

Figure 5:
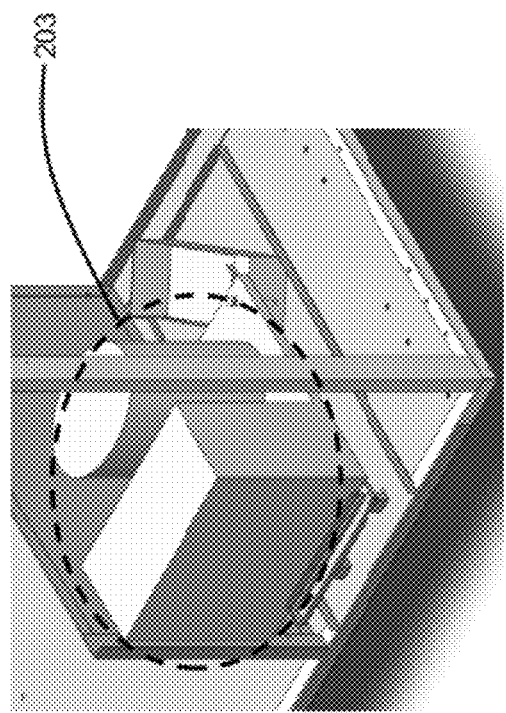
FIG. 5 is an elevated front right perspective view of compressor/condenser according to one embodiment of the present invention.

Referring now to FIG. 5, an elevated front right perspective view of compressor/condenser 203 is shown, which is used to maintain at least a portion of refrigeration module 101 at or below one or more preset temperature(s). Standard techniques known in the art may be used to control operations of the compressor/condenser 203 and the related defrosting heater for defrosting purposes. However, consideration of pending orders may be one variable when determining whether or not to initiate a defrosting cycle. For example, if a pizza order queue is empty and there is no activity on the user input/output touch screen, the defrost sequence may start immediately; otherwise, it may be delayed until the queue is empty. The defrost sequence may also be initiated manually via, for example, a technician user interface on the device 100 user interface, discussed below.

Also, during a defrost sequence, if the air temperature within freezer compartment 202 rises above a preset threshold for longer than a "dough control" time, which may be set based upon experience by a technician, a warning signal may be activated to provide a "dough is too soft" warning and thus, for example, shut down the defrosting sequence. In preferred embodiments the device control circuitry keeps the freezer compartment at a temperature that is between 20° F. to 25° F. This temperature range is ideal as it insures a natural taste of the baked pizza, and also provides desirable mechanical properties for the cutting and handling that is set forth in more detail below.

The temperature of the refrigerator compartment 201 may be controlled by the circulation of air from the freezer compartment 202. For example, if the air temperature within refrigerator compartment 201 rises above a predetermined threshold, and freezer compartment 202 is not defrosting, then control circuitry can activate refrigerator fan 206 in order to circulate air between refrigerator compartment 201 and freezer compartment 202. If the air temperature within refrigerator compartment 201 stays very high for a period of time that exceeds a "food safety" time-out, then a "food expired" alarm can be triggered. Once the air temperature within refrigerator compartment 201 drops below a predetermined threshold, the refrigerator fan 206 can be turned off.

A fan within exhaust filter housing 207 may be controlled by the refrigeration module processor. If the exhaust air temperature rises above a predetermined turn-on threshold, the exhaust fan within exhaust filter housing 207 turns on. If the exhaust air temperature rises above a second, higher threshold, then a "fire" alarm turns on. Once the exhaust air temperature drops below a predetermined turn-off threshold, the exhaust fan turns off. The turn-off threshold is preferably less than the turn-on threshold.

Figure 6:
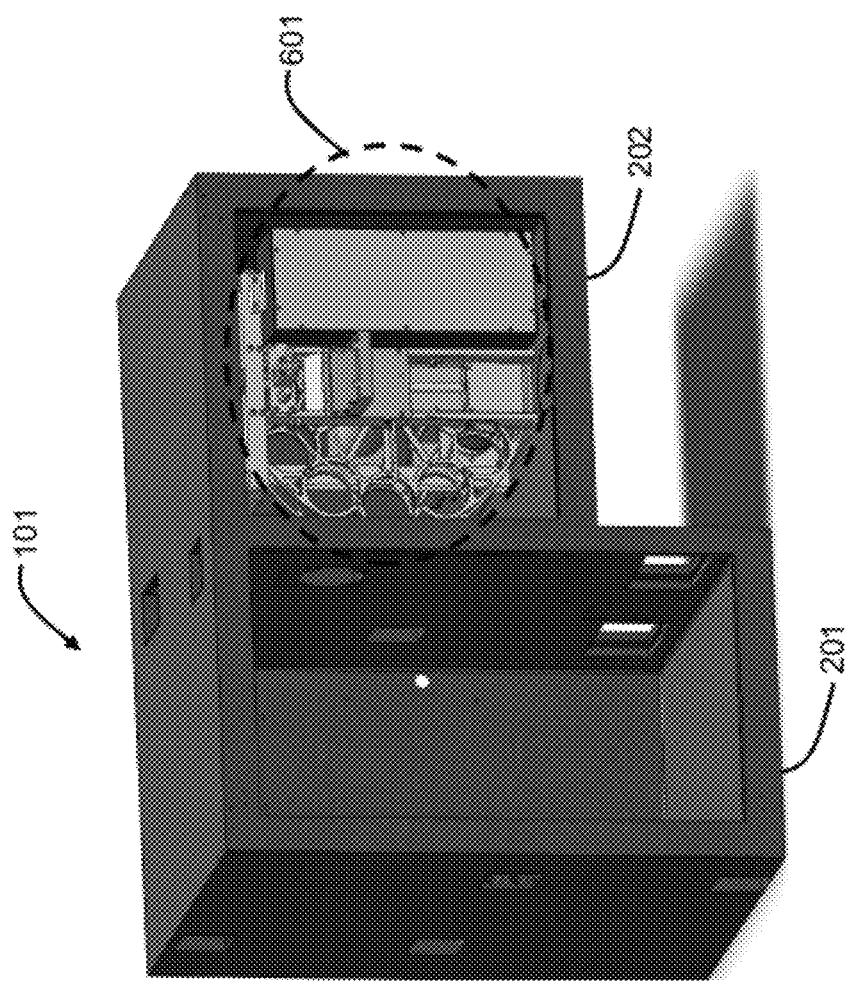
FIG. 6 is a front left elevated perspective view of a dough handling module installed within a freezer compartment of a refrigeration module according to one embodiment of the present invention.

Referring now to FIG. 6, there is illustrated a front left elevated perspective view of a dough handling module 601 disposed within freezer compartment 202 of refrigeration module 101. FIG. 7A illustrates a front left elevated perspective view of dough handling module 601 without refrigeration module 101, in order to more clearly show the components of dough handling module 601. Dough handling module 601 includes a dough canister holder in the form of a dough wheel 702 that is adapted to removably hold a plurality of dough canisters 701 in a respective cradle 710 and provide a selected dough canister 701 to subsequent equipment for downstream processing, as discussed below. For example, dough wheel 702 may serve as a revolver, rotatably cycling through cartridges of dough canisters 701, delivering them to mechanisms that perform specific tasks upon the selected dough canister 701. Each dough canister 701 contains refrigerated or frozen pizza dough. Each dough canister 701 preferably includes a removable lid 703 on at least a proximal end. A distal end of each dough canister 701 may include a moveable end surface or wall 703a, serving as a plunger or the like to push dough out from the proximal end once the lid 703 has been removed. Dough canister 701 and the dough therein are generally in a cylindrical or tapered shape in order to facilitate the preparation of round pizzas, but other shapes such as a rectangular cross-sectional shape may be usable, with the cartridge and plunger 703a shapes of each canister 701 being adjusted accordingly.

Referring again to FIG. 7A, dough handling module 601 further includes at least one lid-removal mechanism 704 and lid collection receptacle 708, which typically are disposed adjacent to a portion of dough wheel 702 on a side corresponding to the proximal end of dough canister 701 after dough canister 701 is inserted into dough wheel 702. Only one lid remover 704 is shown; however, preferred embodiments utilize a pair of lid remover mechanisms 704, one in front of the dough handling module 601 (as shown in FIG. 7A), and one in the back of the dough handling module 601 (not shown). Lid collection receptacle 708 may take the form of a tray, basket, bag, or the like. Dough handling module 601 further includes a dough pusher 705, which typically is disposed offset to a portion of dough wheel 702 on a side corresponding to the distal end of dough canister 701 after dough canister 701 is inserted into dough wheel 702 and engages with the plunger 703a in an active dough canister 701. Dough pusher 705 may be sufficiently offset from dough wheel 702 to allow clearance for dough canister 701 to be positioned, by dough wheel 702, in front of dough pusher 705. Dough handling module 601 further includes a cutting mechanism 706 (illustrated in FIG. 7A in a lowered position), which typically is disposed adjacent to a portion of dough wheel 702 on a side corresponding to the proximal end of dough canister 701 after dough canister 701 is inserted into dough wheel 702. Dough handling module 601 also includes a collection plate 707 to collect the cut dough; the collection plate 707 can be part of a puck elevator 1601, discussed later with reference to FIG. 16.

Operation of dough handling module 601 proceeds first by the loading of dough wheel 702 with one or more dough canisters 701 by, for example, a service person. Initially, the loaded dough canisters 701 are substantially filled with dough and are lidded. Dough canisters 701 are inserted such that a lidded end is facing in a proximal direction toward the front of dough handling module 601 in the orientation of FIG. 7A. During operation controlled by a dough module processor, which may be part of the overall device 100 control circuitry, dough wheel 702 is moved in order to position a selected, full dough canister 701 adjacent to lid-removal mechanism 704. Dough canister 701 may be selected based upon a lid-detection sensor (not shown in FIG. 7A), or based upon processor-based tracking of used and full dough canisters 701. Full dough canisters 701 may also be selected on the basis of avoiding excessively uneven weight loading of dough wheel 702. Hence, the control circuitry may cycle through canisters 701 in an alternating, opposing pattern to substantially maintain the balance of wheel 702.

Figure 7B:
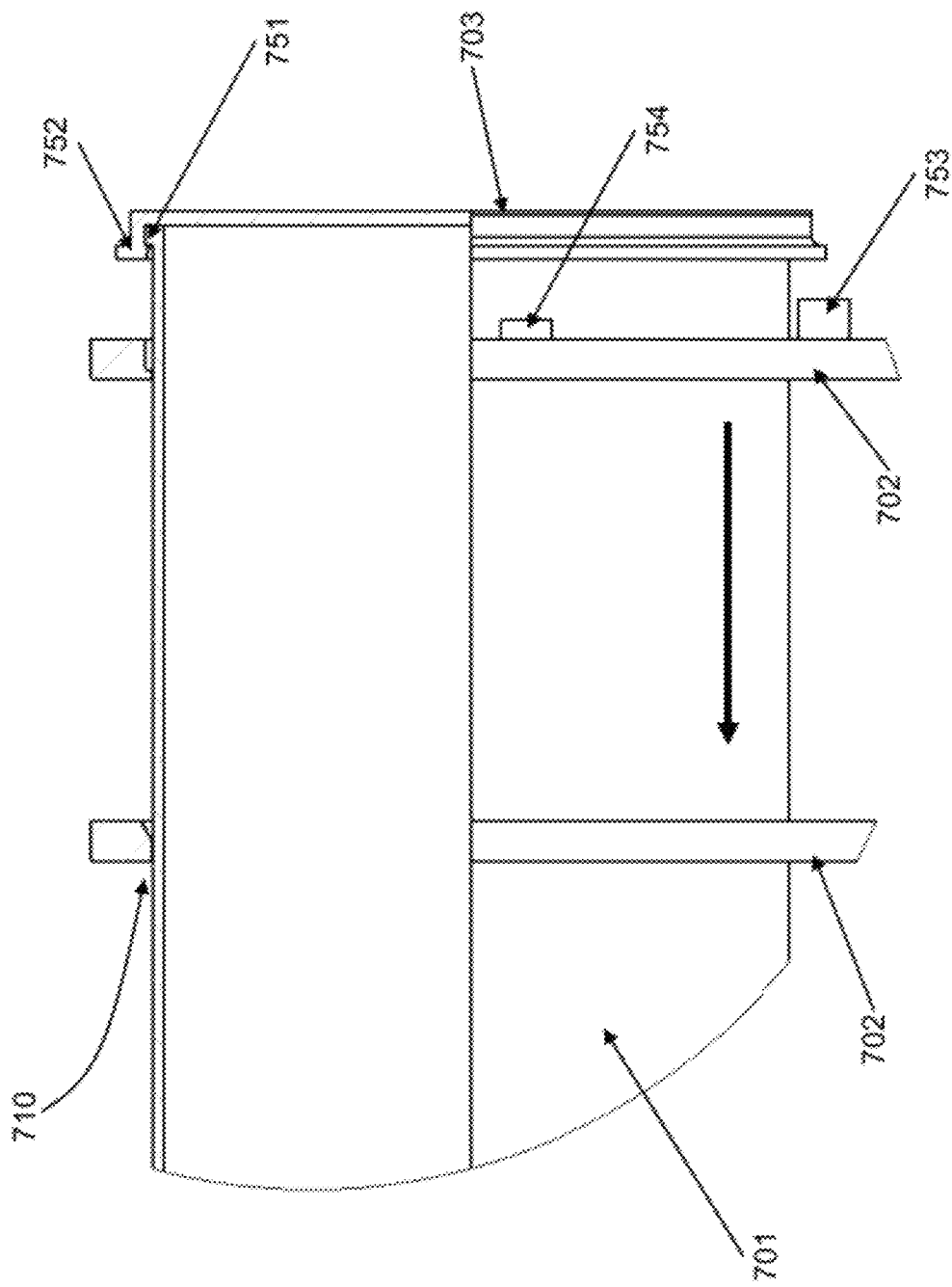
FIG. 7B is a combined cross-sectional and side view of a dough canister, flexible lid and dough wheel according to one embodiment of the present invention.

Lid-removal mechanism 704 removes lid 703, for instance by way of suction, prying, etc. Any suitable mechanism may be used as determined, for example, by the construction of the lid 703. Dough wheel 702 and/or dough canister 701 can include a mechanical stop in order to substantially prevent excessive horizontal movement of dough canister 701 as lid 703 is removed. FIG. 7B illustrates one embodiment of a dough canister 701, flexible lid 703 and dough wheel 702 designed to operate with a lid-removal mechanism 704. An openable end of dough canister 701 may have a circumferential flange 751 which couples with an overhang 752 of flexible lid 703 when dough canister 701 is sealed. Dough wheel 702 includes a cradle 710 used to support dough canister 701, the shape of cradle 710 being designed to closely match the cross-sectional shape of dough canister 701. Dough wheel 702 includes a plurality of posts 753, 754, arranged around at least a portion of the perimeter of cradle 710, that extend substantially perpendicular from the plane of dough wheel 702 on a side that faces lid-removal mechanism 704. Posts 753, 754 include posts of at least two different lengths.

Dough canister 701 is initially loaded into cradle 710 with the lidded end 703 facing toward the lid-removal mechanism 704, and may be positioned in cradle 710 such that flexible lid 703 gently touches the longer post 753. Lid-removal mechanism 704 removes flexible lid 703 from dough canister 701 by first applying a rear-ward (i.e., distal) force, such as by a force pushing the center of flexible lid 703, and/or a force pulling in a rear-ward direction on the distal end of dough canister 701. This can be performed by any suitable actuator, such as by a solenoid, a pneumatic device, worm gear or the like, which can engage with cap 703 on the proximal end of canister 701. Another device may similarly engage with, for example, a projection on the distal end of the canister 701 to further distally urge canister 701. In a preferred embodiment, discussed below, a rear lid plunger 802 may be used that employs suction to distally pull upon the canister 701, such as upon the plunger 703a. Contemporaneously, suction may be used on the proximal side and activated to draw flexible lid 703 toward lid-removal mechanism 704. The rear-ward force pushes the assembled dough canister 701 and flexible lid 703 against the first post 753 having the greatest length. Suction can be provided by the same actuator that provides the mechanical motive force upon the lid 703, or may be provided by a suction cup, hose, hoses or combinations thereof and engaged therewith.

Continued application of the rear-ward force pushes dough canister 701 backward, but also forces flexible lid 703 to disengage from circumferential flange 751 of dough canister 701 at the location of a first post 753. Continued application of rear-ward force continues to push dough canister 701 backward, forcing flexible lid 703 to disengage from circumferential flange 751 of dough canister 701 at the location of a second post 754, the second post 754 having the next greatest length. Application of rear-ward force continues until lid 703 pops off. The suction is maintained while the lid remover 704 retracts, bringing the lid 703 with it, and is then deactivated, allowing the removed flexible lid 703 to fall.

In one embodiment, posts 753, 754 are arranged around the circumference of cradle 710 in order of their lengths. Flexible lid 703 is ideally flexible enough to resist breaking, but not so flexible that insufficient force is coupled to the perimeter of flexible lid 703 to disengage flexible lid 703 from dough canister 701. After lid 703 pops off, backward motion of dough canister 701 stops as circumferential flange 751 of dough canister 701 engages with dough wheel 702 at the edge of cradle 710.

Removed lids 703 drop to lid collection receptacle 708 for collection. Dough wheel 702 then positions the de-lidded dough canister 701 as an active canister 701 adjacent to cutting mechanism 706. Lid-removal mechanism 704 retracts, in order to facilitate positioning of dough wheel 702 and dough canister 701 adjacent to cutting mechanism 706. Dough pusher 705 pushes the distal end wall 703a of dough canister 701, which in turn extrudes a portion of the dough through the de-lidded proximal end of dough canister 701, to be engaged by cutting mechanism 706.

Figure 7D:
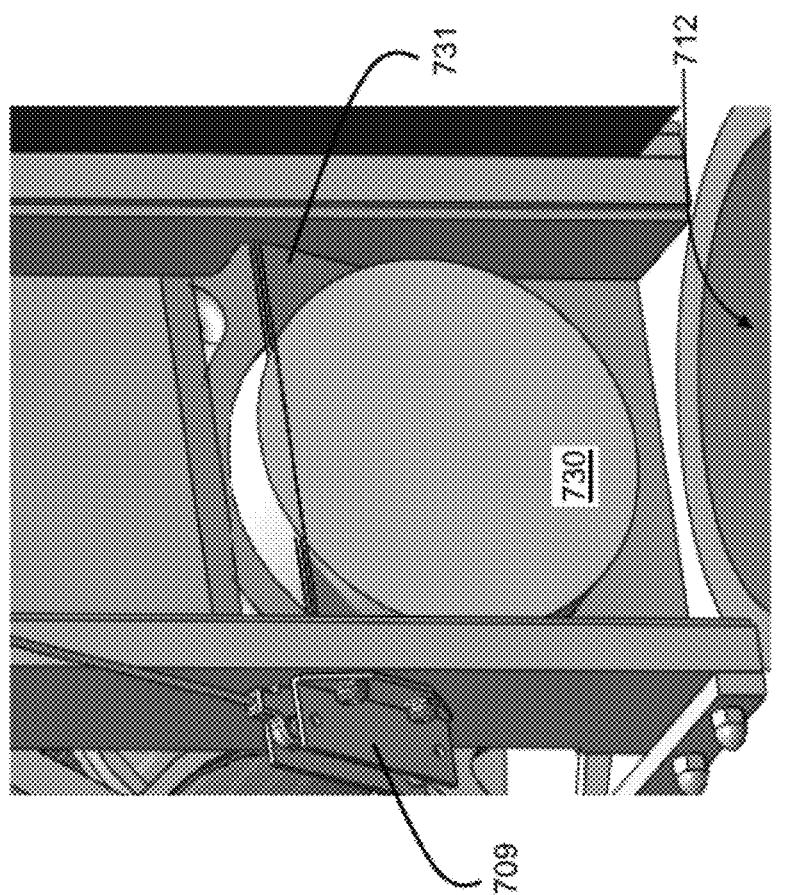
FIG. 7D is a perspective view of dough being extruded for slicing according to one embodiment of the present invention.
Figure 7C:
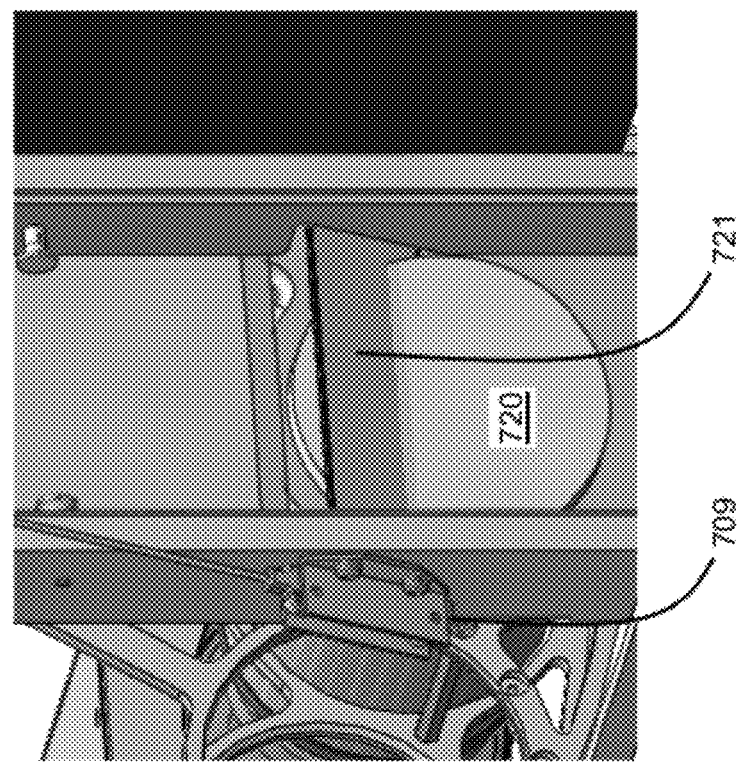
FIG. 7C is a perspective view of dough being extruded for slicing according to one embodiment of the present invention.

Sensors 709 operate to detect the amount of dough that has been extruded. Sensors 709 may operate optically, such as a linear array of emitters (e.g., LEDs) and matching detectors on opposing sides of extruding dough, for example. However, any suitable detecting mechanism for measuring the amount of extruded dough may be used, including mechanical sensors or the like. With specific reference to an optical detection system, the optical detectors may produce a composite signal whose strength or voltage depends upon the amount of light received from the emitters corresponding. The linear array of emitters can preferentially be arranged at an angle that is not parallel to a forward cutting face of the extruded dough (e.g., at a diagonal angle with respect to the cutting face as shown in FIG. 7A, from proximal to distal ends, to as to be able to measure increasing thicknesses of extruded dough). Referring to FIG. 7C, as dough 720 begins to be extruded, light 721 from sensors 709 begins to be blocked. Referring to FIG. 7D, as more dough 730 is extruded, a greater portion of light 731 from sensors 709 is blocked, causing the composite signal to vary in strength as a function of dough extrusion distance. The strength of the composite signal can be monitored to measure the thickness of the extruded dough, and used as a signal by the control circuitry to initiate operation of cutting mechanism 706 when the dough is at a desired thickness. The desired thickness can be user-selectable in order to provide a pizza crust having a selectable characteristic. Hence, user the input/output interface for the device 100 can change parameters in the control circuitry that cause the control circuitry to correspondingly change the thickness at which the dough is cut.

Range of sensors 709 may be affected by the number of emitters in the linear array of emitters and/or the length of the array. The sensitivity of sensors 709 can be affected by how closely the individual emitters and detectors are arranged within sensors 709. The angle at which the linear array of emitters are arranged with respect to the forward face of the extruded dough can also affect the range and sensitivity of the measurement of the amount of extruded dough. For instance, a perpendicular angle provides the greatest range but least sensitivity for a given sensor size and density. Conversely, a relatively shallow angle provides a small range but the greatest sensitivity. The range and/or sensitivity can be chosen to provide at least as much range as the difference between the thinnest pizza that might be prepared (e.g., a thin crust pizza) and the thickest pizza (e.g., a deep dish pizza), plus an allowance for tolerances and variations in monitoring and control.

Dough canister 701 may have a substantially cylindrical shape (as opposed to a tapered shape) in order to present a substantially constant friction per unit of length as the dough is extruded. A mechanical stop, such as provided by flange 751, can engage with a face of the cutting mechanism 706 to substantially prevent forward movement of dough canister 701 as the dough is extruded from dough canister 701. Cutting mechanism 706 cuts the extruded dough to create a dough puck (not shown in FIG. 7A). The dough puck drops to a collection plate 707 on a puck elevator 1601, discussed with reference to FIG. 16, for further processing by the automated pizza maker, which passes through a hole 712 in the insulation of the freezer compartment 202.

Referring now to FIG. 8, there is illustrated a front, left, elevated wireframe perspective view of dough handling module 601. Elements illustrated but not previously described include extruder 801 and rear lid plunger 802. Extruder 801 is configured to move forward and engage with plunger 703a as dough pusher 705 pushes dough forward to be extruded from dough canister 701. To prevent unwanted forward motion of dough canister 701, a guillotine hub (not illustrated in FIG. 8) can engage with dough canister 701 at circumferential lip 751, thus forming a mechanical stop. A canister lock, such as locking cylinder(s) 1501 or the like, discussed later with reference to FIG. 15, may extend forward (i.e, proximally) from the rear of dough handling module 601, parallel to the path of extruder 801, in order to push against dough canister 701 and thus secure dough canister 701 against the guillotine hub.

Rear lid plunger 802 operates in cooperation with lid-removal mechanism 704. When lid 703 is to be removed, rear lid plunger 802 may engage with the distal end 703a of dough canister 701 to pull dough canister 701 backward as lid-removal mechanism 704 pushes lid 703 forward. Rear lid plunger 802 may operate by suction, prying, etc. Rear lid plunger 802 may be retractable, in order to facilitate subsequent positioning dough wheel 702 and dough canister 701 adjacent to cutting mechanism 706.

Referring now to FIG. 9, there is illustrated a front, left, elevated wireframe perspective view of dough handling module 601 being fully populated with dough canisters 701, at least some of which have lids 703 attached.

Prior to removal of lid 703 from dough canister 701, in an embodiment of the invention, the front (and back, if installed) lid-removal mechanisms 704, 802 are in an idle (refracted) position. The position of the lid-removal mechanism 704, 802 may be confirmed by use of a corresponding position sensor.

Figure 10:
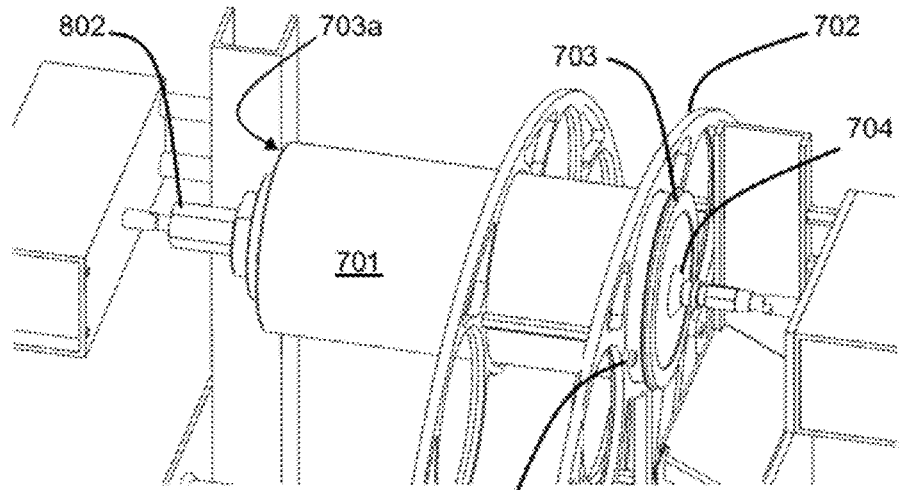
FIG. 10 is a first front, left, elevated perspective view of a portion of a dough handling module removing a lid according to one embodiment of the present invention.
Figure 11:
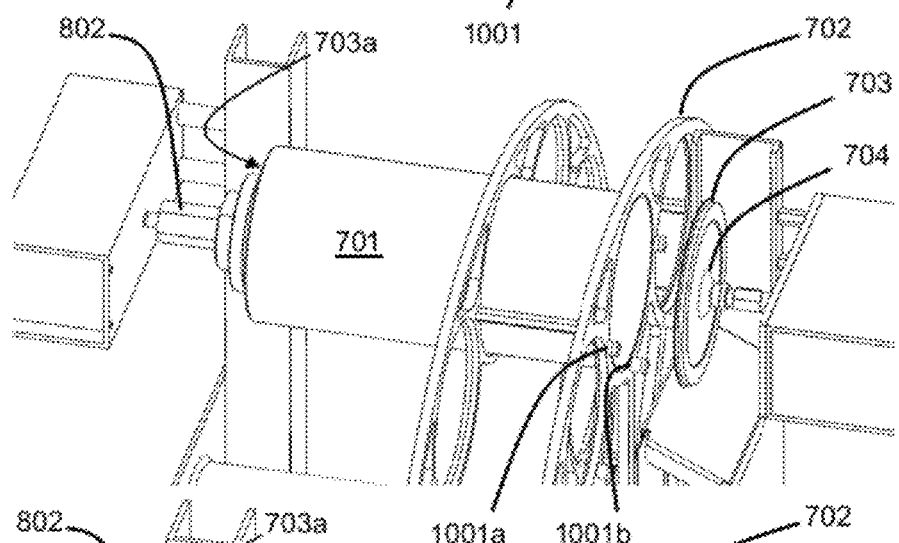
FIG. 11 is a second front, left, elevated perspective view of a portion of a dough handling module removing a lid according to one embodiment of the present invention.
Figure 12:
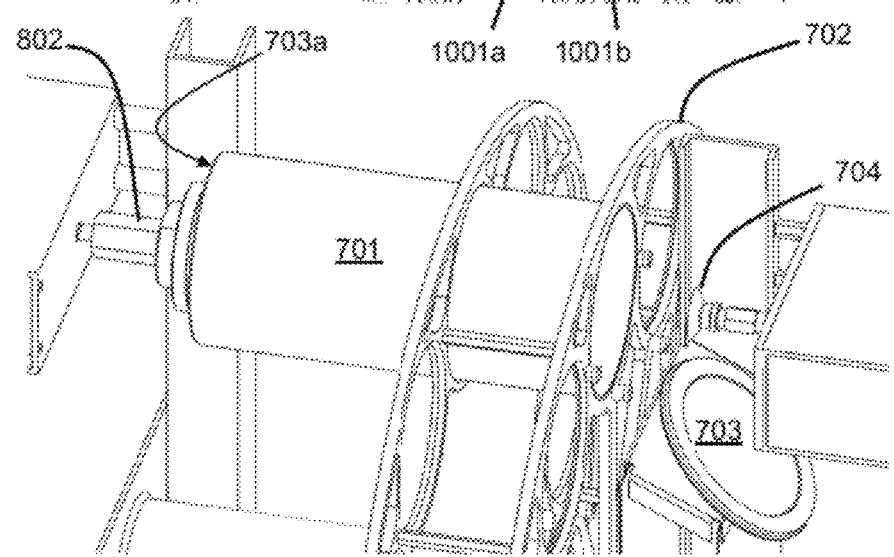
FIG. 12 is a third front, left, elevated perspective view of a portion of a dough handling module removing a lid according to one embodiment of the present invention.

Referring now to FIGS. 10-12, illustrated are front, left, elevated perspective views of a portion of dough handling module 601 in the process of removing lid 703 from dough canister 701 by a suction method. A plurality of posts 1001 are illustrated, with at least a first post 1001a having a different length than a second post 1001b. FIG. 10 illustrates dough canister 701 positioned in dough wheel 702, adjacent to lid-removal mechanism 704, with lid-removal mechanisms 704, 802 in extended positions so as to engage with respective ends 703, 703a of canister 701. FIG. 11 illustrates dough canister 701 having lid 703 removed and still coupled by suction to lid-removal mechanism 704, with lid-removal mechanism 704 in a retracted position. FIG. 12 illustrates disposal of lid 703 after suction is disabled from lid-removal mechanism 704. Any suitable type of actuator may be used to proximally and distally drive lid-removal mechanisms 704, 802.

Figure 13:
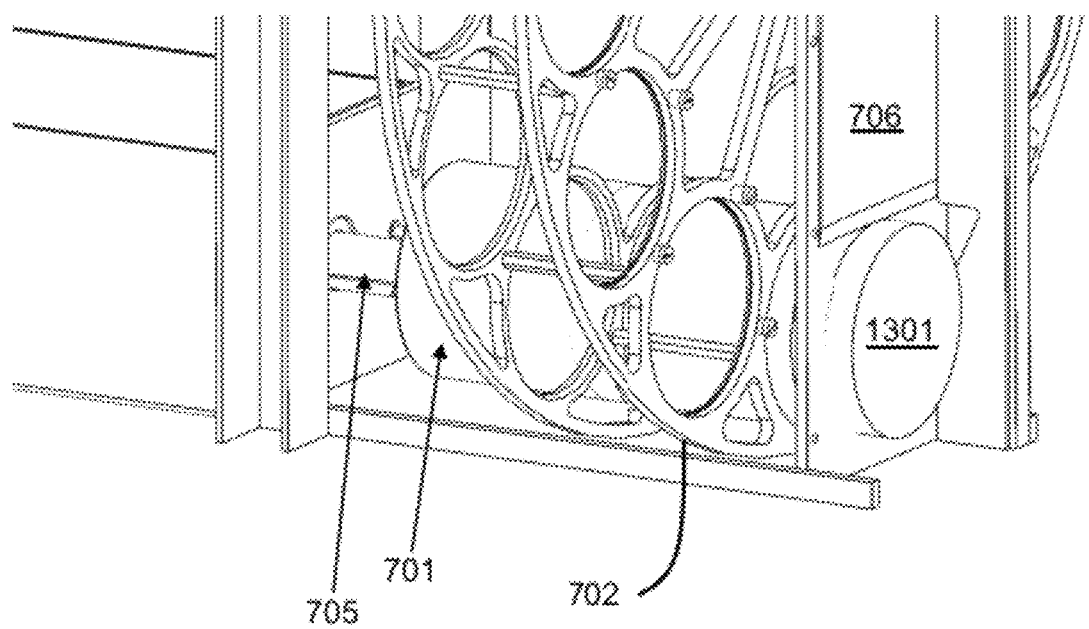
FIG. 13 is a front, left, elevated perspective view of a portion of a dough handling module, in which a dough portion has been extruded and is ready to be sliced according to one embodiment of the present invention.

After lid 703 is removed from dough canister 701, dough wheel 702 is rotated in order to position the opened dough canister 701 adjacent to the cutting mechanism 706. Referring now to FIG. 13, there is illustrated a front, left, elevated perspective view of a portion of dough handling module 601, in which the active opened dough canister 701 has been moved adjacent to cutting mechanism 706, and a dough portion 1301 has been extruded and is ready to be sliced by use of cutting mechanism 706. The thickness of dough portion 1301 may be sensed and/or controlled by sensors 709 (illustrated in FIG. 7A), in order—ultimately—to provide a pizza having controllable characteristics, such as crust thickness.

Once the customer order for a new pizza has been accepted, dough pusher 705 pushes forward the dough within dough canister 701, thereby extruding dough portion 1301. A predetermined thickness of dough portion 1301 can be produced by monitoring and/or calculating the velocity and acceleration of the dough through dough canister 701, and stopping motion of the dough pusher 705 when the predetermined thickness has been attained. The position of dough pusher 705 needed to produce the predetermined thickness of dough portion 1301 may also take into account the thickness of cutting mechanism 706.

Figure 14A:
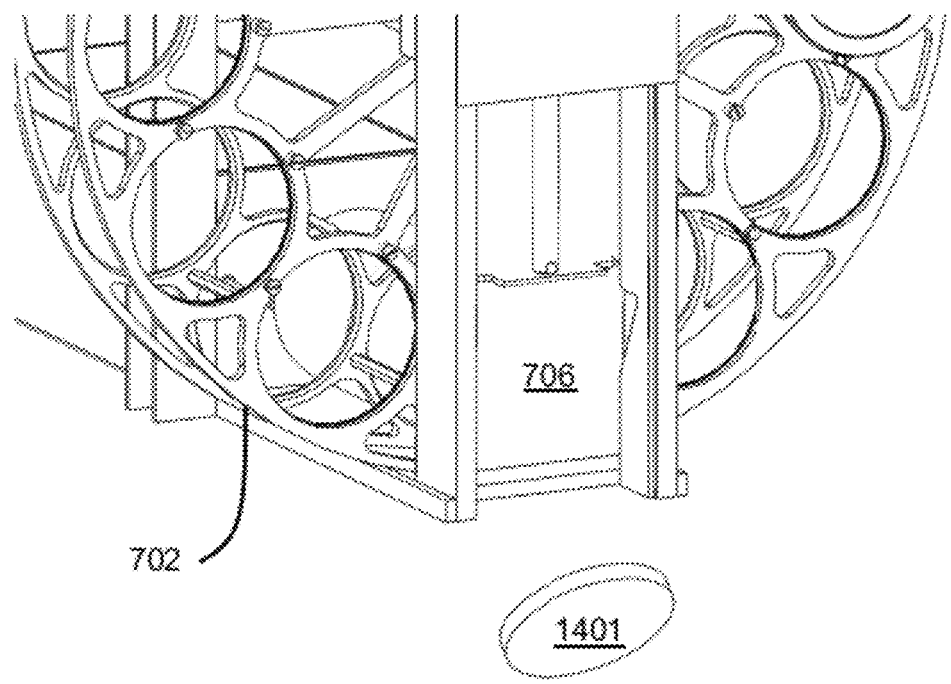
FIG. 14A is a front, left, elevated perspective view of a portion of a dough handling module, in which a dough portion has been sliced according to one embodiment of the present invention.

When it is time to cut the dough, the dough pusher 705 may retract for a short distance to prevent the further extrusion of dough. Referring to FIG. 14A, cutting mechanism 706 moves to an extended position, thereby slicing dough portion 1301 to produce a dough puck 1401. Dough puck 1401 then falls onto collection plate 707 (not shown in FIG. 14) for further processing by a hot-press module (described below). Various shapes of collection plate 707 may be useful, such as a flat plate, or a well-shaped receptacle adapted to match the shape of dough puck 1401.

Figure 14B:
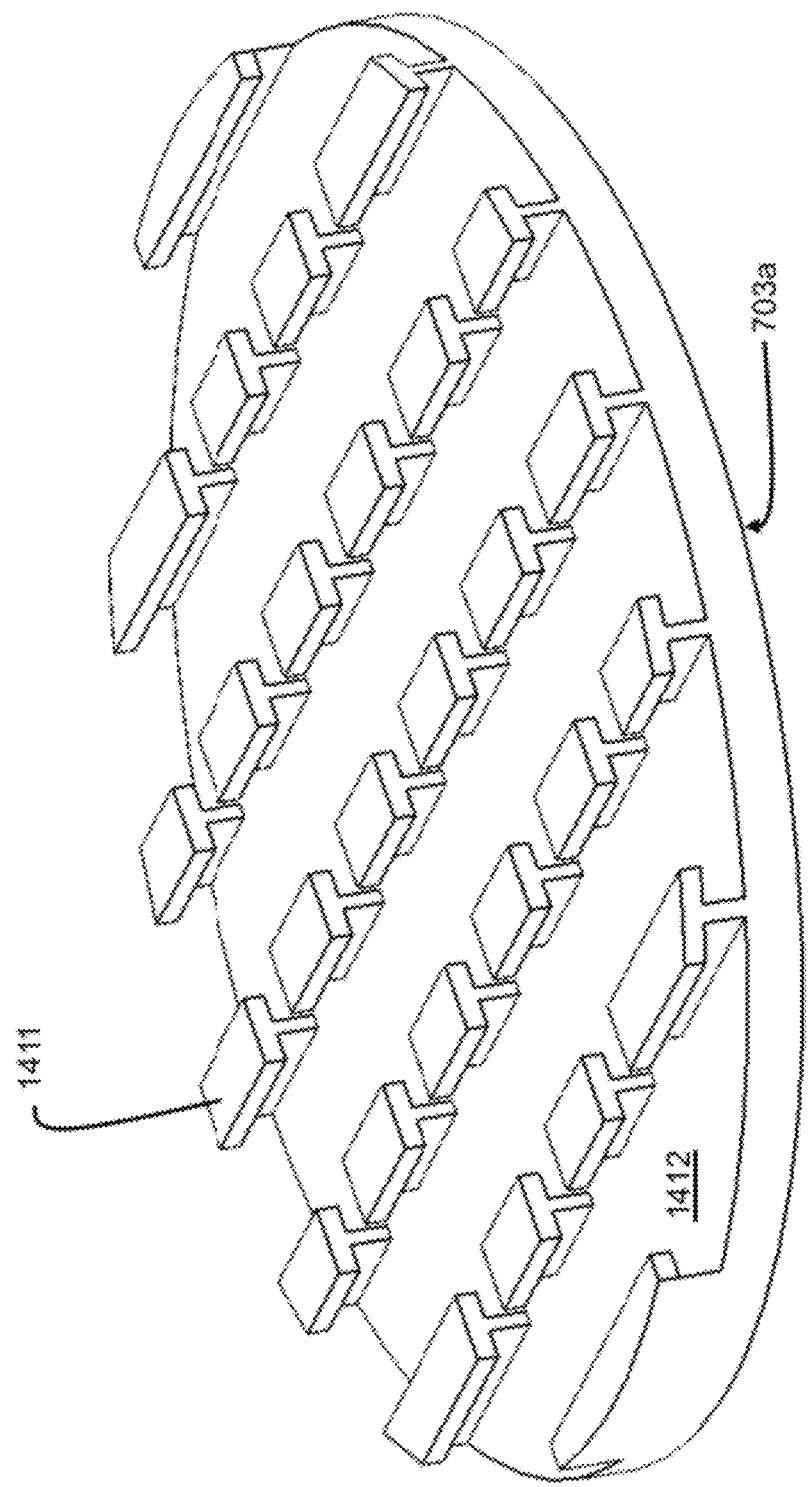
FIG. 14B is a perspective view of a moveable end surface of a dough canister according to one embodiment of the present invention.

Referring now to FIG. 14B there is shown an embodiment of the distal end wall 703a of dough canister 701, having a plurality of gripping knobs 1411 disposed on a proximal surface 1412 of distal end wall 703a. As cutting mechanism 706 slices dough portion 1301, a shear force is created in the dough, which would tend to pull more dough out from dough canister 701. To counteract this shear force, the moveable end surface 703a at the distal end of dough canister 701 is patterned with a plurality of gripping knobs 1411, which may have, for example, a T-shaped cross-section or the like to provide flanges that mechanically engage with and collectively grasp the dough. When dough canister 701 is initially filled with dough, dough flows around and among the plurality of gripping knobs 1411. As the dough freezes it hardens among the gripping knobs 1411, thereby securely gripping the dough and substantially preventing shear forces from pulling an undesired amount or shape of dough from dough canister 701 when the dough is cut.

Eventually, the dough within dough canister 701 is substantially used up, and further movement of extruder 801 of dough pusher 705 may be limited by a mechanical stop, sensors, a software stop based on the measured position of extruder 801, or combinations thereof. Referring now to FIG. 15, extruder 801 retracts from distal end of dough canister 701. Next, canister lock cylinders 1501, which may engage with a rim of canister 701, retract distally, unlocking dough canister 701 from the guillotine hub, and allowing dough wheel 702 to move. One or more actuators can be provided, controlled by the device control circuitry, to facilitate the proximal and distal movement of the extruder 801 and the lock cylinders 1501. Dough wheel 702 moves in order to move another selected, full dough canister 701 (if available) to be adjacent to the lid-removal mechanism 704 to serve as the next active canister 701. If all dough canisters 701 are empty then an alarm may be activated. If only one filled dough canister 701 remains in dough wheel 702, then a warning may be activated and the remaining filled dough canister 701 will be used next. If several filled dough canister 701 remain in dough wheel 702, then the next filled dough canister 701 is selected based upon factors such as balancing the weight load on the dough wheel 702. Lid(s) 703 of the selected filled dough canister 701 are removed, and the de-lidded dough canister 701 is moved by dough wheel 702 to be adjacent to the cutting mechanism 706.

Various sensors may be provided to ensure proper positioning of the dough and dough handling components throughout this process, and to detect anomalous conditions such as dough sticking to cutting mechanism 706 or whether certain operations are taking too much time, indicating the existence of a problem. The status of empty or filled dough canisters 701 can be verified periodically, and compared to status maintained by the dough module processor, with anomalies indicating corresponding malfunction conditions.

Referring now to FIG. 16, there is illustrated a front, right, elevated wireframe perspective view of hot-press module 1600. In a preferred embodiment, collection plate 707 is formed as part of puck elevator 1601. Puck elevator 1601 together with a rotary arm 1606, discussed below, serve as a first transfer mechanism to move the dough puck 1401 from the cutting mechanism 706 to the hot press module 1600 and is configured to move vertically between an upper level 1602 and a lower level 1603. Respective openings 1608, 712 in hot-press module 1600 and freezer compartment 202 may be provided to facilitate this movement. When hot-press module 1600 and dough handling module 601 are disposed within housing 100, upper level 1602 is preferably at or slightly below the level from which dough puck 1401 is cut from the dough. Optionally, puck elevator 1601 may have a surface that is shaped to substantially match, or flexibly overlap (e.g., by a skirt), the shape of opening 1608, thereby providing a thermal barrier between hot-press module 1600 and dough handling module 601 when puck elevator 1601 is at upper level 1602. In such embodiments, when not in use puck elevator 1601 can be kept positioned at the upper level 1602, or at a suitable corresponding position, to maximize the effectiveness of the puck elevator 1601 as a thermal barrier.

Lower level 1603 of hot-press module 1600 contains a bottom press plate 1604, a top press plate 1605, a press plate actuator 1609 for urging the press plates 1604, 1605 together, and a rotary arm 1606. Bottom press plate 1604 has an upward-facing surface 1607 that is situated below, and adapted to the shape of, a downward-facing surface (not shown in FIG. 16) of top press plate 1605. In an idle state of hot-press module 1600, upward-facing surface 1607 and the downward-facing surface of top press plate 1605 are brought together in a closed position, which can help to conserve heat if heaters of the press plates 1604, 1605 are shut off while the pizza vending machine awaits a pizza order.

Referring now to FIG. 17, there is illustrated a front, right, elevated wireframe perspective view of hot-press module 1600 with puck elevator 1601 at lower level 1603. Press plates 1604, 1605 have separated from their closed position in order to receive dough puck 1401. In operation of hot-press module 1600, after dough puck 1401 is deposited on or in collection plate 707, puck elevator 1601 brings dough puck 1401 down to lower level 1603, such that the bottom surface of dough puck 1401 is at a level at or slightly above upward-facing surface 1607. A top surface 2002 of a pie transfer arm 2001, discussed in more detail below, is level or substantially level with upward-facing surface 1607 to serve as a bridge between collection plate 707 and upward-facing surface 1607. At that level, an engaging surface of rotary arm 1606, which may be substantially conformal to the shape of the edge surface of dough puck 1401, pushes dough puck 1401 onto upward-facing surface 1607, and then rotary arm 1606 retracts to an idle position. A movement (e.g., vibration, jolt, etc.) may be provided by either rotary arm 1606 or by bottom press plate 1604 in order to help disengage dough puck 1401 from rotary arm 1606 in the event of sticking. Additionally, in some embodiments, when dough puck 1401 is pushed onto surface 1607 by rotary arm 1606, bottom press plate 1604 can descend to a height that is at least the thickness of dough puck 1401 below, for example 10 to 30 mm or more below, the top surface 2002 of pie transfer arm 2001 before rotary arm 1606 retracts; such movement of bottom press plate 1604 can further serve to disengage dough puck 1401 from rotary arm 1606.

Rotary arm 1606 moves in an arc, the shape and direction of which can be designed by the length of rotary arm 1606 and the location of its axis of rotation. In an alternate embodiment, an arm having linear motion in a desired direction could also be used. As previously indicated, rotary arm 1606 may have an engaging surface shape that is adapted to the shape of dough puck 1401, for instance a curved engaging surface shape for a round dough puck 1401, or a corner-like concave engaging surface shape for a rectangular dough puck 1401. Rotary arm 1606 may push dough puck 1301 by a rotary motion and/or linear motion.

Figure 18:
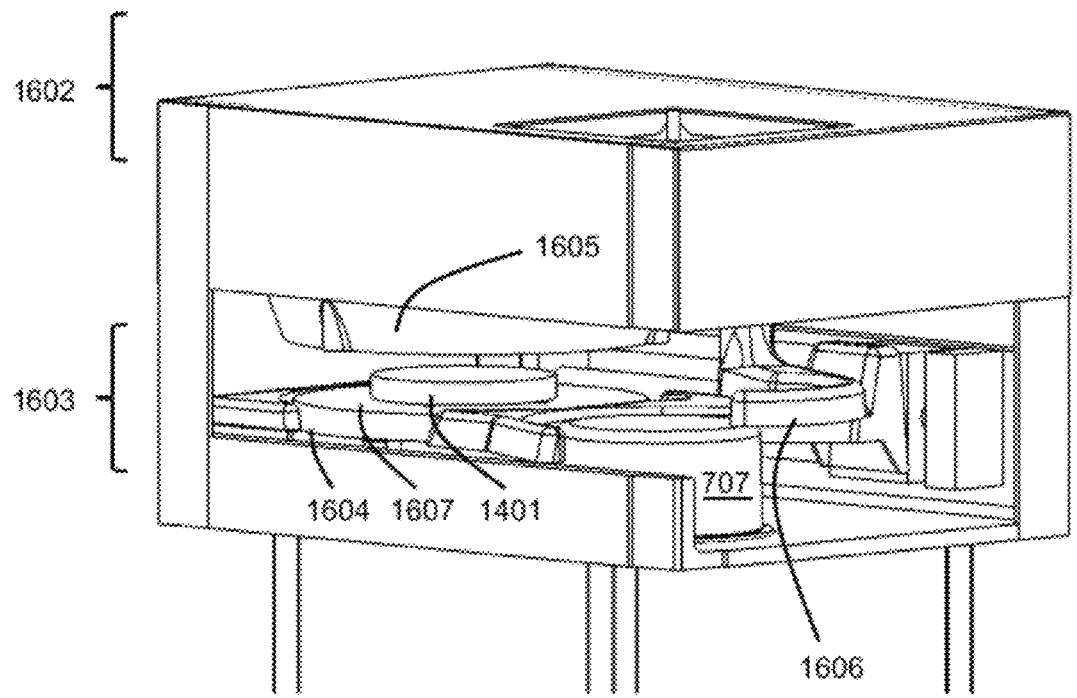
FIG. 18 is a front, right, elevated wireframe perspective view of a hot-press module after a rotary arm has pushed a dough puck onto an upward-facing surface according to one embodiment of the present invention.

Referring now to FIG. 18, there is illustrated a front, right, elevated wireframe perspective view of hot-press module 1600 after rotary arm 1606 has pushed dough puck 1401 onto upward-facing surface 1607. Puck elevator 1601 is still at lower level 1603.

Figure 19:
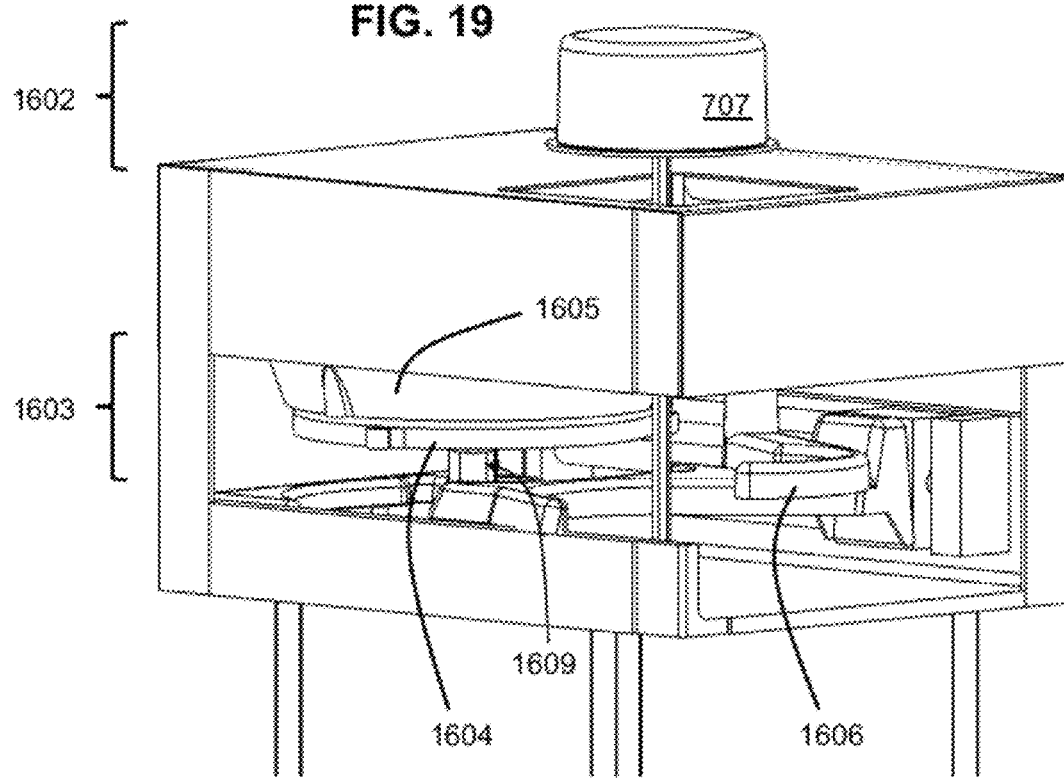
FIG. 19 is a front, right, elevated wireframe perspective view of a hot-press module as a bottom press plate and top press plate press a dough puck according to one embodiment of the present invention.

Referring now to FIG. 19, there is illustrated a front, right, elevated wireframe perspective view of hot-press module 1600 after at least one of bottom press plate 1604 and top press plate 1605 have been moved toward each other and engaged in order to press dough puck 1401 between them. Optionally, a mold may be formed in the engaging surfaces of press plates 1604, 1605 in order to help form the shape of the finished pizza. FIG. 19 illustrates bottom press plate 1604 having risen toward top press plate 1605, in other embodiments top press plate 1605 may drop towards bottom press plate 1604. Press plates 1604, 1605 thaw and ultimately compress dough puck 1401 under pressure to approximately the size (e.g., diameter) of the finished, cooked pizza. The separation between press plates 1604, 1605 can be adjusted to provide a pizza crust of selectable characteristics (e.g., thin crust, standard, or thick crust). The hot-press module thus forms an intermediate dough portion from the sliced dough portion of dough puck 1301 and onto which is subsequently disposed the customer-desired ingredients, if any.

One or both of bottom press plate 1604 and top press plate 1605 are heated in order to par-bake dough puck 1401 as dough puck 1401 is compressed. Heaters may be cast into the press plates 1604, 1605 or the press plates 1604, 1605 may be composed of two halves with standard ring heaters sandwiched in between. Heating time, temperature or both may vary if selectable crust thicknesses are provided. Press plates 1604, 1605 may begin to be pre-heated earlier in the process, such as when dough handling module 601 begins to process an order, in order to reduce par-baking time when dough puck 1401 is compressed.

Dough puck 1401 may be frozen when it is pushed onto bottom press plate 1604. At least the first time that a dough puck 1401 is cooked, the control circuitry may measure the time taken to compress a frozen dough puck 1401, i.e., the time taken to move bottom press plate 1604 from a first position to at least one other position toward top press plate 1605 as dough puck 1401 defrosts and begins to cook. The time may provide an indicator of the thickness and hardness of dough puck 1401 when it is frozen. Based on this time measurement, the controller may calculate a number and duration of short movements performed by bottom plate 1604 and/or top press plate 1605 to press frozen dough puck 1401 as it thaws. The short movements can include one or more cycles of moving bottom plate 1604 and top press plate 1605 together, and then separating bottom press plate 1604 and top press plate 1605. These movements better allow dough puck 1401 to flow and thaw without scorching the surface of dough puck 1401, as well as to form the desired and optimal pie crust, such as thick or thin, fluffy or dense, and so forth. These parameters may be experimentally determined, for example, and then programmed into the control circuitry; the control circuitry may process inputs received from sensors in accordance with these pre-programmed parameters to control the physical displacement of the press plates 1604, 1605 from each other, the temperature of the plates 1604, 1605, the cooking time and so forth.

Bottom press plate 1604 and/or top press plate 1605 may move to an "almost closed" position for a calculated length of time while par-baking dough puck 1401. As dough puck 1401 defrosts and is compressed between bottom plate 1604 and top press plate 1605, the dough flattens and flows outward to form the shape of the finished pizza. A mold may be formed in bottom plate 1604 and/or top press plate 1605 in order to provide a consistent shape, or to provide characteristics such as a raised or thicker perimeter portion of the finished pizza.

During par-baking, water vapor and gasses are expelled from the dough. In some embodiments, bottom plate 1604 and/or top press plate 1605 may include one or more controllable vent outlets, such as poppet valves or double valves, to allow the expelled water vapor and gasses to escape. Vent outlets are controlled to be open at least when expelling of water vapor and gasses is greatest. During par-baking, the dough also may have a tendency to cook faster on outer surfaces of the dough and more slowly in the interior of the dough, thereby leading to a ballooning or voids in the crust. In order to mitigate this effect, in some embodiments the bottom plate 1604 and/or top press plate 1605 may have one or more pinch points to pinch the top surface of the dough to the bottom surface of the dough. The pinch points may be provided by bumps on the bottom facing surface of the top plate 1605 that are, for example, 3-5 mm in height and 10-15 mm in diameter. By way of example, the pinch points may be arranged with one bump in the center of the top plate 1605 and a plurality, such as six, bumps in a circular pattern a predetermined diameter about the center, such as three inches about the center. The pinch points may have a height configured to almost touch the bottom plate 1604, leaving, for example, a 0.25 mm gap.

The par-baking time can be calculated based on factors such as previous time and temperature measurements for similarly-sized dough pucks 1401, and one or more internal temperatures of the pizza vending machine. Internal temperatures of the pizza vending machine may vary based upon factors such as the rate at which pizzas are prepared, or the length of time since a previous pizza was prepared, or the difference in temperature from outside the pizza vending machine. Prior to completion of par-baking, other modules within the automated pizza vending machine may be notified in order for them to begin preparing for further processing of the pizza.

Figure 20:
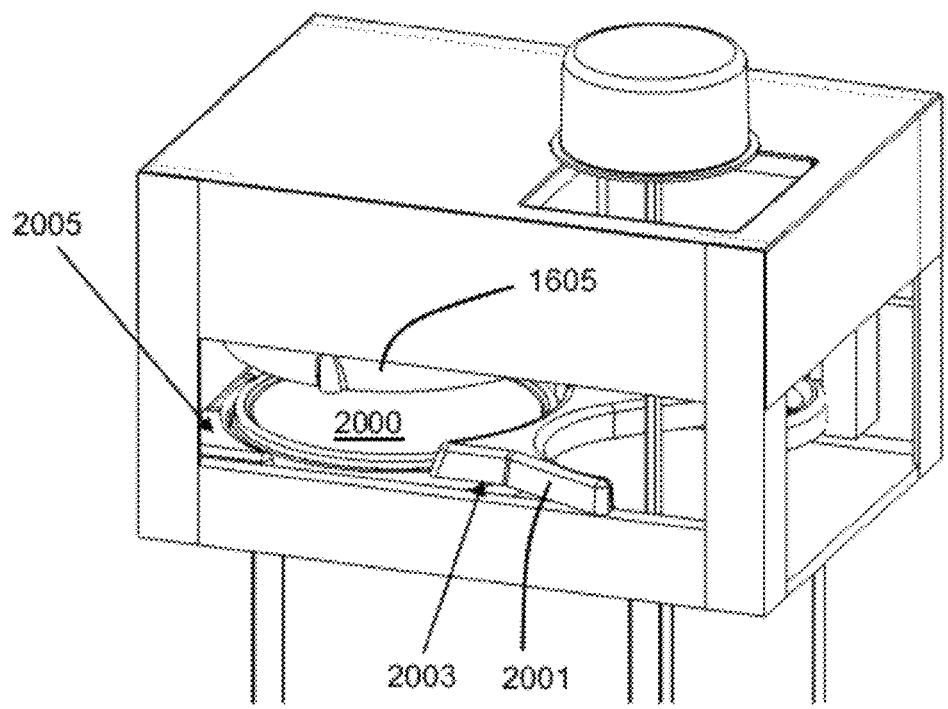
FIG. 20 is a front, right, elevated wireframe perspective view of a hot-press module after a bottom press plate and a top press plate have par-baked a dough puck according to one embodiment of the present invention.
Figure 21:
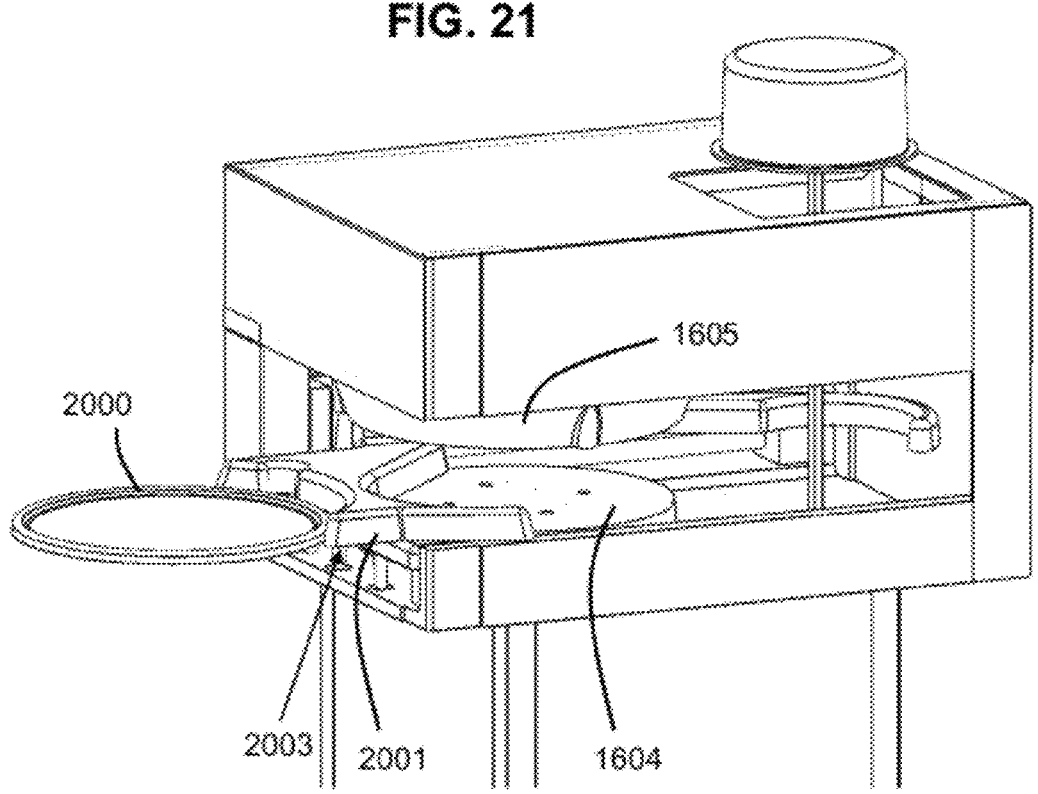
FIG. 21 is a front, right, elevated wireframe perspective view of a hot-press module as a par-baked dough puck is removed according to one embodiment of the present invention.

Upon completion of the par-baking operation by hot-press module 1600, release of the par-baked dough from the press plates 1604, 1605 may be assisted, such as by puffs of air from air outlets 1611 embedded in one or both of the engaging surfaces of press plates 1604, 1605, which discharge air between the par-baked dough 2000 and the respective press plate 1604, 1605. If appropriate valving is provided, such as by way of the valves discussed above, then the air outlets 1611 may share the same openings in press plates 1604, 1605 with the vent outlets used to collect expelled water vapor and gasses from the dough as it par-bakes. Referring now to FIGS. 20 and 21, press plates 1604, 1605 separate, and press plate actuator 1609 moves bottom press plate 1604 to a pie transfer level to await transfer of par-baked dough 2000 to the next module of the pizza preparation machine, which ordinarily applies toppings selected by the customer. The pie transfer level of bottom press plate 1604 may have the top surface 1607 of bottom press plate 1604 substantially level with, but slightly below, a bottom surface 2003 of pie transfer arm 2001 so that the bottom surface 2003 of pie transfer arm 2001 can pass over the tops surface 1607 of bottom press plate 1604. That is, the top surface 1607 is level but slightly above pie transfer bridge 2005. Hot-press module 1600 may be set to a standby mode if there are no other pizza orders presently queued, or may be set to a preheat mode if another pizza is in the queue.

When par-baked dough 2000 is ready to be transferred to an ingredients dispensing module 2200 (described below in connection with FIG. 22), a movement or puff of air may be used again to help avoid par-baked dough 2000 from sticking to an undesired surface. For example, pie transfer bridge 2005 may have pressurized air being ejected straight upward or slanted to reduce sticking and help support the weight of the par-baked dough 2000 as it is being pushed onto toppings plate 2203. Pin holes or slots may be used on the top face of bridge 2005 to achieve this, or a perforated tube placed under the bridge 2005 with pin holes pointing diagonally upward and towards direction of travel may be employed. Pie transfer arm 2001 pushes par-baked dough 2000 from the bottom press plate 1604 onto a toppings plate 2203 described below. Pie transfer arm 2001 may have a shape substantially matching the shape of par-baked dough 2000.

Figure 22:
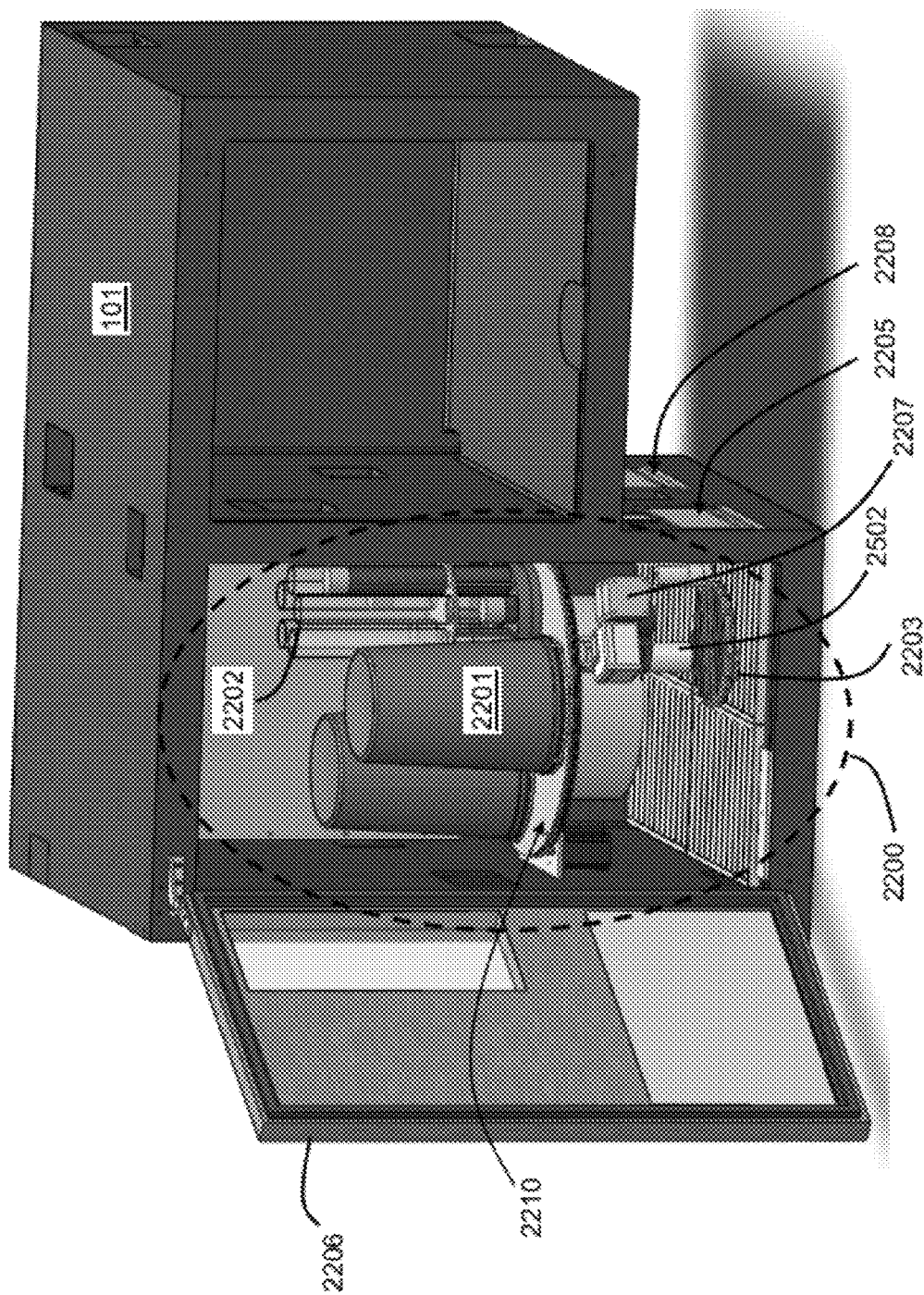
FIG. 22 is a right, front, elevated perspective view of an ingredients dispensing module situated within a refrigerated module according to one embodiment of the present invention.

Referring now to FIG. 22, there is shown ingredients dispensing module 2200 shown situated within refrigerated module 101. Ingredients dispensing module 2200 includes one or more cheese tubs 2201, sauce dispenser 2207, and toppings dispensers 2202, such as for pepperoni or the like. Cheese tubs 2201 can hold one or more types of cheese (e.g., mozzarella and cheddar, in granular or diced form), and selected toppings dispensers 2202 can hold a meat, for example, such as pepperoni in stick form. Cheese tubs 2201 may be mounted on an ingredient carousel 2210, which is coupled to a suitable bearing and actuator, in order to rotatably move selected cheese tubs 2201 into and out of a cheese-dispensing position. Ingredients dispensing module 2200 includes at least one opening 2205 to accept par-baked dough 2000 from hot-press module 1600. Opening 2205 may be closeable in order to help thermally isolate hot-press module 1600 from ingredients dispensing module 2200, such as by an actuated sliding door 2209 (shown in FIG. 25A) or the like. A rotatable toppings plate 2203 is rotatably connected to and supported by a pizza rotary arm 2401 (see FIG. 24), which provides rotational movement of the toppings plate 2203 within the ingredients dispensing module 2200. Initially the pizza rotary 2401 arm positions the toppings plate 2203 adjacent to opening 2205 in order to accept a par-baked dough 2000. Respective actuators under control of the device control circuitry can be provided for each of the rotational coupling of the toppings plate 2203 to the pizza rotary arm 2401 and for the pizza rotary arm 2401 itself to impart the desired respective rotational movement of each, as discussed in more detail below.

Toppings plate 2203 includes a plurality of parallel ridges 2301 (see FIG. 23) on an upper surface. A respective tube 2502 or the like conveys ingredients from cheese tubs 2201 and toppings dispensers 2202 onto par-baked dough 2000. As shown in FIG. 22, ingredients dispensing module 2200 may include a second closeable opening 2208 used to transfer a topped par-baked dough 2000. Door 2206 allows for access to ingredients dispensing module 2200 by service persons. Ingredients dispensing module 2200 also includes a dispensing module controller (not shown) as part of the device control circuitry, which controls the actuators that move toppings plate 2203 and dispensers 2201, 2202 in accordance with an order obtained via the user input/output interface.

Figure 23:
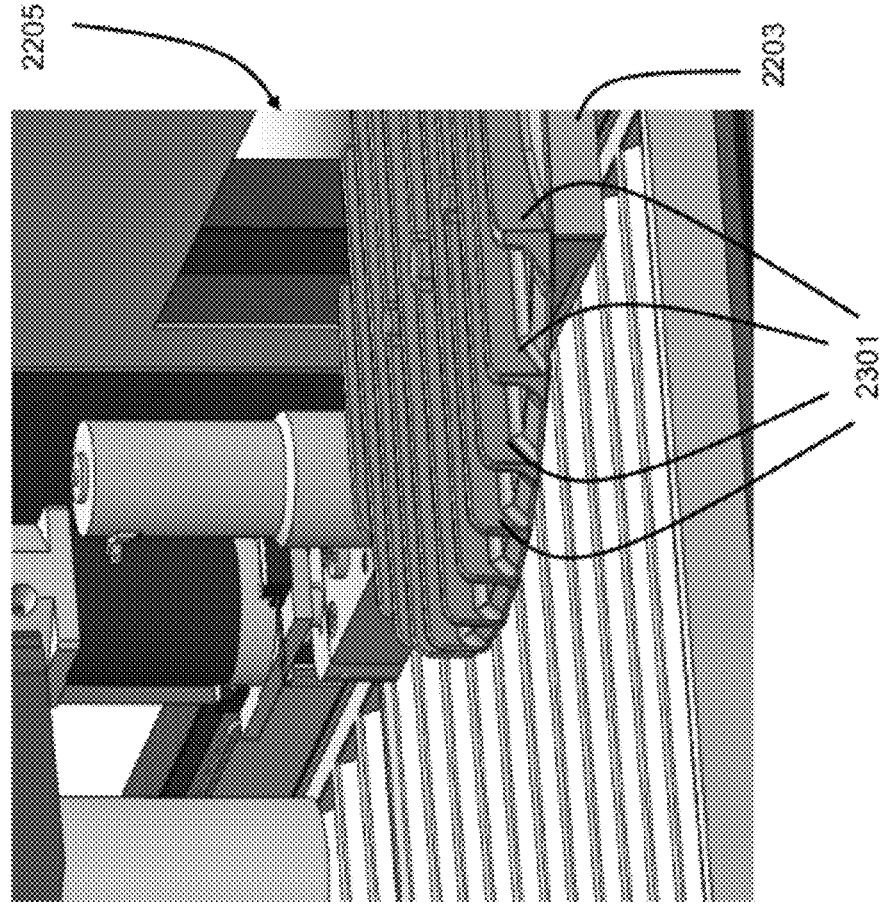
FIG. 23 is a detailed perspective view of a toppings plate according to one embodiment of the present invention.

In operation of the ingredients dispensing module 2200, toppings plate 2203 and the pizza rotary arm 2401 initially are in an idle position awaiting delivery of par-baked dough 2000 from hot-press module 1600. A notification or command from the hot-press module processor to the ingredients dispensing module processor informs ingredients dispensing module 2200 of a request to receive par-baked dough 2000. Thereupon, as illustrated in FIG. 23, ingredients dispensing module 2200 prepares to receive par-baked dough 2000 by positioning pizza rotary arm 2401 adjacent to opening 2205 (if not already so positioned), and by rotating toppings plate 2203 to a position such that ridges 2301 point toward opening 2205 (i.e., are substantially parallel to the direction of motion of the par-baked dough 2000). Having ridges 2301 point toward opening 2205 lessens risk that par-baked dough 2000 will undesirably catch or snag on a ridge 2301 as par-baked dough 2000 slides across toppings plate 2203. Opening 2205 is opened if not already open, pie transfer arm 2001 pushes par-baked dough 2000 onto toppings plate 2203, pie transfer arm 2001 retracts back into hot-press module 1600, and opening 2205 may close. Pie transfer arm 2001 thus serves as a second transfer mechanism to transfer the par-baked dough 2000 to the ingredients dispensing module 2200. Pizza rotary arm 2401 then moves toppings plate 2203 to a position away from opening 2205, such that at least a portion of par-baked dough 2000 is underneath an ingredients dispenser tube, such as cheese dispenser tube 2502.

Figure 24A:
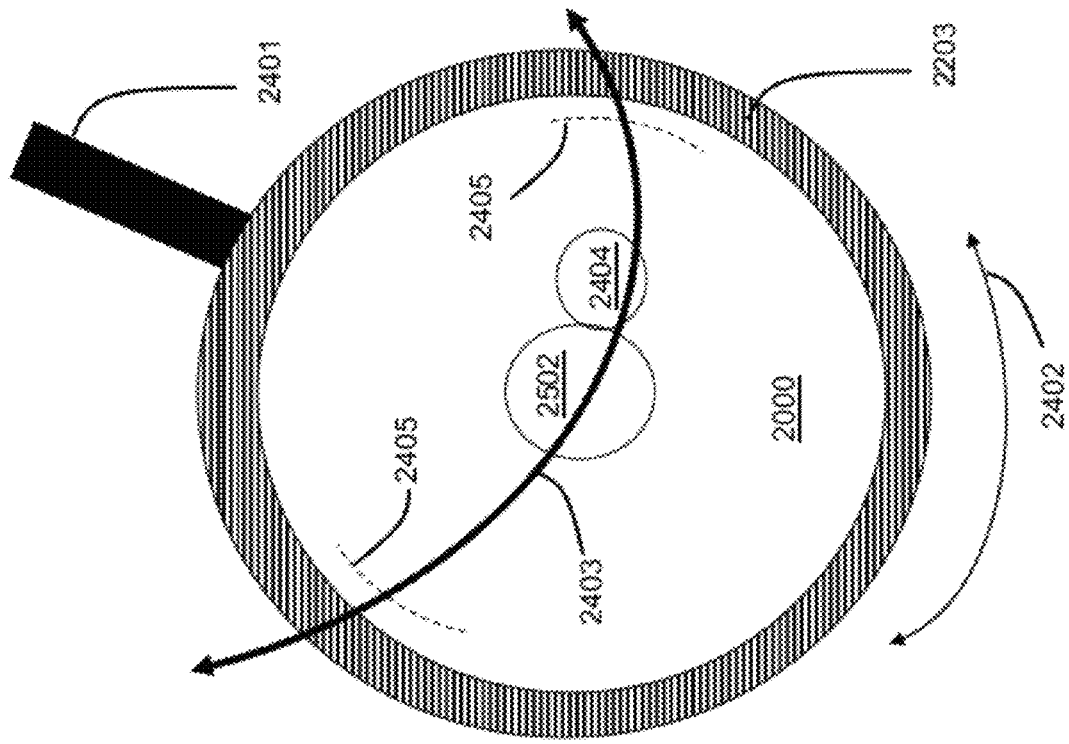
FIG. 24A is a top plan view of par-baked dough on a toppings plate according to one embodiment of the present invention.

FIG. 24A illustrates a top plan view of par-baked dough 2000 on toppings plate 2203, with pizza rotary arm 2401 positioned such that cheese dispenser tube 2502 and sauce dispenser 2404 are located above par-baked dough 2000. Rotatable motion 2402 of toppings plate 2203 can rotate toppings plate 2203 around an axis located near the center of toppings plate 2203. Rotatable motion 2403 of pizza rotary arm 2401 can rotate pizza rotary arm 2401 around an axis located along rotary arm 2401.

Figure 24C:
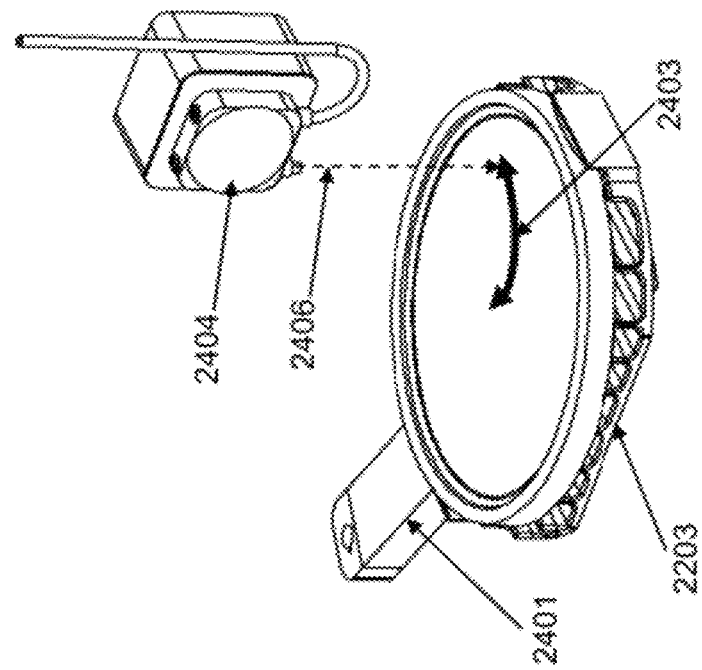
FIG. 24C is a perspective view of a sauce dispenser in a sauce edge position relative to a toppings plate according to one embodiment of the present invention.
Figure 24B:
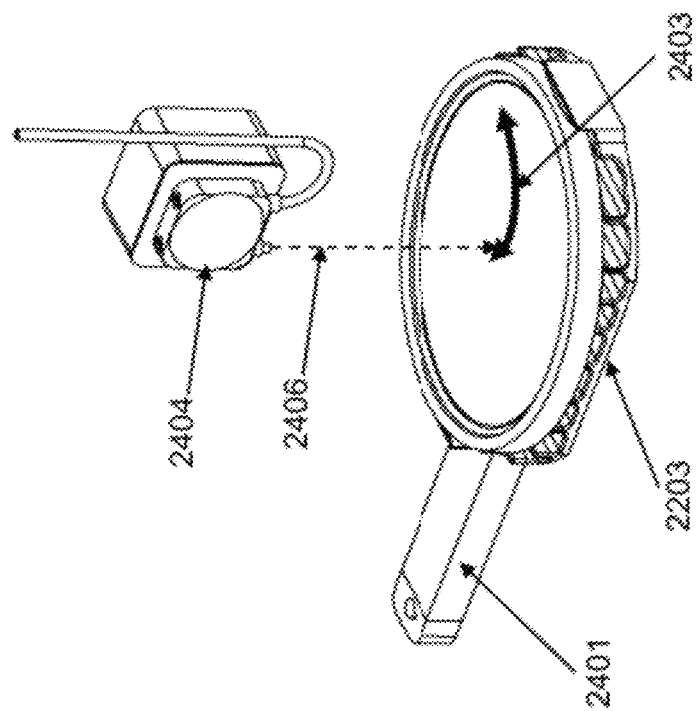
FIG. 24B is a perspective view of a sauce dispenser in a central position relative to a toppings plate according to one embodiment of the present invention.

Dispensing of toppings onto par-baked dough 2000 depends upon options selected by a customer. For instance, a customer may order a pizza with or without tomato sauce, with or without pepperoni, or with a different mix or quantity of available cheeses. Pizza may also be prepared with a flat bread crust. Or, the customer may order a simple flat bread with no toppings at all. If tomato sauce is requested, as shown in FIGS. 24A-24C, rotary arm 2401 moves toppings plate 2203 along motion path 2403 such that the center of toppings plate 2203 is under sauce dispenser 2404. Contemporaneously, tomato sauce 2406 begins to flow through sauce dispenser 2404, toppings plate 2203 begins to rotate along motion path 2402, and rotary arm 2401 begins to rotate along motion path 2403. Motion 2403 can be slower than motion 2402. As sauce dispenser 2404 dispenses sauce, rotary arm 2401 moves toppings plate 2203 along motion 2403, such that sauce dispenser 2404 goes from being positioned over the center of par-baked dough 2000 to being positioned at a sauce-edge position 2405 of par-baked dough 2000. Sauce-edge position 2405 of par-baked dough 2000 is near to, but may be offset from, the edge of par-baked dough 2000, in order to allow for a sauce-free perimeter portion of the finished pizza, and to help avoid spillage of sauce off the par-baked dough 2000. Motion 2402 and motion 2403 together distribute the sauce over the surface of par-baked dough 2000 in a spiral-like sauce track. Alternatively, dispensing of sauce 2406 may start from perimeter 2405 and work towards the center of toppings plate 2203.

Relative speeds of motions 2402, 2403 are selected to avoid or minimize gaps in the spiral-like sauce track. A pump speed of sauce dispenser 2404 may gradually change as sauce dispenser 2404 approaches the edge of par-baked dough 2000 in order to compensate for changes in the linear speed of par-baked dough 2000 passing under sauce dispenser 2404. Thus, synchronized motion of rotary arm 2401, toppings plate 2203 and pump speed of sauce dispenser 2404 helps provide relatively even distribution of sauce over the surface of par-baked dough 2000 in a spiral pattern. Alternatively, the rotational speed of the toppings plate 2203 may be changed as a function of the position of the rotary arm 2401.

Once rotary arm 2401 arrives at sauce-edge position 2405, all motion stops for a short while, such as up to 10 seconds, in order to allow residual drops of sauce to fall onto par-baked dough 2000. In some embodiments, the stopping time may be from 3 to 5 seconds. A particularly preferred embodiment employs a peristaltic pump in which a very short amount of tubing extends beyond the peristaltic pump, thus minimizing the amount of sauce 2406 that can drip. When the pump within dispenser 2404 stops dispensing, the pump reverses direction for a period of time sufficient to suck back the little amount of sauce there is on the exit side of the peristaltic rollers. Then, rotary arm 2401 positions toppings plate 2203 and par-baked dough 2000 to be ready for application of the next ingredient. If cheese is requested, then rotary arm 2401 moves to a "cheese center" position explained in further detail below. If pepperoni (without cheese) is requested, then rotary arm 2401 moves to a "pepperoni center" position explained in further detail below. If flat bread with sauce but without cheese or pepperoni is requested, then rotary arm 2401 moves to a waiting position to wait for a forklift to remove par-baked dough 2000.

Referring now to FIG. 25A-25G, there are shown various views of a cheese handling portion of ingredients dispensing module 2200. If a customer has requested cheese, then the cheese can be first prefilled into a measuring tube 2501. Pre-filling of measuring tube 2501 may start before par-baked dough 2000 is ready to receive the cheese, so that par-baked dough 2000 is ready by the time measuring tube 2501 contains the desired amount of cheese. For instance, depending on the type of the pizza being processed, pre-filling of measuring tube 2501 may start either when picking up par-baked dough 2000 (if tomato sauce is not used) or during tomato sauce dispersing.

Figure 25C:
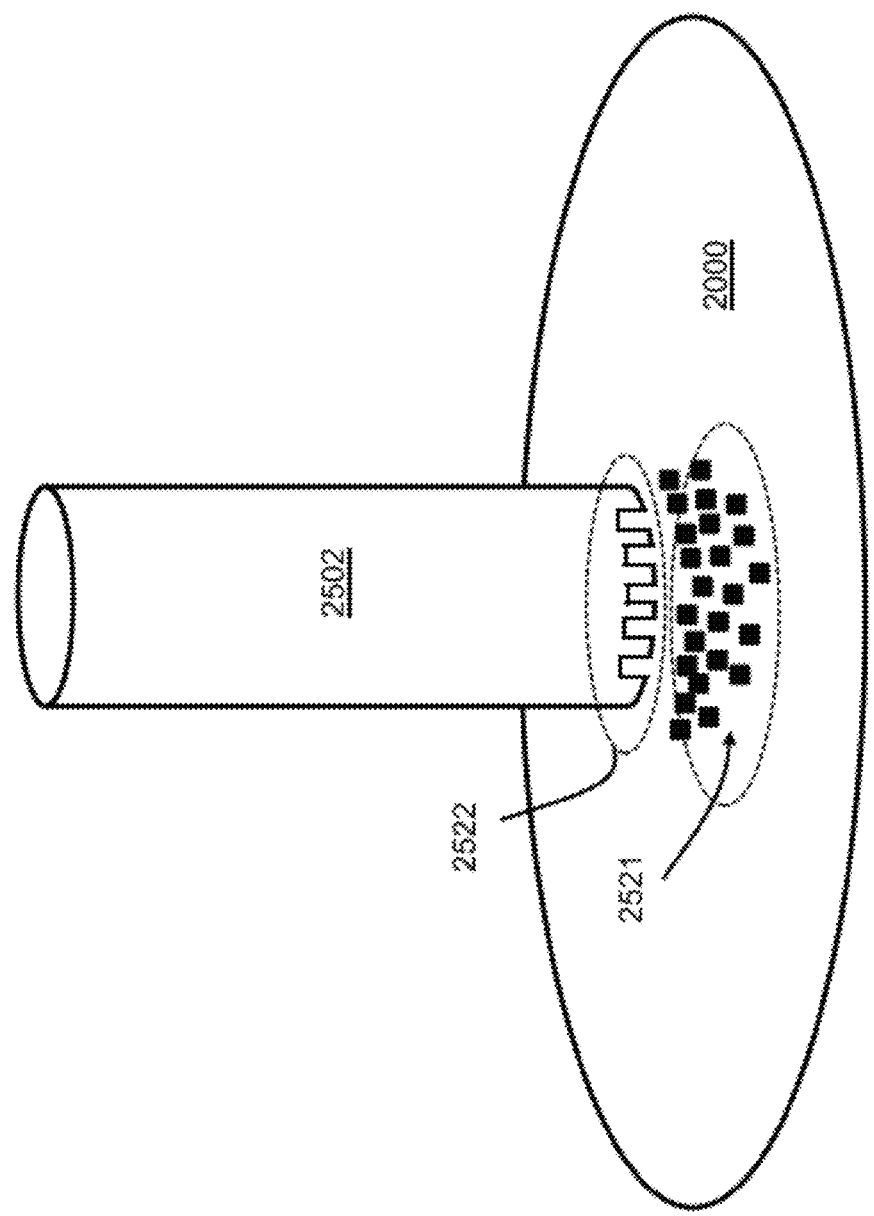
FIG. 25C is a perspective view of a cheese dispenser beginning to dispense cheese granules onto par-baked dough.
Figure 25D:
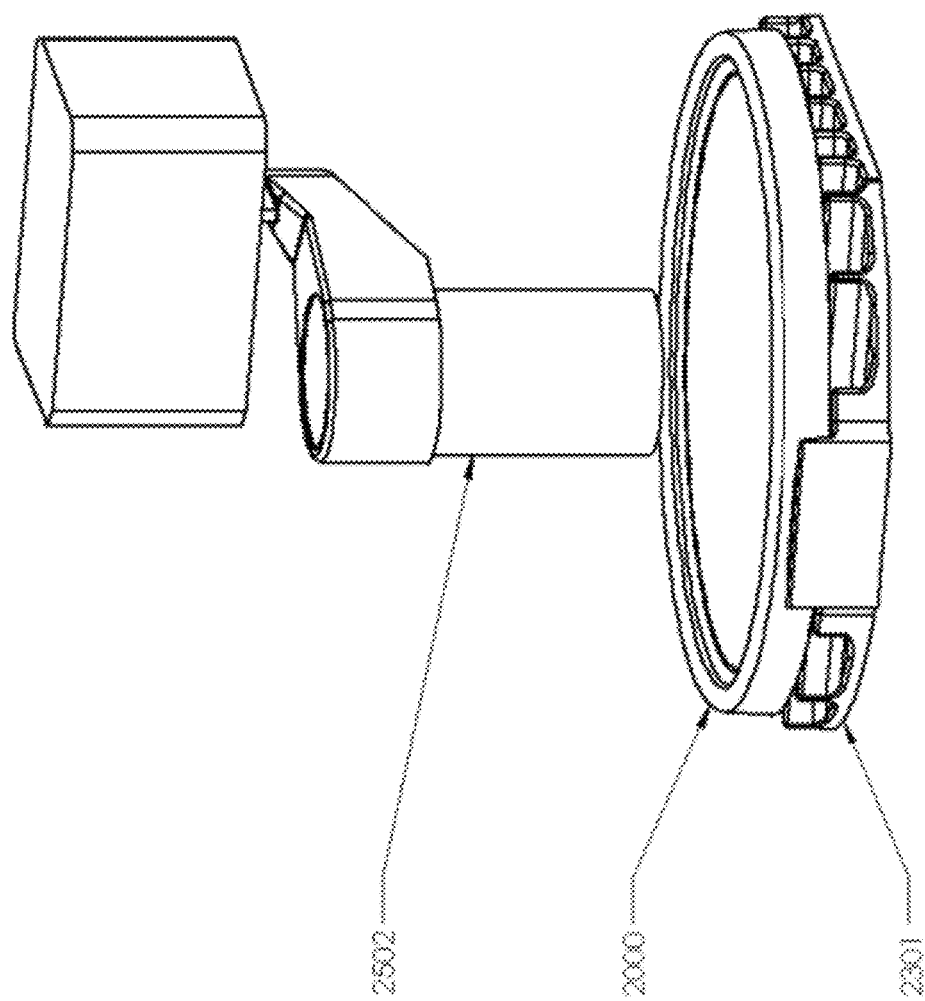
FIG. 25D is a perspective view of a cheese dispenser in a non-extended position relative to a toppings plate according to one embodiment of the present invention.
Figure 25F:
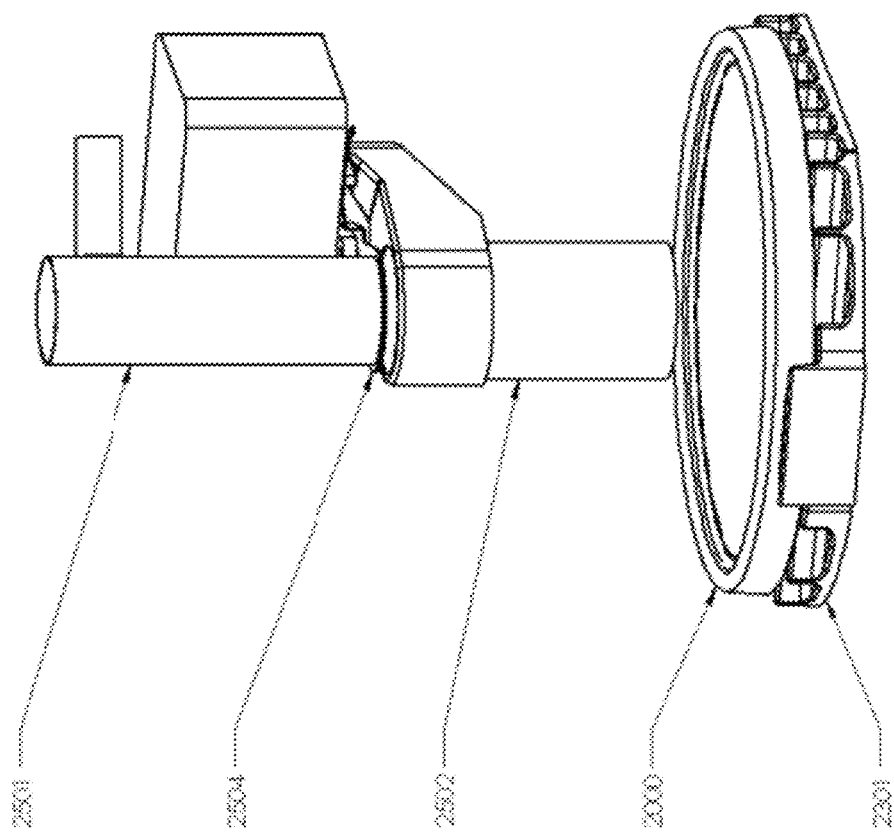
FIG. 25F is a perspective view of a cheese dispenser coupled to a measuring tube via a trap door in a first position according to one embodiment of the present invention.
Figure 25H:
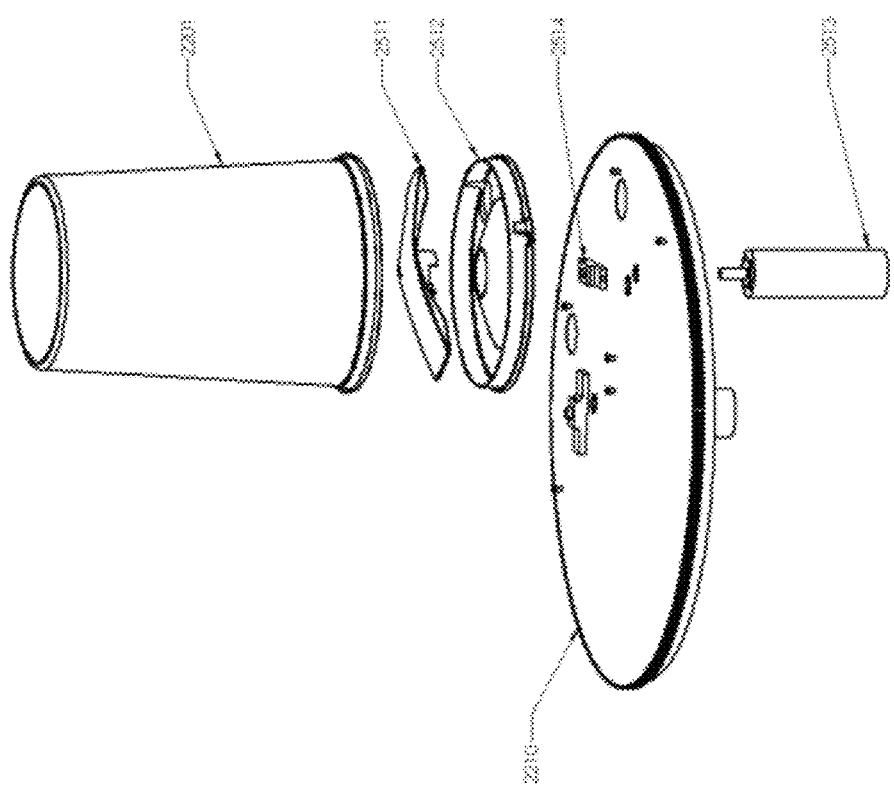
FIG. 25H is an exploded perspective view of a cheese tub container according to one embodiment of the present invention.

Referring specifically to FIGS. 25B and 25H, there is shown a bottom view and a perspective exploded view of the cheese tub container 2201. Cheese tub 2201 includes an outlet hole 2510 along a bottom wall 2512 of cheese tub 2201, and a rotary agitator 2511 coupled to an interior side of bottom wall 2512. Carousel 2210 may have a hole that corresponds to outlet 2510. Rotary agitator 2511 includes a central axle 2514 that runs through bottom wall 2512. Central axle 2514 is coupled to rotary agitator 2511 on the interior side of bottom wall 2512, and central axle 2514 is coupled to a coupling interface 2513 on an exterior side of bottom wall 2512. Rotary agitator 2511 includes one or more arms which, when not used, may be positioned in a closed position over outlet hole 2510, thus substantially preventing cheese from falling through outlet hole 2510. Coupling interface 2513 may be coupled to an actuator below cheese tub 2201, controlled by the device control circuitry, in order to rotate rotary agitator 2511 and facilitate cheese falling through outlet hole 2510. Outlet hole 2510 is positioned above measuring tube 2501, such that cheese falls into measuring tube 2501. When measuring tube 2501 fills to a predetermined amount of cheese, the actuator positions rotary agitator 2511 over outlet hole 2510 and stops turning rotary agitator 2511. Any suitable sensor may be utilized to detect the presence of cheese within measuring tube 2501. For example, if a transparent tube material is selected, an optical sensor may be used; if a thin tube material is selected, a capacitive sensor may be used. Bottom wall 2512 may be sloped in order to facilitate cheese within cheese tub container 2201 moving to outlet hole 2510 when cheese tub container 2201 is in an upright position.

As measuring tube 2501 is filling with cheese, rotary arm 2401 may be moving toppings plate 2203 such that par-baked dough 2000 is in position to begin receiving cheese. When measuring tube 2501 is sufficiently full and par-baked dough 2000 is in position, toppings plate 2203 begins to rotate along direction 2402. Contemporaneously, rotary arm 2401 rotates along direction 2403 such that par-baked dough 2000 is moved from having its center being under cheese dispenser 2502, to having a cheese-edge position located under cheese dispenser 2502. Cheese-edge position may be located at or near at sauce-edge position 2405, allowing a cheese-free perimeter portion of the finished pizza, and helping prevent spillage of cheese off of par-baked dough 2000. The rotation rate along motion 2403 is relatively slow compared to the rotation rate along motion 2402. Cheese may be transferred from measuring tube 2501 into cheese dispenser 2502. Cheese drops to the bottom of cheese dispenser 2502 and is spread in a spiral path onto par-baked dough 2000 by the combination of motions 2402 and 2403. Cheese dispenser 2502 may have a patterned lower shape, such as a rake, teeth, fingers or the like, in order to facilitate uniform spreading of cheese. When the desired quantity of cheese has been substantially spread onto par-baked dough 2000, motion 2402 may stop and rotary arm 2401 may move along motion 2403 to reposition the center of par-baked dough 2000 to be near cheese dispenser 2502.

A sensor, for example a photoelectric sensor, is positioned adjacent to or within measuring tube 2501 to detect when measuring tube 2501 is full and to signal to the device control circuitry to stop the movement of rotary agitator 2511. If measuring tube 2501 does not fill up in a predetermined time, the device control circuitry stops rotary agitator 2511 so as to stop trying to dispense cheese and to close outlet hole 2510. Ingredient carousel 2210 then rotates to position a second cheese dispensing tub 2201 over measuring cup 2501 to continue filling the measuring cup 2501. A signal is stored or sent to notify of the need to replace the first cheese dispensing tub 2201. When measuring tube 2501 is full and rotary arm 2401 has properly positioned toppings plate 2203 under dispensing cheese dispense 2502, a trap door 2504 on the bottom surface of the measuring tube 2501 is rotated to allow for the cheese in the measuring tube 2501 to fall onto par-baked dough 2000. The trap door 2504 can be shaped with a tab on its trailing side that serves to tap the measuring tube 2501 to provide some vibration to assist the cheese in the measuring tube 2501 to fall. Typically one tap is sufficient, but taps may be repeated if a sensor does not detect cheese having fallen.

Contemporaneously to the measuring tube 2501 being emptied, cheese dispenser 2502 is lowered to a height (as shown in FIG. 25E) that is closer to the surface of the par-baked dough 2000 to limit cheese granule bouncing off of par-baked dough 2000. When the spreading of the cheese completes, the cheese dispenser 2502 lifts back up to its original height to allow any larger cheese clumps that could not flow out of the chute to be deposited onto par-baked dough 2000. In an alternate embodiment, cheese dispenser 2502 may not have rake-like prongs at the bottom, and instead the flow and spread of cheese can be controlled by the device control circuitry to sequentially lower and lift the cheese dispenser 2502 in pulses. Each lifting of cheese dispenser 2502 allows for a small amount of cheese to flow out of measuring tube 2501 and deposit onto par-baked dough 2000. In this arrangement, the vertical movement of the cheese dispenser 2502 may also be used to make cheese dispenser 2502 squeeze and pinch the surface of the dough 2000 at multiple points before any ingredients have been applied, which can help to guard against excessive ballooning of dough 2000 in the subsequent cooking process.

With specific reference to FIG. 25C, there is illustrated a perspective view of an embodiment cheese dispenser 2502 beginning to dispense cheese granules 2521 onto par-baked dough 2000. Cheese dispenser 2502 may have a patterned lower shape 2522, for instance a rake shape or finger shape as discussed above, that is useful for spreading the cheese granules 2521 more evenly as par-baked dough 2000 moves. Cheese granules 2521 may also be located within cheese dispenser 2502, awaiting distribution as par-baked dough 2000 moves under cheese dispenser 2502. Cheese granules 2521 can be provided in an industry-standard size, such as ⅛" cubes. Moisture content of the cheese granules 2521 affects their tackiness, which in turn affects how effectively patterned lower shape 2522 spreads out the cheese granules. Some cheeses such as mozzarella may have a relatively high moisture content. If patterned lower shape 2522 does not effectively spread out the cheese granules, cheese granules 2521 may clump and start shoveling other ingredients already on par-baked dough 2000. Vertical pulsation of dispenser 2502 may be used to further prevent occurrence of this problem.

Figure 26A:
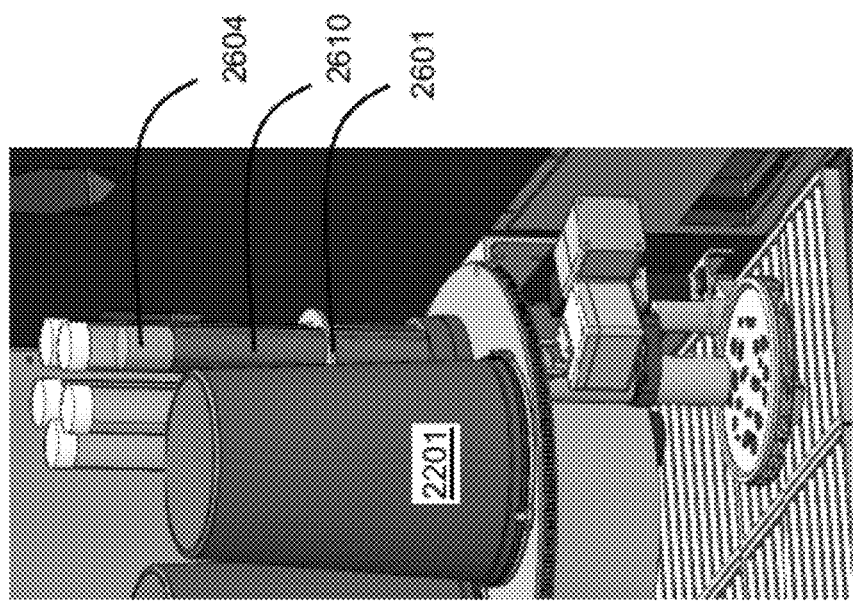
FIG. 26A is a perspective view of a pepperoni carousel, without pepperoni, according to one embodiment of the present invention.
Figure 26B:
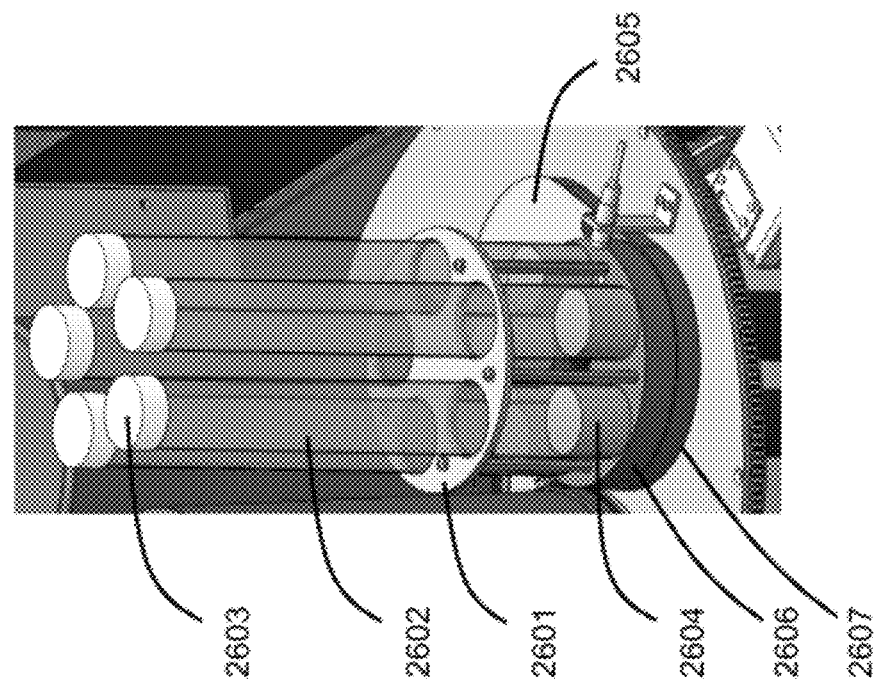
FIG. 26B is a perspective view of a pepperoni carousel, with pepperoni, according to one embodiment of the present invention.

Referring now to FIG. 26A, there is shown a perspective view of a pepperoni carousel 2601, mounted on ingredient carousel 2210, and having disposed therein a plurality of empty pepperoni tubes 2602. Pepperoni tubes 2602 may be loaded with a pepperoni stick or other kinds of cylindrical-shaped meats or food products. Pepperoni is discussed in the following only for the sake of illustration by way of a specific food type. Pepperoni tubes 2602 may be closed with stopper 2603 to help preserve freshness of the food product within. Pepperoni tubes 2602 may include a weight 2604 whose function is described below. A bottom of each pepperoni tube 2602 cooperatively engages with a base portion 2606 of pepperoni carousel 2601. Below base portion 2606 is a slicer portion 2607. Base portion 2606 includes a shaped through-opening under one or more pepperoni tubes 2602. The shape of through-opening can be designed to permit a pepperoni stick to pass through base portion 2606 to slicer portion 2607, but prevent pepperoni tubes 2602 and weight 2604 from fully passing through the through-opening. Referring now to FIG. 26B, there is shown a perspective view of a pepperoni carousel 2601 having disposed therein at least one pepperoni stick 2610 in a pepperoni tube 2602, with weight 2604 disposed on top of pepperoni stick 2610. Weight 2604 is used to exert downward pressure on a pepperoni stick 2610 as the stick 2610 is being cut, in order to counteract a tendency of the pepperoni stick 2610 to move upward when being cut.

Figure 26C:
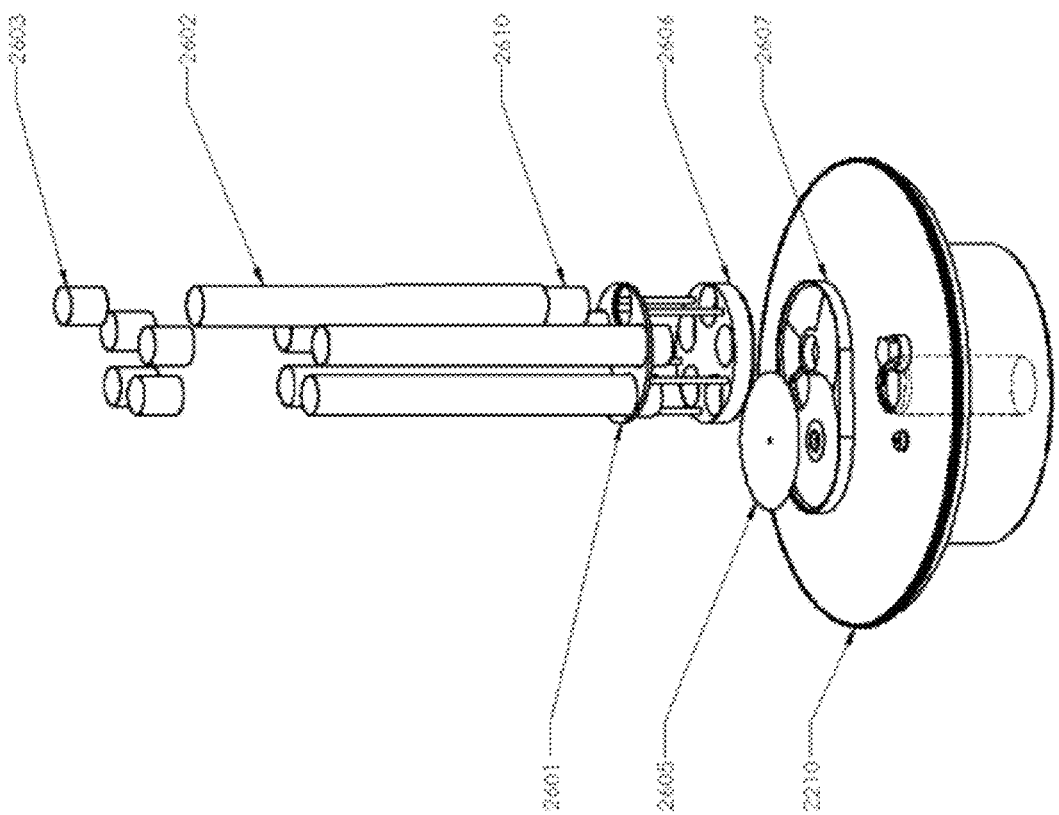
FIG. 26C is an exploded perspective view of a pepperoni carousel, with pepperoni, according to one embodiment of the present invention.

With further reference to FIG. 26C, in operation, pepperoni carousel 2601 may be rotated (e.g., clockwise) to pass a pepperoni stick 2610 held by a selected pepperoni tube 2602 across a cutting blade 2605 in slicer portion 2607 in order to cut off one slice of pepperoni. Cutting blade 2605 of slicer portion 2607 may be, for instance, a fixed blade disposed over an opening in the body of slicer portion 2607; sliced pepperoni passes across the external side of the blade to drop onto the par-baked dough 2000, while the pepperoni stick 2610 passes over the internal side of the blade 2605. Pepperoni carousel 2601 may then be rotated in an opposite direction (e.g., counter-clockwise) in order to reposition the pepperoni stick 2610 and selected pepperoni tube 2602 for cutting another slice of pepperoni. The clockwise and counter-clockwise motion may be repeated for each slice of pepperoni to be produced. Cut slices of pepperoni fall onto par-baked dough 2000. Contemporaneously, par-baked dough 2000 is moved by the combined motion of toppings plate 2203 along motion 2402 and rotary arm 2401 along motion 2403, thereby causing the cut pepperoni slices to fall across par-baked dough 2000.

When the pepperoni stick is used up, pepperoni carousel 2601 may be rotated to select another pepperoni tube 2602 for cutting of more pepperoni. Any suitable sensor may be used to determine when a pepperoni stick 2610 has been used up. For example, in preferred embodiments the weights 2604 are made from metal, and a sensor, such as a Hall sensor, can be used to detect the metal of weight 2604 and thus the amount of pepperoni remaining, if any. If all pepperoni sticks are used up, an embodiment pizza machine can be configured to indicate to a customer that no pepperoni is available, but that pizzas without pepperoni can still be prepared.

In an alternate embodiment, the pepperoni carousel 2601 may rotate in only one direction (e.g., clockwise), and a slice of pepperoni is cut from successive, adjacent pepperoni sticks 2610 as the pepperoni sticks 2610 pass in turn over the cutting blade in slicer 2607. In yet another embodiment the slicer 2607 may rotate to pass the blade across pepperoni in the holding tubes 2602.

Because in preferred embodiments the ingredients carousel 2210 is rotatable, the control circuitry can be programmed to rotate the ingredients carousel 2210 not only to bring a new cheese tubs 2201 into position, but also to enable a customer to view the ingredients offered and to provide ease of serviceability for a technician. For example, the user input/output interface of the pizza machine 100 can be programmed to enable the user, for example when placing an order, to move various ingredients into view by rotating one or more of the ingredients carousel 2210 and pepperoni carousel 2601. It will be appreciated in this context that pepperoni carousel 2601 need not store only pepperoni, but can store any cuttable, tube-shaped food product. By being able to rotate the ingredients carousel 2210, and optionally the pepperoni carousel 2601, a customer is enabled the ability to see all of the potential ingredients that can be placed upon a pizza. Similarly, permitting a technician to cause rotation of the ingredients carousel 2210, such as by way of the customer user interface when in a special diagnostic mode, or by way of buttons, switches or the like present within, for example, the refrigerated compartment 101, provides ease of access to empty containers 2201, 2602 for replacement and/or refilling.

Once a preset number of food-item slices have been cut and applied to par-baked dough 2000, which number may be determined from, for example, parameters pre-programmed into the device circuitry, from customer input obtained via the user input/output interface, or combinations thereof, pepperoni carousel 2601 returns to an idle position. Toppings plate 2203 moves to a position adjacent to an exit door in order to be in a position to transfer topped par-baked dough 2000 to an oven, as described below. The exit door may be configured as second door 2208 (see FIG. 22). Alternative embodiments may be configured to use opening 2205 as the exit door. Toppings plate 2203 rotates to a position such that parallel ridges 2301 are facing the exit door. The exit door opens if it is not already open.

Figure 27:
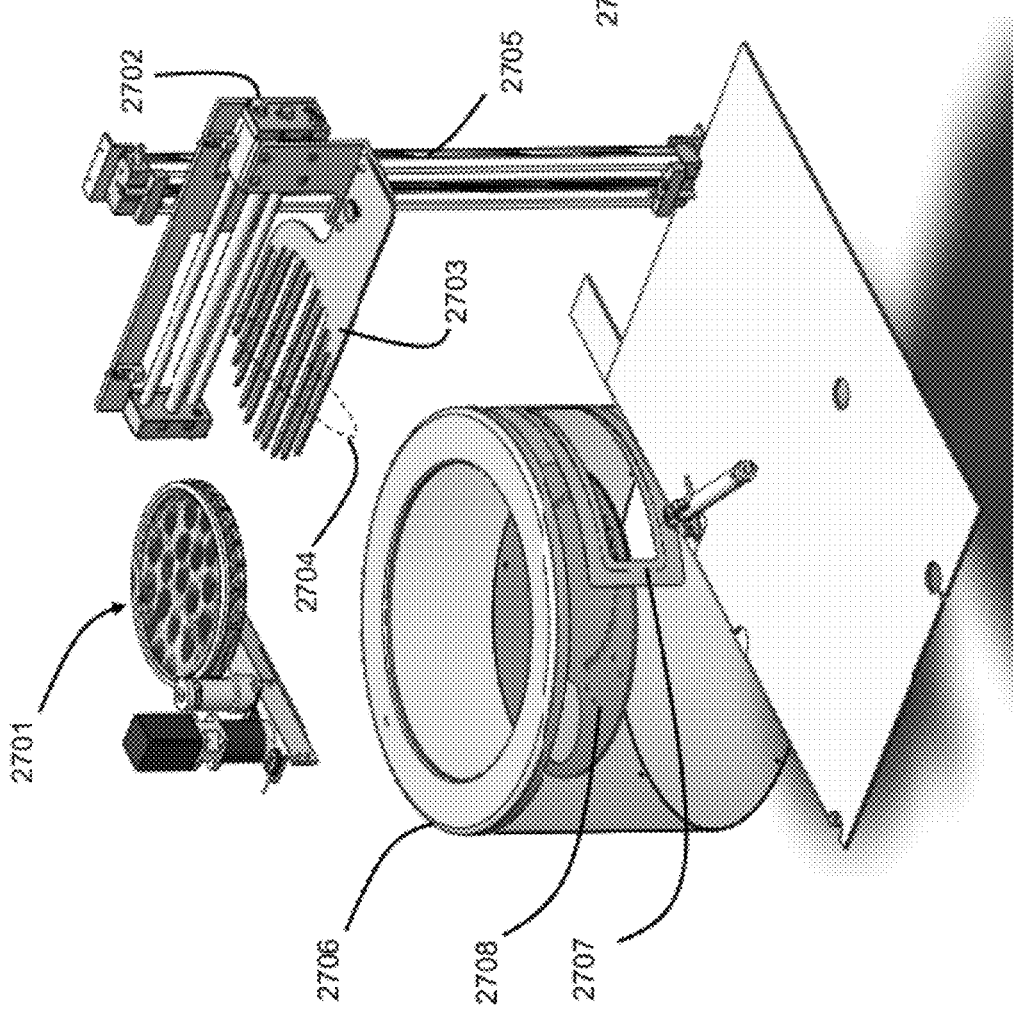
FIG. 27 is a perspective view of a fork-like transfer mechanism having a plurality of tines according to one embodiment of the present invention.

Referring now to FIG. 27, there is illustrated a fork-like transfer mechanism 2703 (equivalently, fork 2703) having a plurality of tines 2704, which serves as a lifting device used to transfer the topped par-baked dough 2701 to a rotatable oven. Rotation of the oven eliminates the need for conveying mechanisms that may be difficult to clean. Further, rotation of the oven allows for a central closed position where a suitably-shaped non-moving barrier may act as a door instead of the need for a moving door that would require yet another actuator. Fork extender 2702 extends fork 2703 through the exit door 2208 to pick up the topped par-baked dough 2701. Tines 2704 are shaped to fit between parallel ridges 2301 of toppings plate 2203. Parallel ridges 2301 are shaped and arranged close enough to each other as to avoid excessive sagging of par-baked dough 2701 between adjacent parallel ridges 2301, yet spaced far enough apart to allow tines 2704 to have sufficient rigidity to pick up the topped par-baked dough 2701.

After tines 2704 are inserted between parallel ridges 2301, fork 2703 is lifted up so that topped par-baked dough 2701 is lifted from ridges 2301 and is supported by fork 2703. Fork extender 2702 then retracts fork 2703 through the exit door 2208, and fork 2703 transports topped par-baked dough 2701 by use of transfer mechanism 2705 to the entrance of rotatable oven 2706. Oven 2706 includes at least one opening 2707 configured to accept topped par-baked dough 2701, and thus in the embodiment of FIG. 27, transfer mechanism 2705 is an elevator that moves between the level of the second door 2208 and the opening 2707 of the oven 2706. Fork extender 2702, fork 2703 and elevator transfer mechanism 2705 thus together serve as a third transfer mechanism that moves the topped par-baked dough 2701 from the ingredients dispensing module 2200 to the oven 2706. Before topped par-baked dough 2701 is loaded into oven 2706, a waiting time may be commanded by an oven controller. The waiting time may be desirable to permit oven 2706 to complete the cooking of a previous pizza, to pre-heat or the like. In another embodiment, oven 2706 may include a second opening 2707 configured to let pass a cooked pizza.

Figure 28:
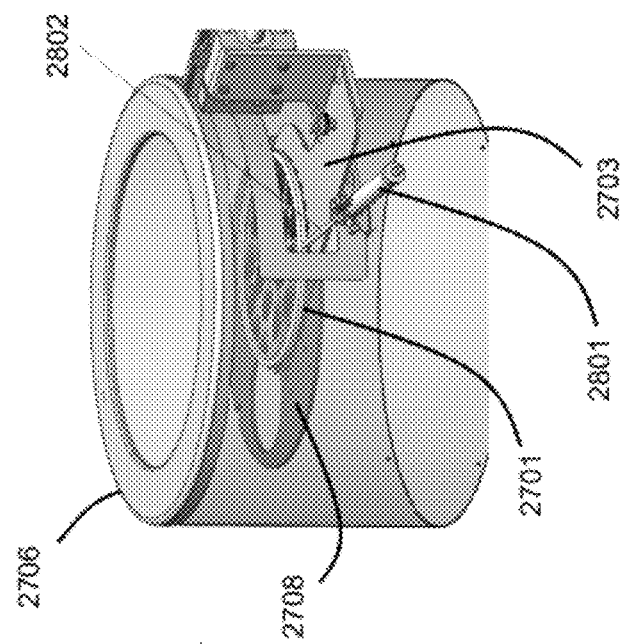
FIG. 28 is a perspective view of a fork-like transfer mechanism inserting an uncooked pizza into the oven according to one embodiment of the present invention.

Oven 2706 also includes an interior, horizontal oven plate 2708 having a plurality of air holes. Referring now to FIG. 28, fork 2703 inserts topped par-baked dough 2701 into oven 2706, whereupon pusher 2801 prevents the par-baked dough 2701 from sliding back out as fork 2703 is retracted out of oven 2706. Pusher 2801 deploys after fork 2703 has entered oven 2706 and an internal blower of oven 2706 has activated to begin lifting par-baked dough 2701 off of fork 2703. Fork extender 2702 then retracts fork 2703 from oven 2706. The pusher 2801 may be a pneumatic device, a hydraulic device or a solenoid, and includes an retractable and extendible piston 2802 for engaging with the topped par-baked dough 2701. The piston 2802 may then retract after retraction of the fork 2703.

Figure 29B:
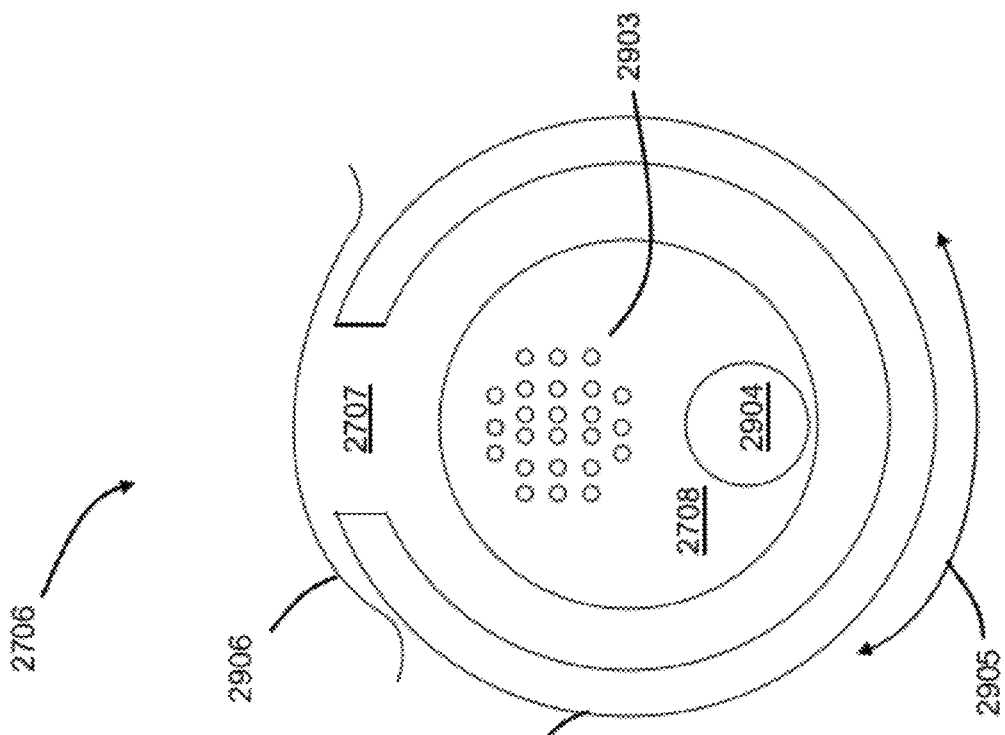
FIG. 29B is a cross-sectional view of a rotatable oven in a closed position according to one embodiment of the present invention.
Figure 29A:
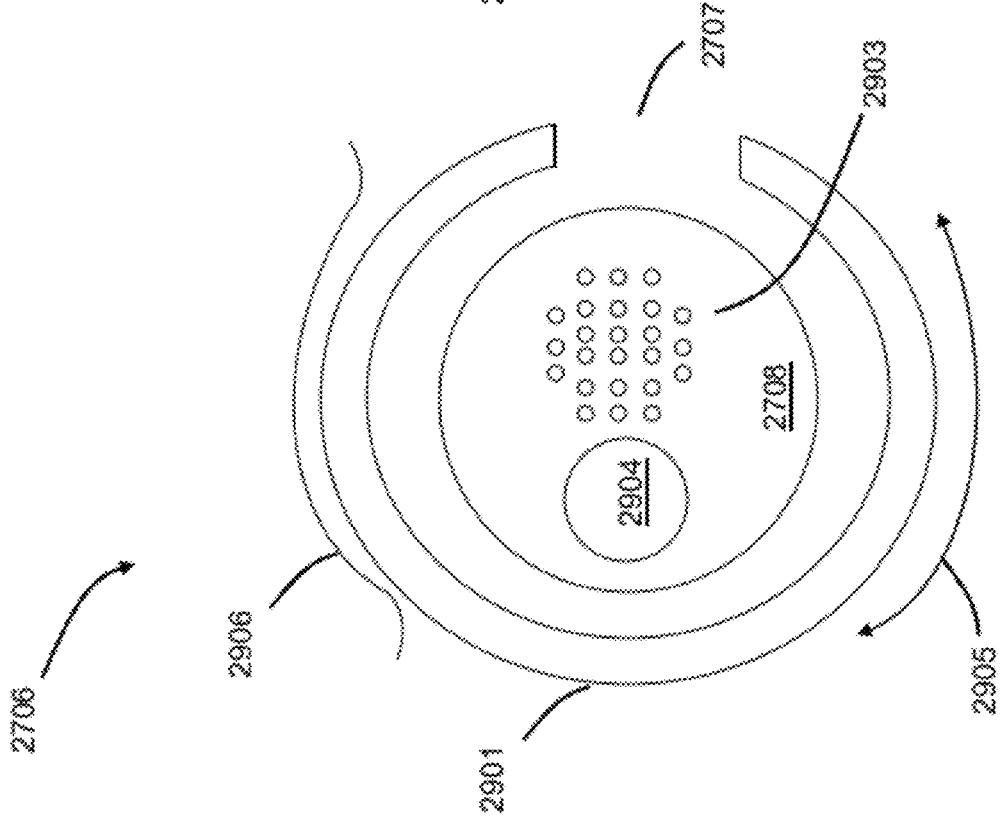
FIG. 29A is a cross-sectional view of a rotatable oven in an open position according to one embodiment of the present invention.

Referring now to FIGS. 29A-29B, there are illustrated cross-sectional views of rotatable oven 2706 taken in a horizontal plane through opening 2707. Oven 2706 also includes a shroud 2906 adjacent to an outer surface 2901 of oven 2706. Shroud 2906 ordinarily touches outer surface 2901, but is shown separated in FIG. 29A for the sake of clarity. Oven 2706 (except shroud 2906) is rotatable in direction 2905 by use of an actuator 3001 (see FIG. 29C) coupled to oven 2706. FIG. 29A shows oven 2706 rotated to a first position to have opening 2707 exposed and ready to receive topped par-baked dough 2701 (not shown in FIG. 29A) onto oven plate 2708. Oven plate 2708 includes a plurality of air holes 2903 and a return air vent 2904.

FIG. 29B shows oven 2706 rotated to a second position to have opening 2707 covered by shroud 2906. Embodiments of oven 2706 having a second opening 2707 may include a second shroud 2906 to cover the second opening. In another alternate embodiment, oven 2706 may be substantially stationary and shroud 2906 rotates along direction 2905, around oven 2706, to cover or uncover opening 2707. In operation, oven 2706 may be rotated to the first position (FIG. 29A) in order to expose opening 2707 and allow topped par-baked dough 2701 to be loaded onto oven plate 2708. After oven plate 2708 is loaded and fork 2703 is retracted, oven 2706 rotates to the second position (FIG. 29B) in order to close opening 2707. Oven 2706 then begins to cook topped par-baked dough 2701 by a combination of convection, conduction and radiation heating. First (FIG. 29D), heated air is blown upward through the plurality of air holes 2903 in oven plate 2708 at a sufficient strength to lift topped par-baked dough 2701 off from oven plate 2708, such that topped par-baked dough 2701 then floats and convection cooks on a cushion of air; this helps to avoid the topped par-baked dough 2701 from sticking to the oven plate 2708. Air returns to an oven blower via return inlet 2904. The quantity and position of the plurality of air holes 2903 may differ from that shown in FIGS. 29A-29D, and are designed such that the cushion of air stably supports topped par-baked dough 2701. In addition, oven plate 2708 may include a bump or raised lip 2710 along the periphery of plate 2708, which may help to prevent topped par-baked dough 2701 from floating off of plate 2708.

In other embodiments oven 2706 is non-rotating version, having, for example, a square or rectangular shape with separate entry and exit doorways. In such embodiments, the conveying of pizza from one side of the oven to the other may be achieved by the strategic use of air being blown under the pizza in variable amounts at various locations along the path of the pizza, to create the effect of the pizza moving in one direction or another. If unidirectional motion is desired, this effect may be assisted by suitable tilting of the surface. The translational movement of the pizza may additionally be controlled with the use of stoppers that may be deployed or released with suitable actuators as required to prevent undesired forward or backward motion of the pizza. Such embodiments may mimic a conveyor oven, but without the conveyor that is prone to breakage and is difficult to clean. This may also allow for multiple pizzas to be placed in the oven in sequence rather than one at a time.

Figure 29C:
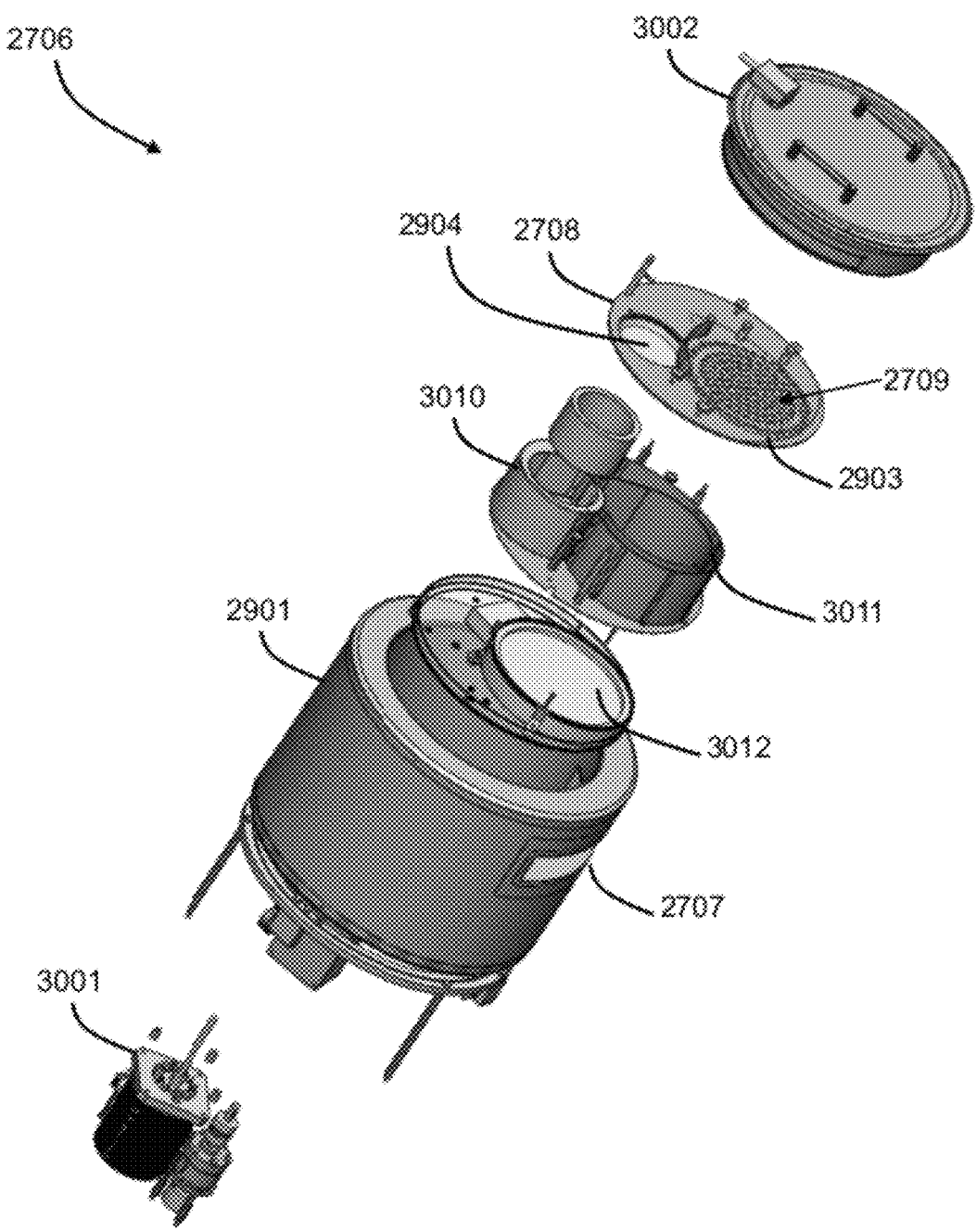
FIG. 29C is an exploded view of a rotatable oven according to one embodiment of the present invention.
Figure 29D:
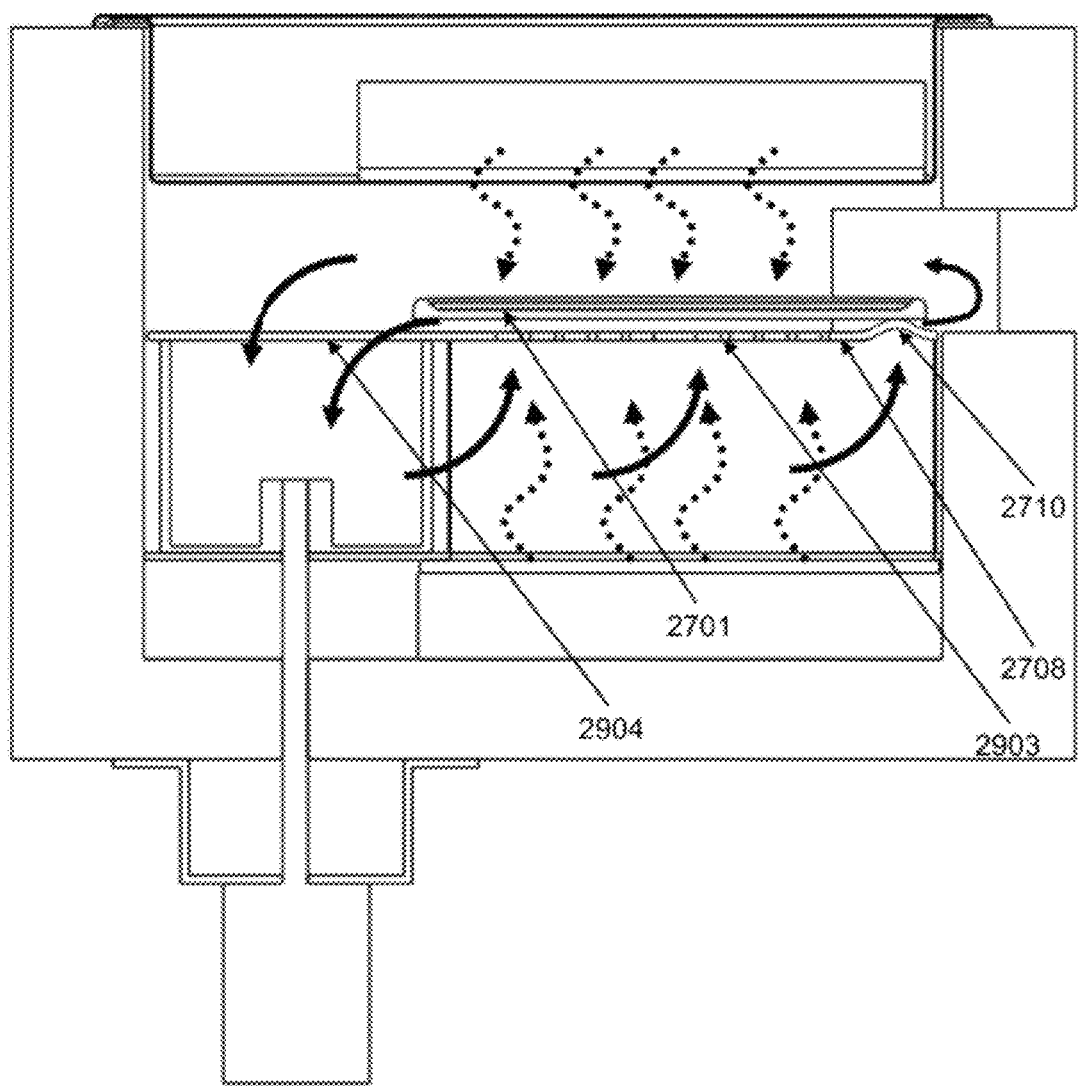
FIG. 29D is a side view illustrating a cooking process in an oven according to one embodiment of the present invention.

FIG. 29C shows an exploded perspective view of embodiment rotatable oven 2706. Elements of oven 2706 not already described include an upper lid 3002, a blower intake 3010, a blower output 3011 and a bottom heater 3012. When assembled, blower intake 3010 couples with return air vent 2904, and blower output 3011 couples with the plurality of air holes 2903. The quantity and position of individual air holes in the plurality of air holes 2903 may differ from that shown in FIG. 29C. Air drawn in through blower intake 3010 by a blower is heated by bottom heater 3012 and expelled through blower output 3011 and then through the coupled plurality of air holes 2903.

Conduction cooking may occur when topped par-baked dough 2701 rests directly on heated oven plate 2708. Radiative cooking may be provided, for instance, by one or more heating coils recessed into an interior surface of upper lid 3002. In an alternative embodiment (not shown), heating coils for radiative cooking may be provided below par-baked dough 2701 as it cooks, and/or hot air for convection cooking may be provided from above par-baked dough 2701. If desired, the heating coils can also help provide a toasted texture on a facing surface of the cooked pizza. Cooking surface 2708 may be made in two parts, with the center perforated portion 2709 being circular and removable to facilitate cleaning. The center removable portion 2709 may also be made to rotate on its center while the pizza is positioned on it, thus exposing the pie to both hot and cold spots that may occur to promote even heat distribution and uniform cooking.

Topped par-baked dough 2701 cooks within oven 2706 for an amount of time determined by the oven processor based upon sensors, such as the temperature of oven 2706, and the type of pizza currently being prepared. Oven temperature may vary in a range from about 400° F. to about 600° F. based on factors such as time since the previous pizza was prepared, frequency of pizza orders, and the type of pizza currently being prepared. Control of radiative cooking may have the quickest response to control signals from the oven controller.

Referring now to FIG. 30, there is shown an oven 2706 in position to unload a cooked pizza. Actuator 3001 has rotated oven 2706 to an unloading position, such that opening 2707 is opened and exposed to an unloading shovel 3003. Shovel 3003 may be moveable in a first direction by a first positioner 3004 for retrieving a cooked pizza from the oven 2706, and in a second direction for interacting with a second positioner 3005 for boxing/packaging purposes, as discussed below. Together, first positioner 3004 with second positioner 3005 provide a fourth transfer mechanism for moving a freshly-baked pizza 3201 from the oven 2706 and into a box 3202. Second positioner 3005 may also cause the boxed pizza to be delivered to a chute at which the customer can obtain the boxed pizza. That is, second positioner 3005 may move freshly-baked pizza 3201 into box 3202 and then move box box 3202 out of device 100; however, this second movement may also be performed by another suitably-designed mechanism. Embodiments of oven 2706 that have a second opening 2707 may be positioned so that one opening 2707 may be positioned to unload the cooked pizza as a second opening 2707 is positioned to receive another topped par-baked dough 2701. Having a second opening 2707 may result in faster loading and unloading of uncooked and cooked pizzas, respectively, since these operations can then at least partially overlap in time.

Figure 32B:
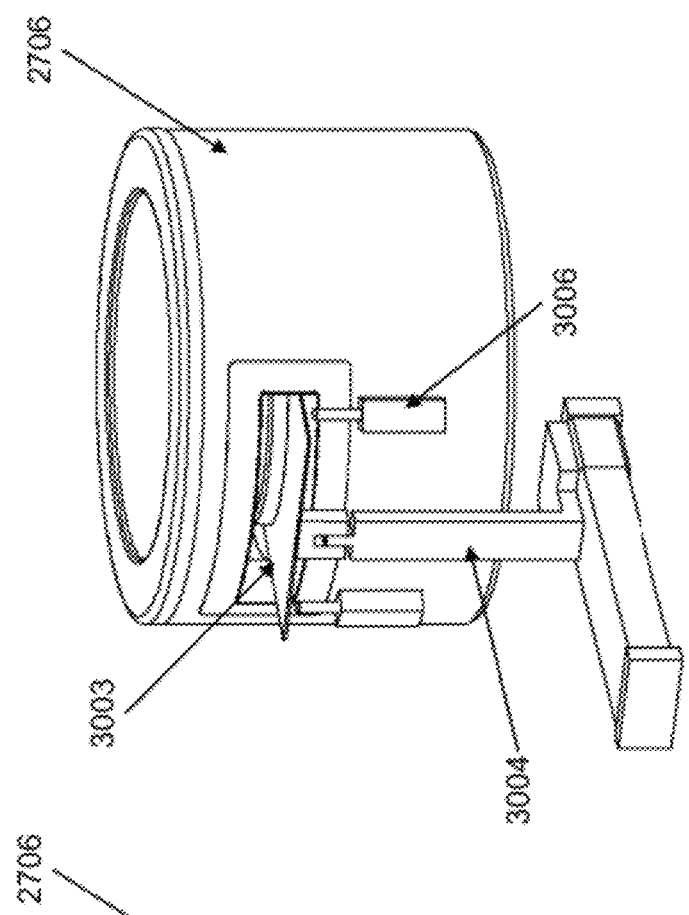
FIGS. 32A-32E illustrate a shovel removing a cooked pizza from an oven according to an embodiment of the invention.
Figure 32A:
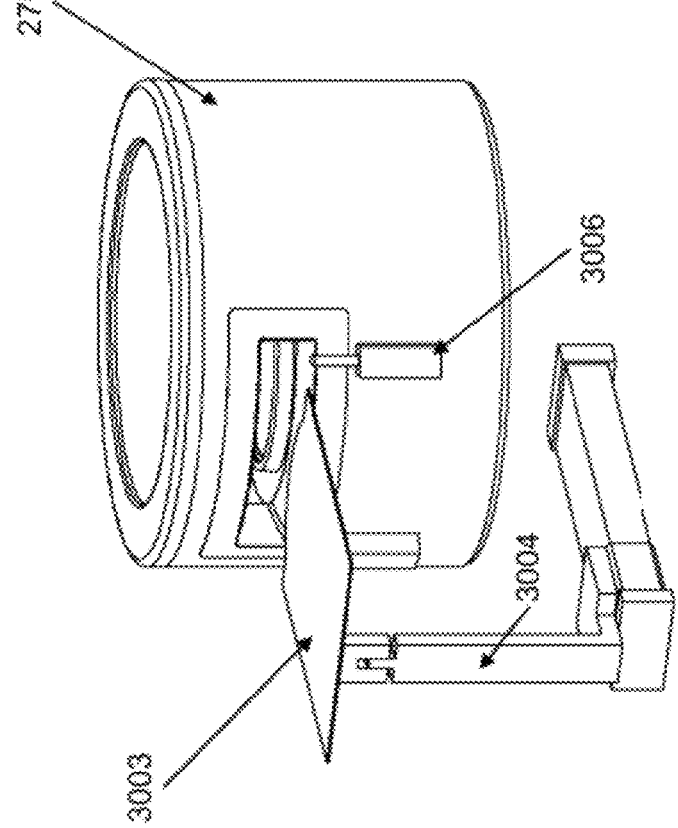
Figure 32D:
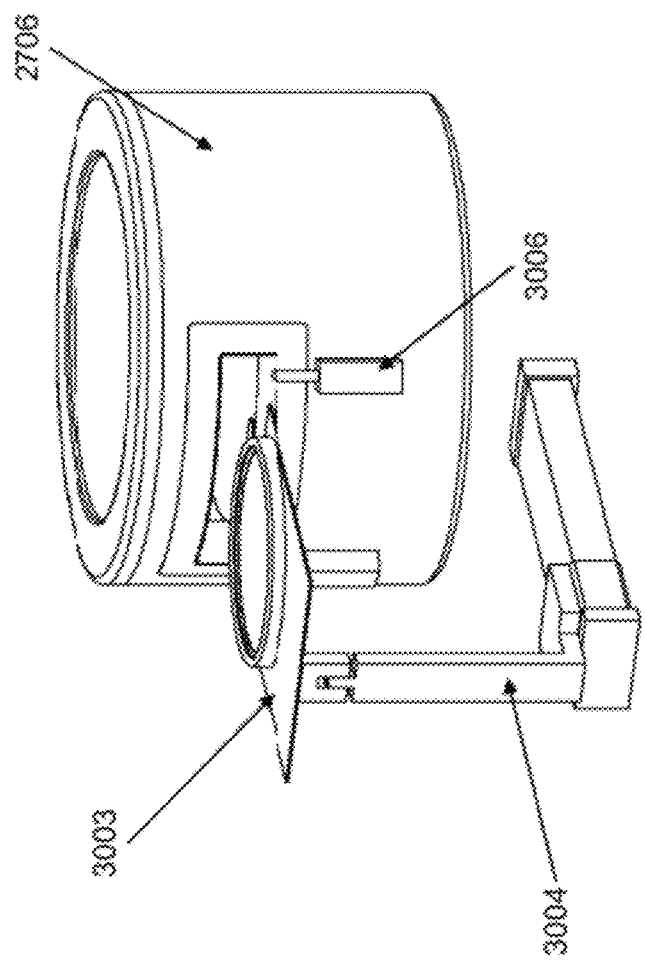
Figure 32C:
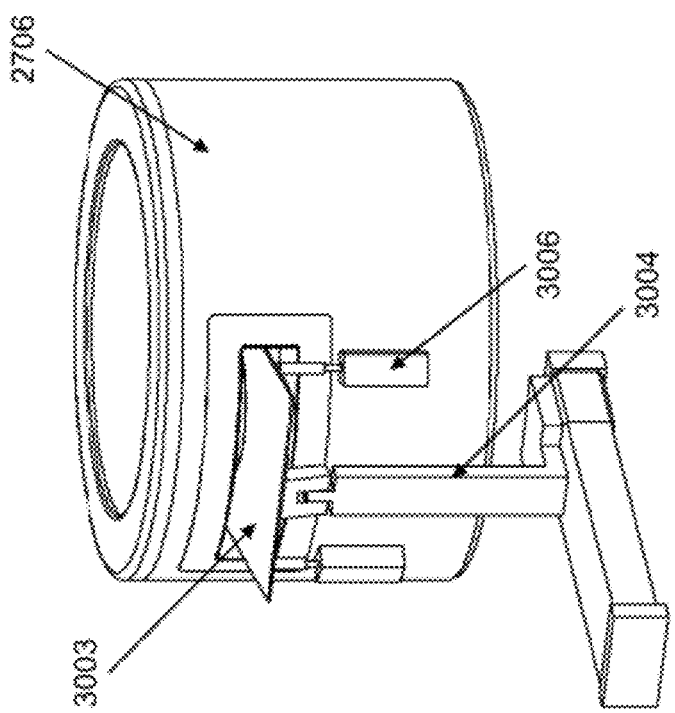
Figure 32E:
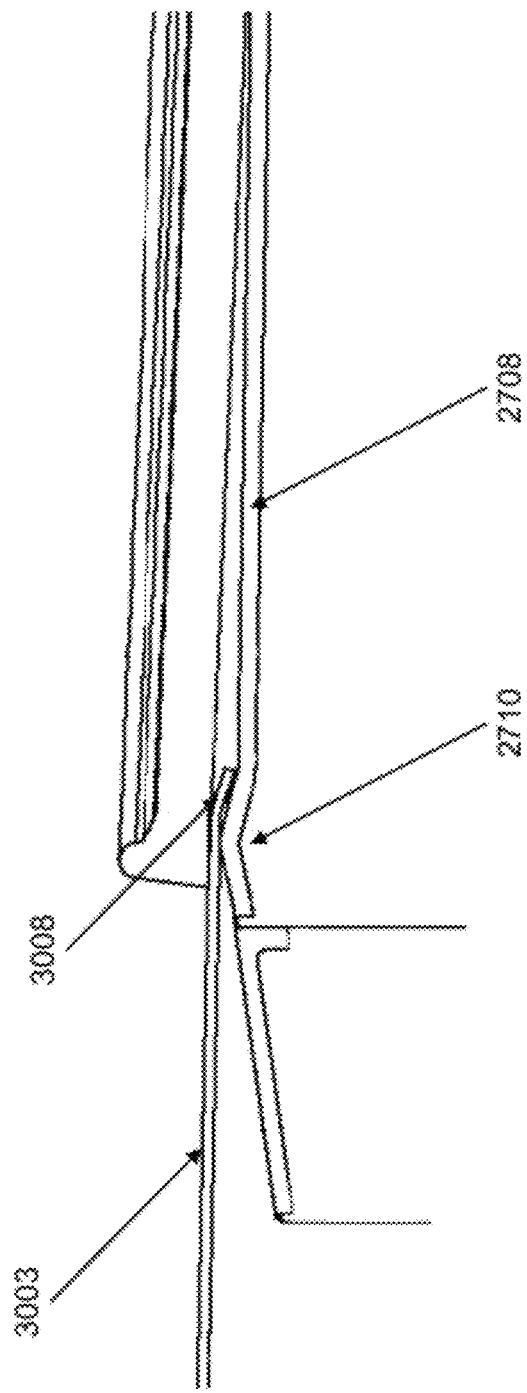

Referring now to FIG. 31, there is shown oven 2706 as a cooked pizza is being unloaded from oven 2706. First positioner 3004, whose operations are controlled by the device control circuitry, inserts shovel 3003 through opening 2707 and underneath the cooked pizza. If the cooked pizza is being supported by a cushion of air from plurality of air holes 2903, then shovel 3003 can be inserted through the cushion of air before or as the blower begins to shut down to assist in the unloading of the freshly-baked pizza. If the cooked pizza is resting on oven plate 2708, then shovel 3003 is slid between the cooked pizza and oven plate 2708. First positioner 3004 then retracts shovel 3003 through opening 2707. One or more photo sensors may be used to determine if the pizza was removed correctly and to initiate a second attempt at removing the pizza from oven 2707, if needed. As illustrated in FIGS. 32A-32D, in addition to imparting horizontal movement to shovel 3003, first positioner 3004 may also cooperate with one or more tilt actuators 3006 to tilt shovel 3003 in a direction that assures the pizza does not slide off of the shovel 3003 when being pulled out from the oven 2706. In some embodiments, the tilt actuators 3006 may be installed near opening 2707 of oven 2706 and push upwards against bottom surface of shovel 3003. Shovel 3003 may be hinged on first positioner 3004. Hence, these tilt actuators 3006 may cycle between two states, the first being a retracted state that is suited for getting the pizza onto the shovel 3003, and a second that is an extended state that causes tilt of shovel 3003 so as to prevent the pizza from backsliding off of the shovel 3003 as the shovel 3003 retracts from the oven 2707. By way of example, shovel 3003 may be tilted down by about 3 to 5 degrees when tilt actuators 3006 are in the retracted state to get under the freshly-baked pizza and then tilted up by about 20 to 30 degrees by when tilt actuators 3006 are in the extended state when retracting out through opening 2707. As shown in FIG. 32E, a leading edge 3008 of the shovel 3003 may be bent with respect to the main body of shovel 3003 to match or substantially correspond with the inner surface of lip 2710 on oven plate 2708 as shovel 3003 scrapes under the cooked pizza to lift it but not crush it.

Figure 34:
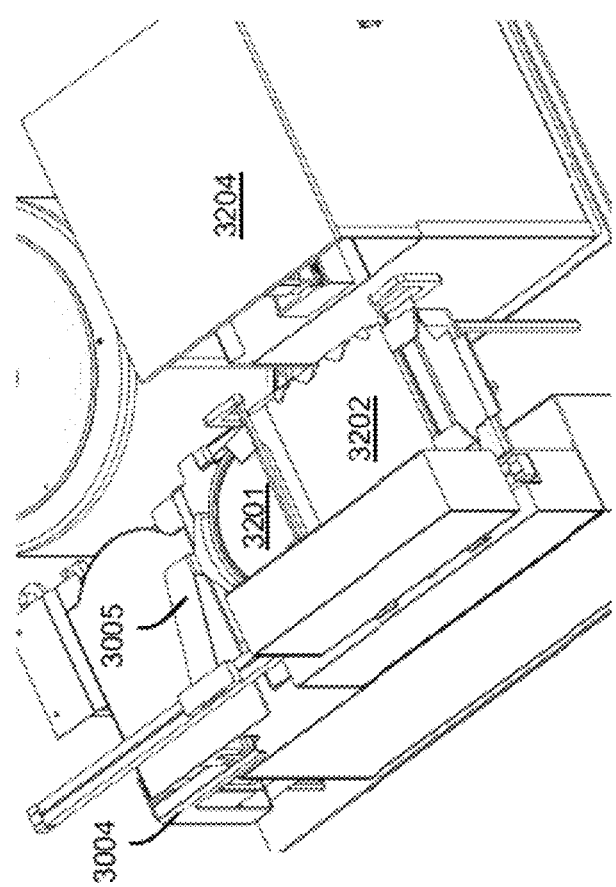
FIG. 34 is a top, left, elevated perspective view of a cooked pizza being inserted into a box according to one embodiment of the present invention.
Figure 33:
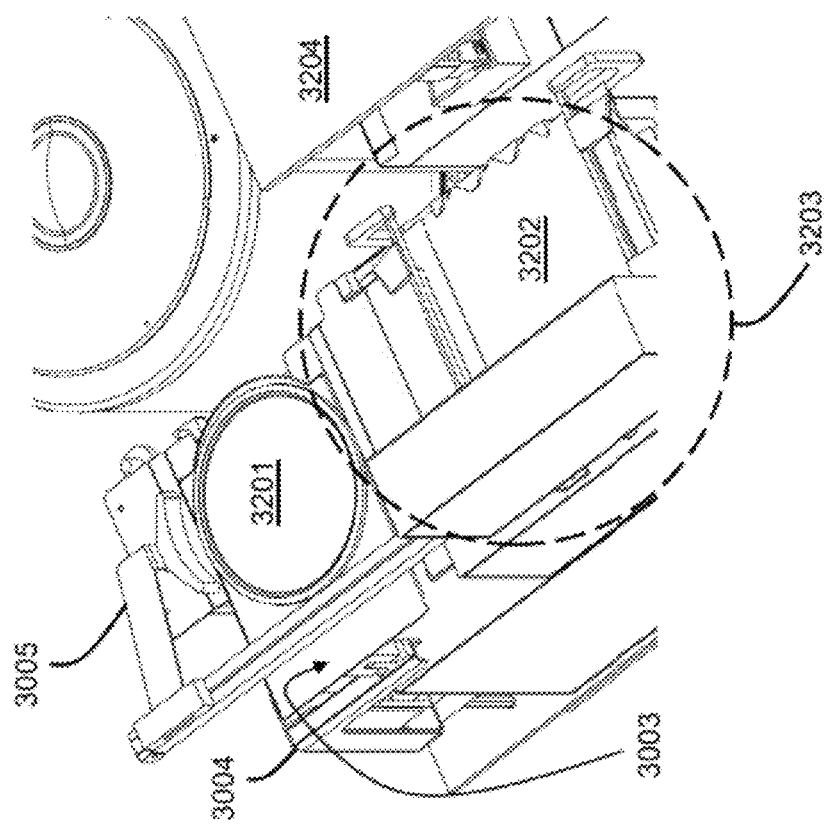
FIG. 33 is a top, left, elevated perspective view of a cooked pizza after being removed from an oven according to one embodiment of the present invention.

Referring now to FIG. 33, there is shown a cooked pizza 3201 after shovel 3003 is substantially fully retracted by first positioner 3004. Second positioner 3005 is in position to move cooked pizza 3201 to a box staging area 3203, where an unfolded box 3202 is shown ready to receive cooked pizza 3201. Referring now to FIG. 34, there is shown cooked pizza 3201 partially inserted into an unfolded box 3202 within staging area 3203.

Figure 35:
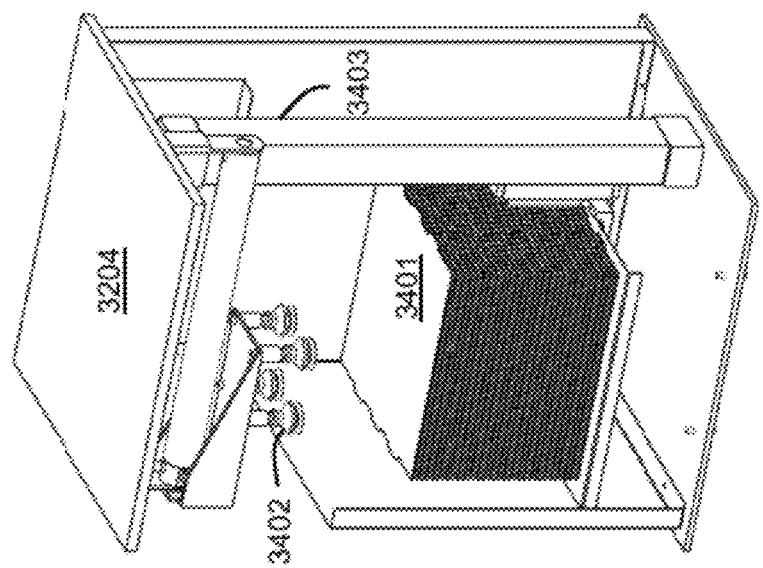
FIG. 35 is a perspective view of box storage preparing to remove one folded box for delivery to a box staging area according to one embodiment of the present invention.
Figure 36:
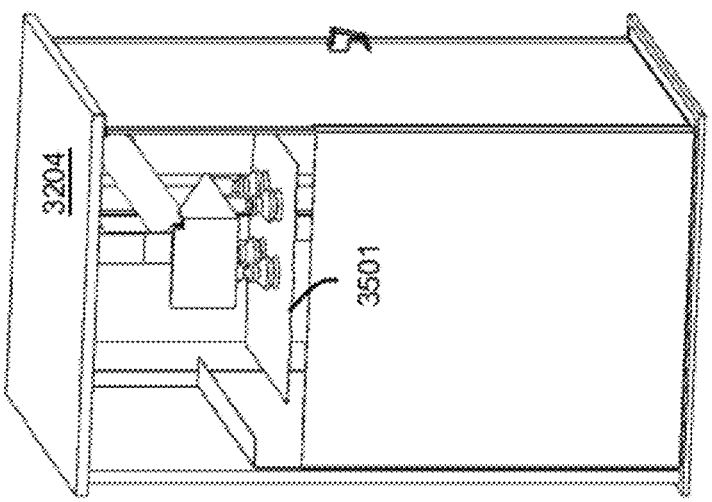
FIG. 36 is a perspective view of box storage removing one folded box for delivery to a box staging area according to one embodiment of the present invention.
Figure 37:
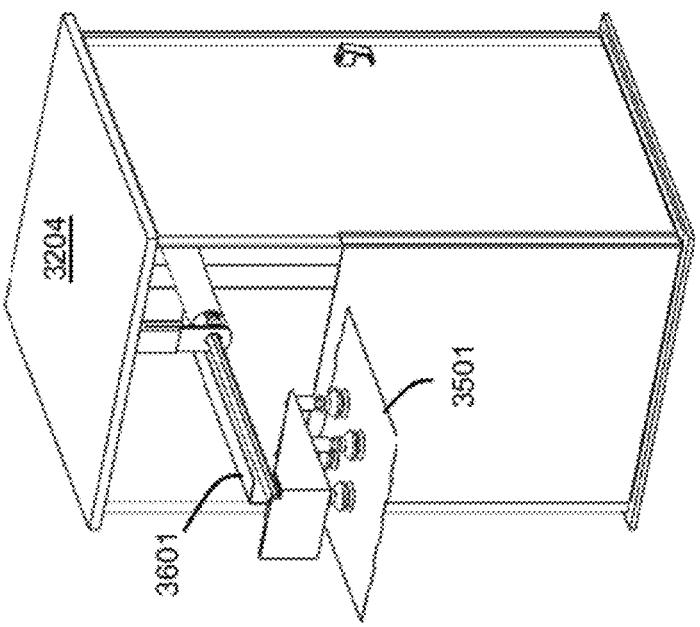
FIG. 37 is a perspective view of box storage delivering one folded box to a box staging area according to one embodiment of the present invention.

A box 3202 is stored in a flattened form within a box storage 3204 to save space. Boxes 3202 are then unfolded into erect form accordion fashion for the subsequent packaging of pizzas. It will be appreciated that this is simply one possible configuration. In other embodiments, boxes may be stored as flat sheets that are subsequently folded into shape by appropriate mechanisms for the packaging of pizzas. In yet other embodiments, formed and unfolded boxes may be stored in box storage 3204 that require no subsequent folding/unfolding for the packaging of pizza. Referring now to FIGS. 35-37, there are shown views of one embodiment box storage 3204 operating to remove one folded pre-formed box 3501 for delivery to box staging area 3203. FIG. 35 shows a plurality of stored, folded boxes 3401 awaiting usage. As indicated above, boxes are stored in flattened form to conserve space. Elevator 3403 brings flattened boxes 3401 in contact with one or more pneumatic suction cups 3402. Elevator 3403 may operate either by raising the plurality of folded boxes 3401, or by lowering pneumatic suction cups 3402. Pneumatic suction cups 3402 are used to select the uppermost folded box 3401.

Referring now to FIG. 36, a selected folded box 3501 is brought to a transfer level. In FIG. 37, a transfer arm 3601 extends in order to place the selected folded box 3501 into the box staging area 3203 (see FIG. 33).

Figure 38:
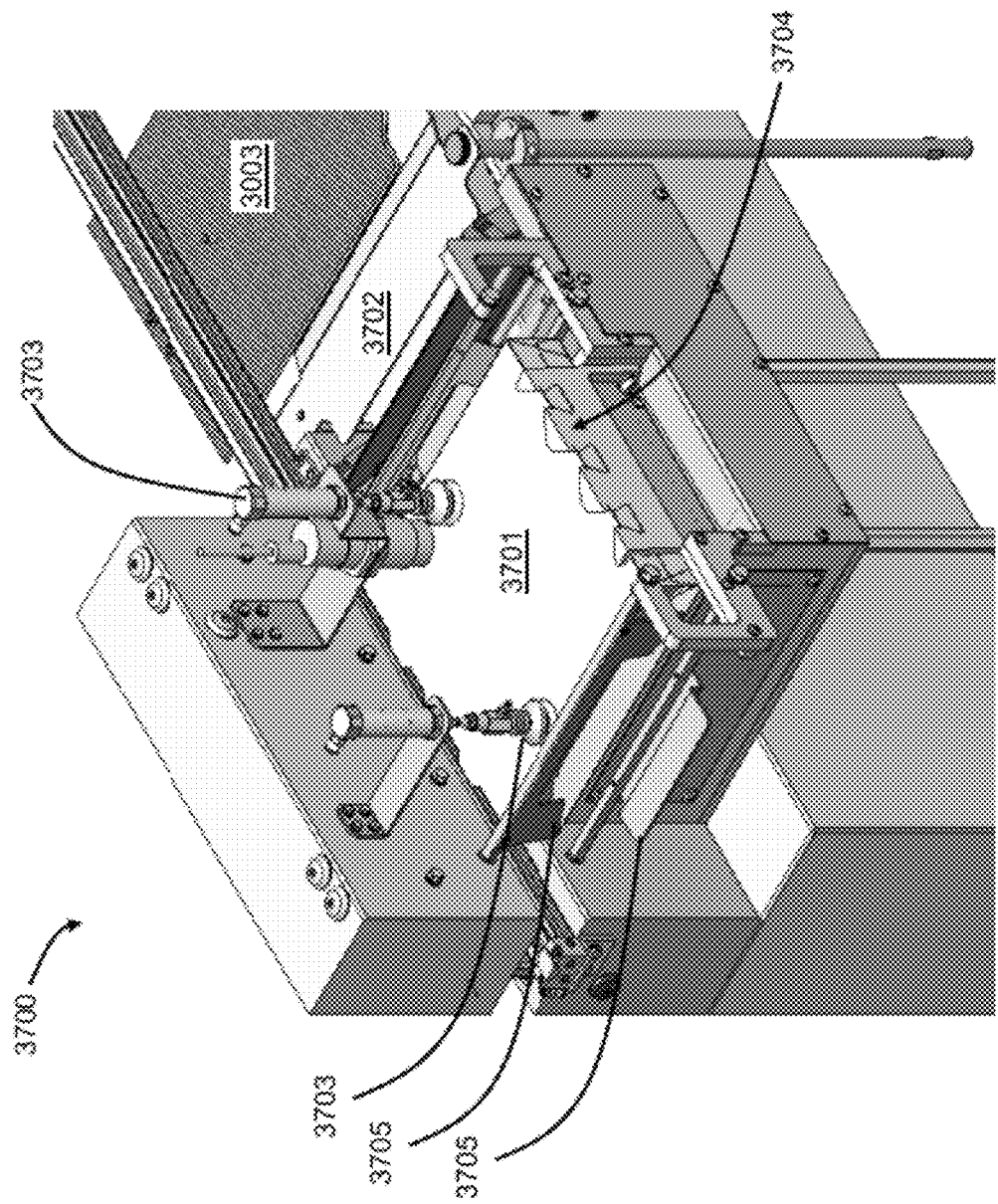
FIG. 38 is a right, front, elevated perspective view of a portion of a boxing module and an unfolded box according to one embodiment of the present invention.

Referring now to FIG. 38, there is shown a right, front, elevated perspective view of a portion of boxing module 3700. Boxing module 3700 is illustrated with an erected box 3701. Boxing module 3700 includes one or more pneumatic suction cups 3703 and a side mechanism 3704 on one or more sides of box 3701. A bridge 3702 may be located between shovel 3003 and boxing module 3700.

In operation of boxing module 3700, after a selected flattened box 3501 is delivered to box staging area 3203, transfer arm 3601 retracts back into box storage 3204. One or more pneumatic suction cups 3703 coupled to a vertically-moving actuator lower to flattened box 3501; suction is activated, and a top surface of flattened box 3501 is pulled upward. Contemporaneously, one or more side mechanism 3704 coupled to horizontally-moving or rotationally-moving actuators may push the side edges of box 3501 inward and upward, thus tending to cause top surface of flattened box 3501 to separate from a bottom surface of box 3501 while bending the side surfaces of box 3501 into a substantially 90 degree relationship with respect to the top and bottom surfaces of box 3501. As side mechanism 3704 pushes edges of box 3501 inward to form the side surfaces, locking tabs or the like on box 3501 may cooperatively engage and act to help keep box 3501 open. In another embodiment, a separate suction force may be provided to hold down bottom surface of box 3501 as top surface of box 3501 is pulled upward. Substantially fully opened box 3501 produces box 3701.

After box 3701 is open, cooked pizza 3201 is pushed into box 3701 by second positioner 3005, as illustrated in FIG. 34. Second positioner 3005 retracts, and one or more flap folders 3705 may push the end edges of box 3701 inward, thus tending to cause box 3701 to close and keep cooked pizza 3201 safely inside box 3701. Suction cups mechanisms 3703 keep the top of box 3701 rigid while the flap folders close the box 3701. When the box 3701 is closed suction from pneumatic suction cups 3703 can be deactivated. Second positioner 3005 may then push box 3701 into a pizza exit compartment for delivery to a customer. The box controller may send a command to a Cutter Kit Dispenser controller in order to dispense a pizza cutter. The pizza cutter may be prepackaged in a box or bag, in which case a pneumatic vacuum pickup and elevator arm, similar to FIGS. 35-37, may be used to deliver the pizza cutter. Alternatively, the pizza cutter may be delivered by other mechanisms, such as an auger.

Boxing module 3700 preferably includes sensors at various locations in order to sense conditions (e.g., temperature, "no more boxes", etc.) and/or whether certain commanded actions have in fact taken place. For example, a sensor (e.g., a weight sensor to sense the combined weight of box and pizza, or a capacitive sensor to sense pizza through the box) can be situated in order to determine whether cooked pizza 3201 was in fact loaded into box 3701. If no pizza had been loaded into box 3701, the customer may be notified of a problem in fulfilling the order, and the pizza vending machine may reattempt at least a portion of the entire process, halt the making of pizzas entirely, provide an opportunity for the customer to cancel their order, or combinations thereof. The sensors may be under control of a boxing module processor, and boxing module processor may be in communication with processors in other modules and/or a system processor as part of the overall control circuitry of the pizza making device 100.

Figure 39:
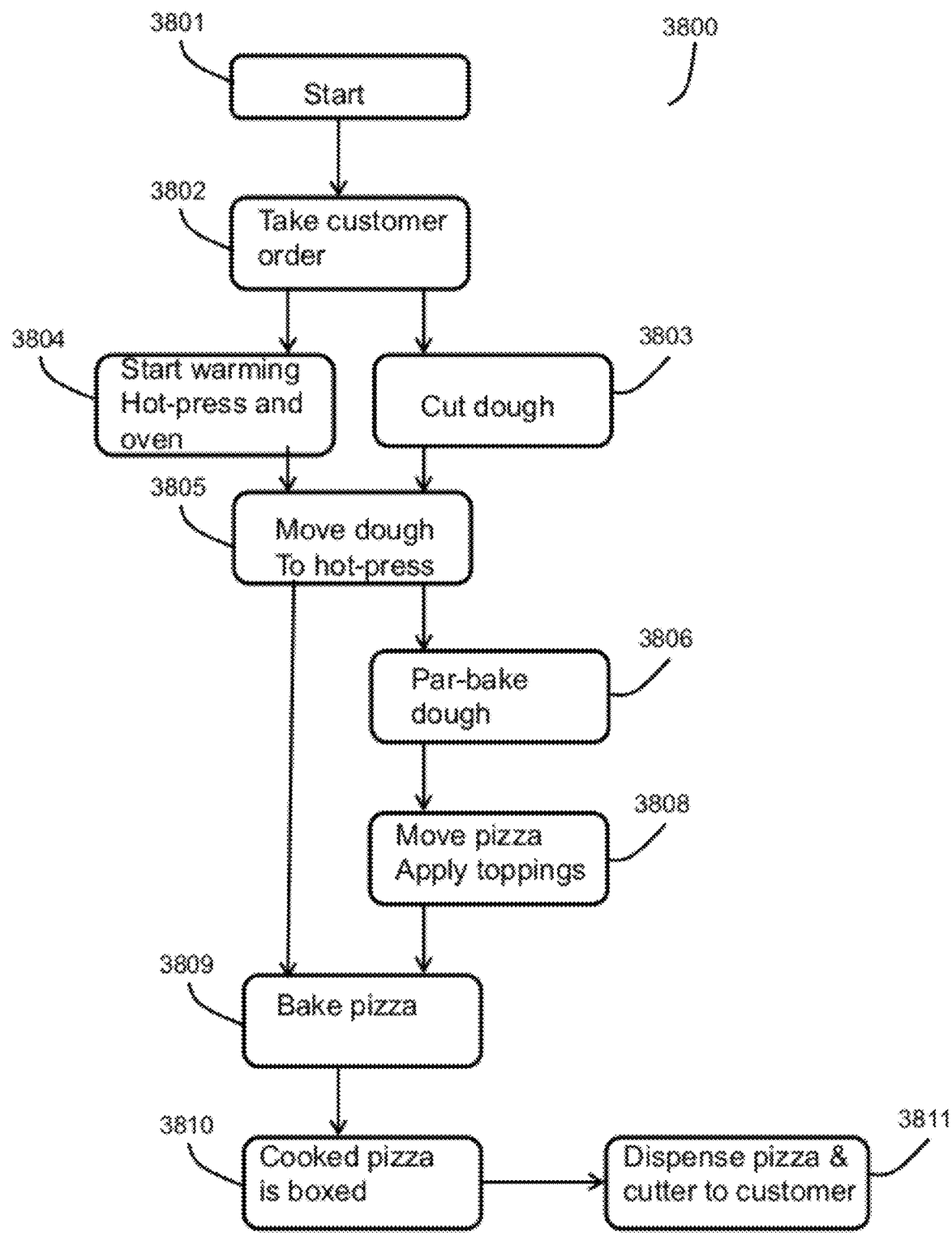
FIG. 39 is a method of preparing a pizza according to one embodiment of the present invention.

FIG. 39 illustrates a method 3800 of operating an automated pizza vending machine in accordance with an embodiment of the invention. Certain steps may be performed in parallel in order to reduce the customer's waiting time. Method 3800 begins at starting step 3801, in which initiation of internal parameters, variables and system component states (actuators, sensors, etc.) is performed to place the machine into a predefined state. Next, a customer order is taken at step 3802. After any validation, the customer's order is accepted and dough begins to be processed and cut at step 3803. In parallel, a hot press may begin to be warmed up at step 3804 together with the pizza baking oven. Next, the cut dough is moved to the hot press at step 3805. The dough par-bakes at step 3806. After the dough par-bakes, it is moved to the toppings module and toppings may be applied at step 3808. The topped pizza is then moved to the oven and baked at step 3809. After the pizza is cooked, it is removed from the oven and boxed in step 3810. The boxed pizza is then delivered to the customer along with an optional cutting tool at step 3811. It will be understood that certain sub-steps such as querying sensor status or readings, and commanding actuators, are not shown for sake of clarity.

Figure 40:
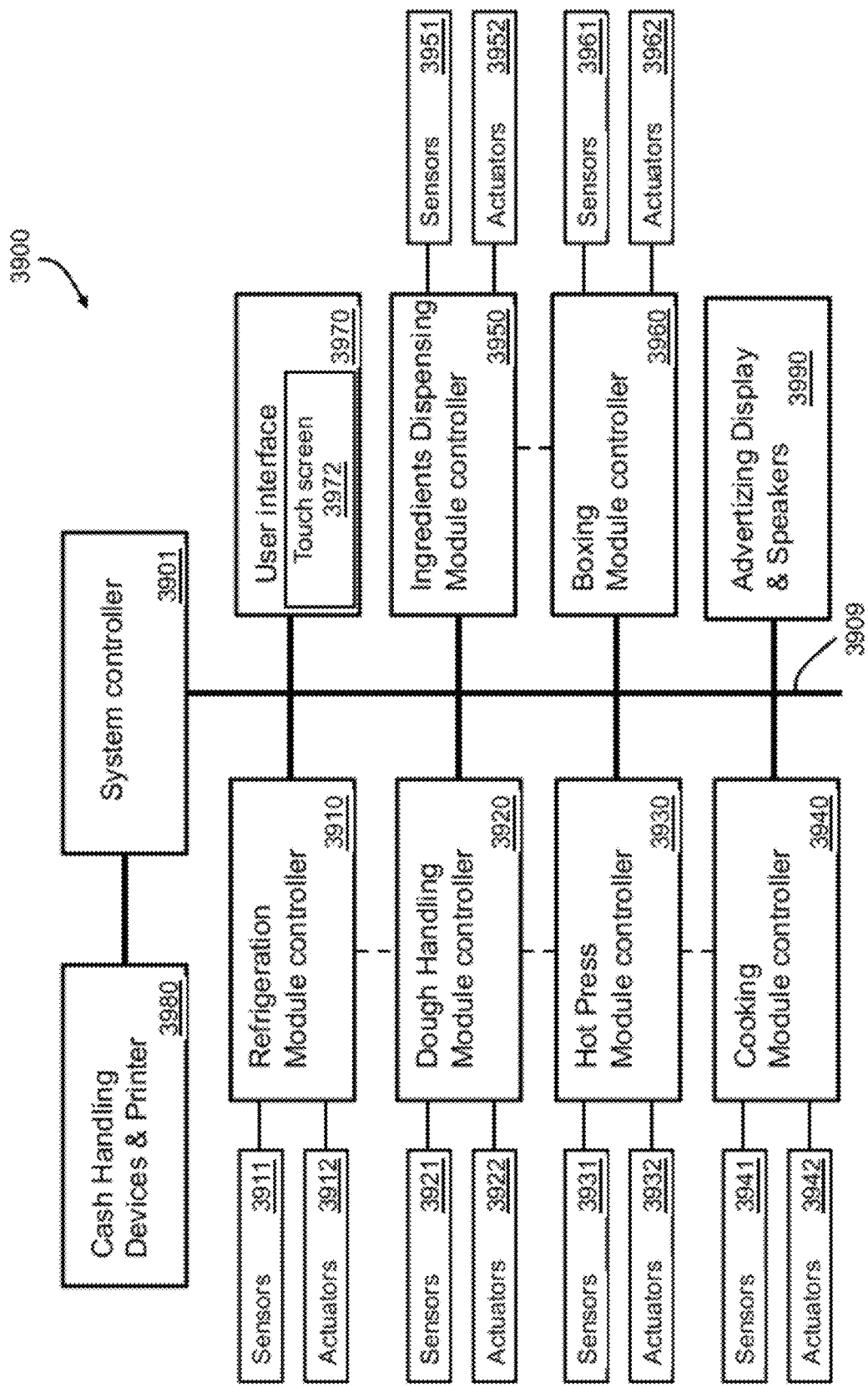
FIG. 40 is a system control architecture of a system for preparing a pizza according to one embodiment of the present invention.

FIG. 40 illustrates a system architecture for the device control circuitry 3900 of an embodiment pizza vending machine. A system controller 3901 communicates via a communications bus 3909 with a user interface 3970, which preferably includes a touch screen display, such as a capacitive touch screen display or the like, for user input/output purposes. The system controller 3901 is also coupled to a cash handling interface and related printer 3980. Any suitable cash handling system as known in the art may be utilized, and may include any suitable printer and related dispenser for dispensing printed receipts, menus, ingredient lists and the like. Separate module controllers such as a refrigeration module controller 3910, a dough handling module controller 3920, a hot press module controller 3930, a cooking module controller 3940, an ingredients dispensing module controller 3950 and a boxing module controller 3960 may communicate with each other and with system controller 3900. Each module controller 39x0 may be in communication with one or more associated sensors 39x1 and one or more associated actuators 39x2. Alternatively or additionally, modules 39x0 may be in direct communication with a neighboring module, bypassing bus 3901, as indicated by dashed lines within FIG. 40. The device 100 may also include an advertising display and speaker module 3990 for present audio-visual information, such as commercials or the like, which may include its own user input/output interfaces, such as buttons, a touch screen, speakers and the like. Alternatively, the advertising interface 3990 may employ the user input/output interfaces used by the user interface 3970.

System architecture 3900 may be implemented as one or more processors that are programmed with software stored in a storage medium, such as flash memory or the like, the software being configured to perform the computational, sensor querying and control steps of method 3800 (generically, "computational steps"). The processor(s) implementing the computational steps may be, for instance, a single processor, or may be a part of a single processor (for example, one core in a multi core processor), or may be multiple processors in communication with other processors, for instance by either a local electrical connection or by a networking connection that allows for a relatively longer remote connection. A remote connection, such as an Ethernet connection, telephonic/modem connection, WiFi or the like may be useful for the remote monitoring of equipment status, such as ingredients out, equipment failure, or a certain amount of cash ready for collection. In such embodiments, the system controller 3901 may collect status information from the various modules 39x0 and relay this information across, for example, a wide area network to a remote monitoring station. This monitoring station can then, for example, dispatch a service technician to the pizza vending machine in response to the received status information. The processor is not limited and may also be implemented as an ASIC or other kind of processing device known in the art. The storage medium storing the software is not limited, and may include any physical and electronic medium used for electronic storage, such as a hard disk, ROM, EEPROM, RAM, flash memory, nonvolatile memory, or any substantially and functionally equivalent medium. The software storage may be co-located with the processor(s) implementing method 3800, or at least a portion of the software storage may be remotely located but accessible when needed.

Figure 41:
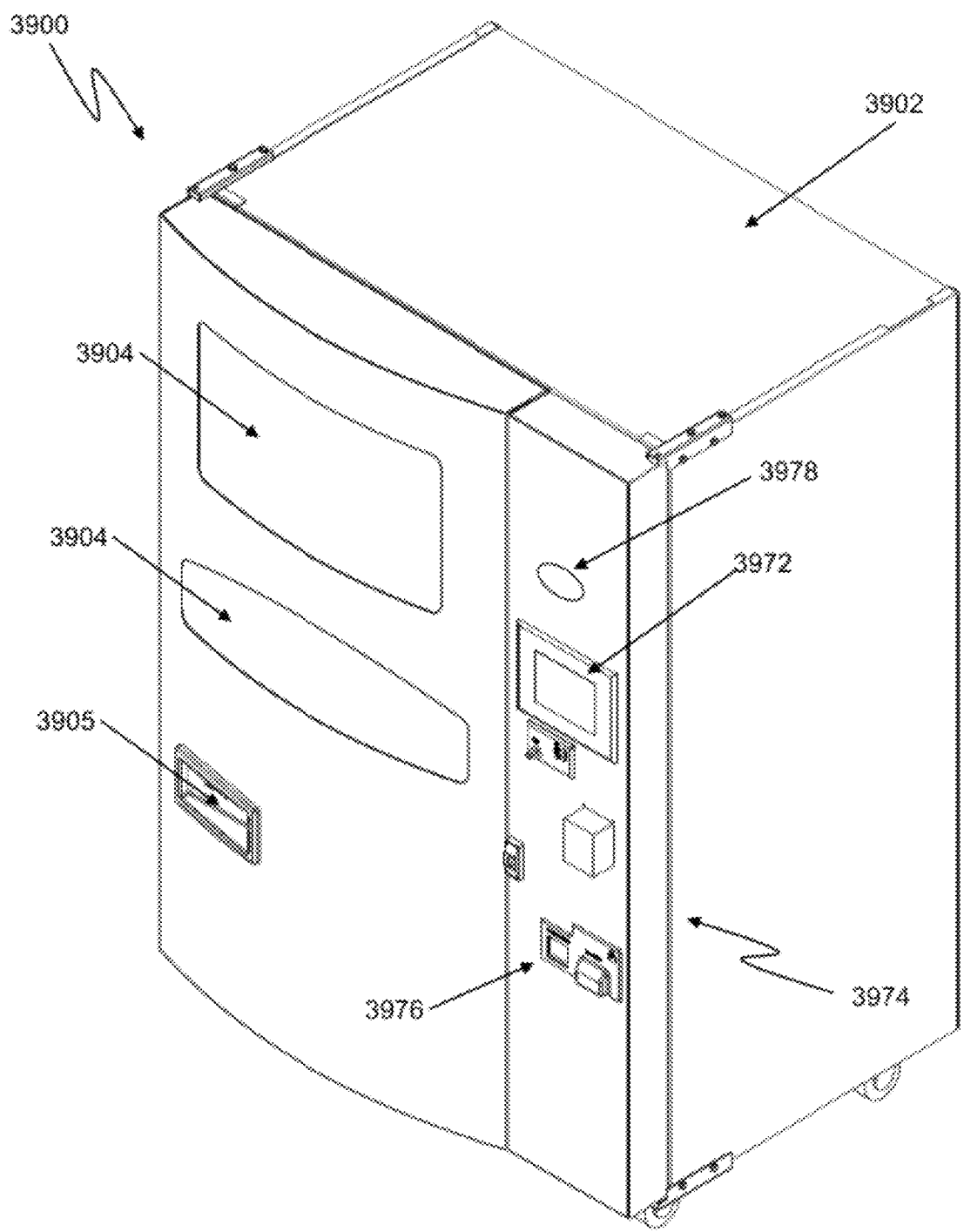
FIG. 41 is a perspective view of an embodiment pizza vending machine.

Further reference is drawn to FIG. 41, which shows a perspective view of the embodiment pizza vending machine 3900. The pizza vending machine 3900 includes a housing 3902 into which the above-discussed components are disposed. The housing 3902 preferably includes at least one window 3904 that permits a customer to view the internal workings of the machine 3900 and see, for example, the ingredients carousel 2210, toppings dispenser 2202, the par-baking process and so forth, thus permitting the customer to visually confirm the freshness and quality of the products being used to create the pizza. Further, the customer may be able to view some, many or even all of the actions performed by the machine 3900, which may provide some diversion while waiting upon the ordered pizza. For example, cameras may be provided within device 100 to capture and project inner workings to display 3904. Display 3904 may also project the status of a particular order and the remaining time to complete the order.

The vending machine 3900 also includes the user input/output interface 3970 that includes the touch sensitive video screen 3972 and a funds acceptor 3974. The funds acceptor 3974, coupled to cash handling module 3980, may be of standard design as known in the art to accept, detect and process bank notes, coins and optionally credit or debit cards, and to provide change, if needed, in a change dispenser 3976. The touch sensitive video screen 3972 can be used to both present menu options to the user and to accept responses from the customer. This may be performed, for example, by a cascading series of options, or the like, in which the touching of one displayed option indicates a selection by the customer that subsequently initiates the display of a sub-set of related options, which proceeds until all options have been exhausted. Of course, other input methods are also possible. Additionally, as previously discussed, the screen 3972 may present one or more buttons or the like that permit the user to cycle one or more of the ingredients carousel 2210 or toppings carousel 2202 to visually confirm the type and quality of the ingredients. Once the options selection process is complete (such as by tapping upon a "Confirm" button or the like displayed on the screen 3972), the screen 3972 can display the price of the final product and prompt the customer to use the funds acceptor 3974 to make a corresponding payment. Once the payment has been verified, the control circuitry 3901 may initiate the process discussed above to create the corresponding freshly-baked pizza. The boxing module controller 3960 may then cause the boxed, freshly-baked pizza to be dispensed from dispenser 3905. A receipt may be printed by module 3980, which can include, for example, information sufficient to identify the exact type and numbers of pizzas made and the customer for whom the pizzas were made.

Because the pizza creation process may take a fair amount of time, in preferred embodiments the touch screen 3972 is controlled during this time to present commercials or the like to the customer, such as by advertising module 3990. Information gleaned from the ordering process can be used to provide targeted advertising using any conventional advertising method known in the art. Simply by way of example, location information obtained from processing a credit-card transaction could be used to present advertisements from advertisers located within the same postal code as that used to verify the credit card transaction. Or, the type of toppings selected could potentially indicate a preference for one type of food over another, and advertisements could be tailored accordingly. Of course, other targeting methods are possible. Further, because the screen 3972 is a touch screen, such advertisements could themselves be interactive in nature, prompting the customer for information and responding to the information so provided, such as by providing further information on a selected subject, an electronic coupon, a printed coupon via printer in module 3980, and so on. More generally, the embodiment machine 3900 can be programmed to support kiosk-style applications, such as providing maps, and information related to, for example, movies, weather, sports, news and so forth, in response to cues received from the customer. Preferred embodiment machines 3900 also include a speaker 3978 controlled by the user interface logic to present voice messages and prompts to the customer. For example, the speaker 3978 can be used to read out options to the customer, the final price of the desired product or the like, which may be of help to those who are visually impaired.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. An oven for cooking a food product, the oven comprising:
   a housing at least partially surrounding a cavity of the oven, the housing comprising an opening, the opening connected to the cavity;
   a closing mechanism for closing the opening;
   a cooking surface disposed within the cavity and configured to accept a food product, the cooking surface comprising a plurality of holes and a return air vent;
   a blower fluidly connected to the plurality of holes and the return air vent and configured to draw air from the return air vent and to blow the air through the plurality of holes with sufficient force to lift the food product at least partially off of the cooking surface; and
   a heater configured to heat the oven.

2. The oven of claim 1 wherein the closing mechanism comprises a door disposed in movable relationship to the opening.

3. The oven of claim 1 wherein the closing mechanism comprises:
   a shroud disposed adjacent an outer surface of the housing; and
   an actuator for moving at least one of the shroud and the housing in relationship to each other such that in a first position the shroud covers the opening and in a second position the shroud does not cover the opening.

4. The oven of claim 3 wherein the housing is rotatably disposed relative to the actuator, and the actuator rotates the housing to create relative movement between the outer surface of the housing and the shroud.

5. The oven of claim 1 wherein the blower is disposed between the cooking surface and the heater, and the heater is configured to heat the air blown by the blower; wherein air discharged by the blower through the plurality of holes returns to the blower via the return vent in the cooking surface.

6. The oven of claim 1 wherein the cooking surface comprises a raised portion to prevent the food product from being blown off of the cooking surface.

7. The oven of claim 1 further comprising a retractable and extendible piston disposed adjacent to the opening and positioned to selectively engage with the food product through the opening.

8. A method for cooking a food product, the method comprising:
   passing a food product through a first opening in an oven housing and into a cavity of the oven, the cavity having a cooking surface; and
   causing heated air to recirculate in the oven by passing through the cooking surface in a first direction so as to at least partially levitate the food product off of the cooking surface to prevent the food product from sticking to the cooking surface and passing through the cooking surface in a second direction substantially opposite to the first direction to return to a blower.

9. The method of claim 8 further comprising closing the first opening of the oven.

10. The method of claim 9 comprising rotating the oven housing so that the first opening is covered by a shroud disposed adjacent to the oven housing.

11. The method of claim 8 further comprising removing the food product from the housing through the first opening, wherein the food product is at least partially levitated by air passing through the cooking surface while removing the food product.

12. The method of claim 8 further comprising causing air to selectively pass through the cooking surface to move the food product from a first position to a second position.

13. The method of claim 12 wherein the housing further comprises a second opening, and the first position is adjacent the first opening and the second position is adjacent the second opening.

14. The method of claim 13 further comprising removing the food product from the cavity through the second opening, wherein the food product is at least partially levitated by air passing through the cooking surface while removing the food product.

* * * * *